United States Patent
Schwarz et al.

(10) Patent No.: US 12,200,255 B2
(45) Date of Patent: Jan. 14, 2025

(54) APPARATUS, A METHOD AND A COMPUTER PROGRAM FOR OMNIDIRECTIONAL VIDEO

(71) Applicant: Nokia Technologies Oy, Espoo (FI)

(72) Inventors: Sebastian Schwarz, Unterhaching (DE); Lukasz Kondrad, Munich (DE); Miska Hannuksela, Tampere (FI); Emre Baris Aksu, Tampere (FI); Lauri Ilola, Munich (DE)

(73) Assignee: Nokia Technologies Oy, Espoo (FI)

( * ) Notice: Subject to any disclaimer, the term of this patent is extended or adjusted under 35 U.S.C. 154(b) by 145 days.

(21) Appl. No.: 17/788,811

(22) PCT Filed: Dec. 7, 2020

(86) PCT No.: PCT/FI2020/050819
§ 371 (c)(1),
(2) Date: Jun. 24, 2022

(87) PCT Pub. No.: WO2021/136877
PCT Pub. Date: Jul. 8, 2021

(65) Prior Publication Data
US 2023/0059516 A1    Feb. 23, 2023

(30) Foreign Application Priority Data

Jan. 2, 2020   (FI) ..................... 20205004

(51) Int. Cl.
*H04N 19/597*  (2014.01)
*H04N 19/179*  (2014.01)
*H04N 19/29*   (2014.01)

(52) U.S. Cl.
CPC ......... *H04N 19/597* (2014.11); *H04N 19/179* (2014.11); *H04N 19/29* (2014.11)

(58) Field of Classification Search
CPC ..... H04N 19/597; H04N 19/179; H04N 19/29
(Continued)

(56) References Cited

U.S. PATENT DOCUMENTS

| 2018/0199065 A1 | 7/2018 | Adams et al. |
| 2019/0012839 A1 | 1/2019 | Wang |

(Continued)

FOREIGN PATENT DOCUMENTS

| CN | 110419219 A | 11/2019 |
| WO | 2019/013430 A1 | 1/2019 |

(Continued)

OTHER PUBLICATIONS

"Text of ISO/IEC DIS 23090-5 Video-based Point Cloud Compression", 3DG, ISO/IEC JTC1/SC29/WG11/N18670, Oct. 10, 2019, 185 pages.

(Continued)

*Primary Examiner* — Allen C Wong
(74) *Attorney, Agent, or Firm* — Joseph C. Drish; McCarter & English, LLP

(57) ABSTRACT

There are disclosed various methods, apparatuses and computer program products for video encoding and decoding. In some embodiments the method for video encoding comprises obtaining compressed volumetric video data representing a three-dimensional scene or object (71); capsulating the compressed volumetric video data into a data structure (72); obtaining data of a two-dimensional projection of at least a part of the three-dimensional scene as seen from a certain viewport (73); and including the data of the two-dimensional projection into the data structure (74).

20 Claims, 16 Drawing Sheets

(58) Field of Classification Search
USPC .................................................. 375/240.26
See application file for complete search history.

(56) References Cited

U.S. PATENT DOCUMENTS

| | | | |
|---|---|---|---|
| 2019/0188828 | A1 | 6/2019 | Aggarwal et al. |
| 2019/0306530 | A1 | 10/2019 | Fan et al. |
| 2019/0318488 | A1 | 10/2019 | Lim et al. |
| 2019/0320157 | A1 | 10/2019 | Hwang et al. |
| 2020/0107008 | A1* | 4/2020 | Hur ........................ H04N 13/183 |
| 2020/0302680 | A1* | 9/2020 | Yip ........................ H04L 67/131 |
| 2020/0351449 | A1* | 11/2020 | Oh ........................ H04N 13/156 |
| 2021/0250568 | A1* | 8/2021 | Huang ............... H04N 21/4728 |

FOREIGN PATENT DOCUMENTS

| | | |
|---|---|---|
| WO | 2019/138927 A1 | 7/2019 |
| WO | 2019/141901 A1 | 7/2019 |
| WO | 2019/197722 A1 | 10/2019 |
| WO | 2020/201632 A1 | 10/2020 |

OTHER PUBLICATIONS

"Text of ISO/IEC CD 23090-10 Carriage of PC Data", Systems, ISO/IEC JTC1/SC29/WG11/N18606, Aug. 23, 2019, 21 pages.

"Advanced Video Coding for Generic Audiovisual services", Series H: Audiovisual and Multimedia Systems, Infrastructure of audiovisual services—Coding of moving Video, Recommendation ITU-T H.264, Apr. 2017, 812 pages.

"High Efficiency Video Coding", Series H: Audiovisual and Multimedia Systems, Infrastructure of audiovisual services—Coding of moving video, Recommendation ITU-T H.265, Feb. 2018, 692 pages.

"Information Technology—Coding of Audio-Visual Objects—Part 12: ISO Base Media File Format", ISO/IEC 14496-12, Fifth edition, Dec. 15, 2015, 248 pages.

"Information Technology—Coding of Audio-Visual Objects—Part 14: MP4 File Format", ISO/IEC 14496-14, First edition, Nov. 15, 2003, 18 pages.

"Information Technology—Coding of Audio-Visual Objects—Part 15: Advanced Video Coding (AVC) File Format", ISO/IEC 14496-15, First edition, Apr. 15, 2004, 29 pages.

"3rd Generation Partnership Project; Technical Specification Group Services and System Aspects; Transparent end-to-end packet switched streaming service (PSS); 3GPP file format (3GP) (Release 15)", 3GPP TS 26.244, V15.0.0, Jun. 2018, pp. 1-67.

"3rd Generation Partnership Project; Technical Specification Group Services and System Aspects; Transparent end-to-end Packet-switched Streaming Service (PSS); Protocols and codecs (Release 15)", 3GPP TS 26.234, V15.1.0, Sep. 2018, pp. 1-174.

"Information Technology—Dynamic Adaptive Streaming over HTTP (DASH)—Part 1: Media Presentation Description and Segment Formats", ISO/IEC 23009-1, Second Edition, May 15, 2014, 152 pages.

"Information technology—Coded representation of immersive media (MPEG-I)—Part 2: Omnidirectional media format", ISO/IEC JTC 1/SC 29/WG 11, ISO/IEC FDIS 23090-2:201x (E), Apr. 26, 2018, 181 pages.

Zakharchenko, "V-PCC Codec description", 3DG, ISO/IEC JTC1/SC29/WG11 MPEG2018/N18017, Oct. 2018, 32 pages.

"IEEE 802.11", Wikipedia, Retrieved on Jun. 17, 2022, Webpage available at : https://en.wikipedia.org/wiki/IEEE_802.11.

Office action received for corresponding Finnish Patent Application No. 20205004, dated Sep. 2, 2020, 10 pages.

"Revised Text of ISO/IEC CD 23090-10 Carriage of Video-based Point Cloud Coding Data", Systems, ISO/IEC JTC1/SC29/WG11/N18606, Nov. 8, 2019, 42 pages.

Oyman et al., "DASH-based Signaling of Recommended Viewport Information", Intel Corporation, ISO/IEC JTC1/SC29/WG11 MPEG2019/M50654, Oct. 2019, 4 pages.

International Search Report and Written Opinion received for corresponding Patent Cooperation Treaty Application No. PCT/FI2020/050819, dated Mar. 11, 2021, 17 pages.

Coding Data, ISO/IECJTC1/SC29/WG11 N18606 (version 1). MPEG Document Management System, 127th meeting: Gothenburg [online], Aug. 23, 2019, [retrievedon Aug. 29, 2020]. Retrieved from <http://phenix.it-sudparis.eu/mpeg/> sections 6.1, 6.4.1; Figs. 1-2.

Extended European Search Report received for corresponding European Patent Application No. 20911145.9, Nov. 22, 2023, 9 pages.

Wang et al., "On 6DoF Viewports and their Signaling in ISOBMFF for V-PCC and Immersive Video Content", MediaTek USA, ISO/IEC JTC1/SC29/WG11 MPEG2016/M50979, Oct. 2019, 7 pages.

Office action received for corresponding Chinese Patent Application No. 202080097891.0, dated Feb. 27, 2024, 7 pages of office action and no page of translation available.

* cited by examiner

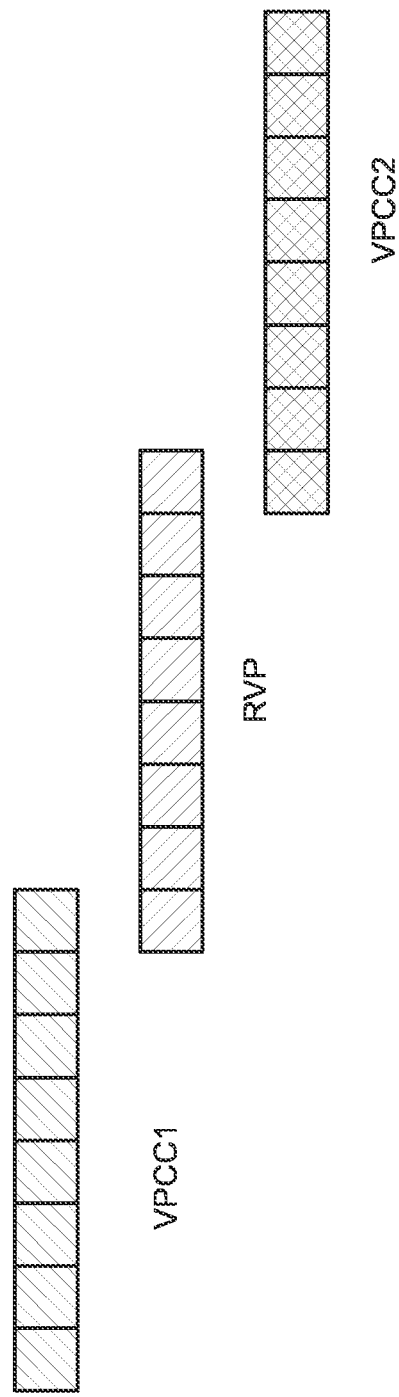

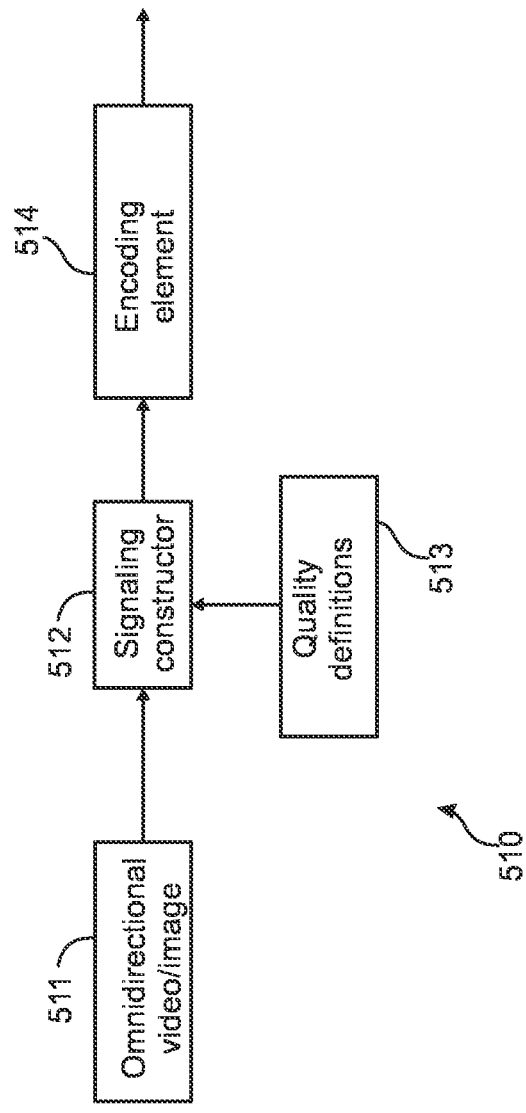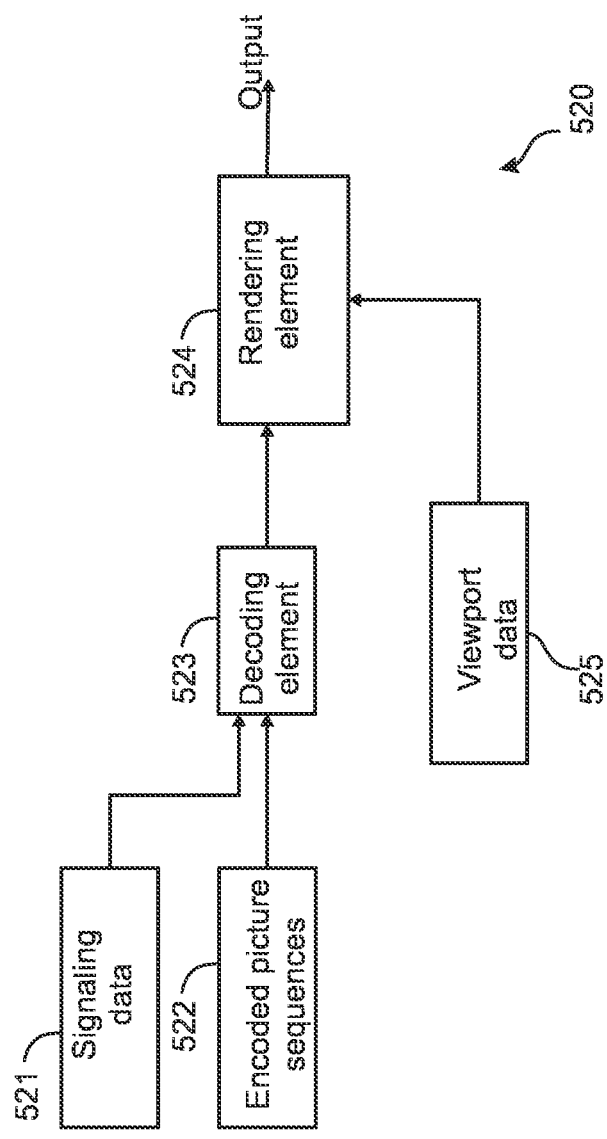

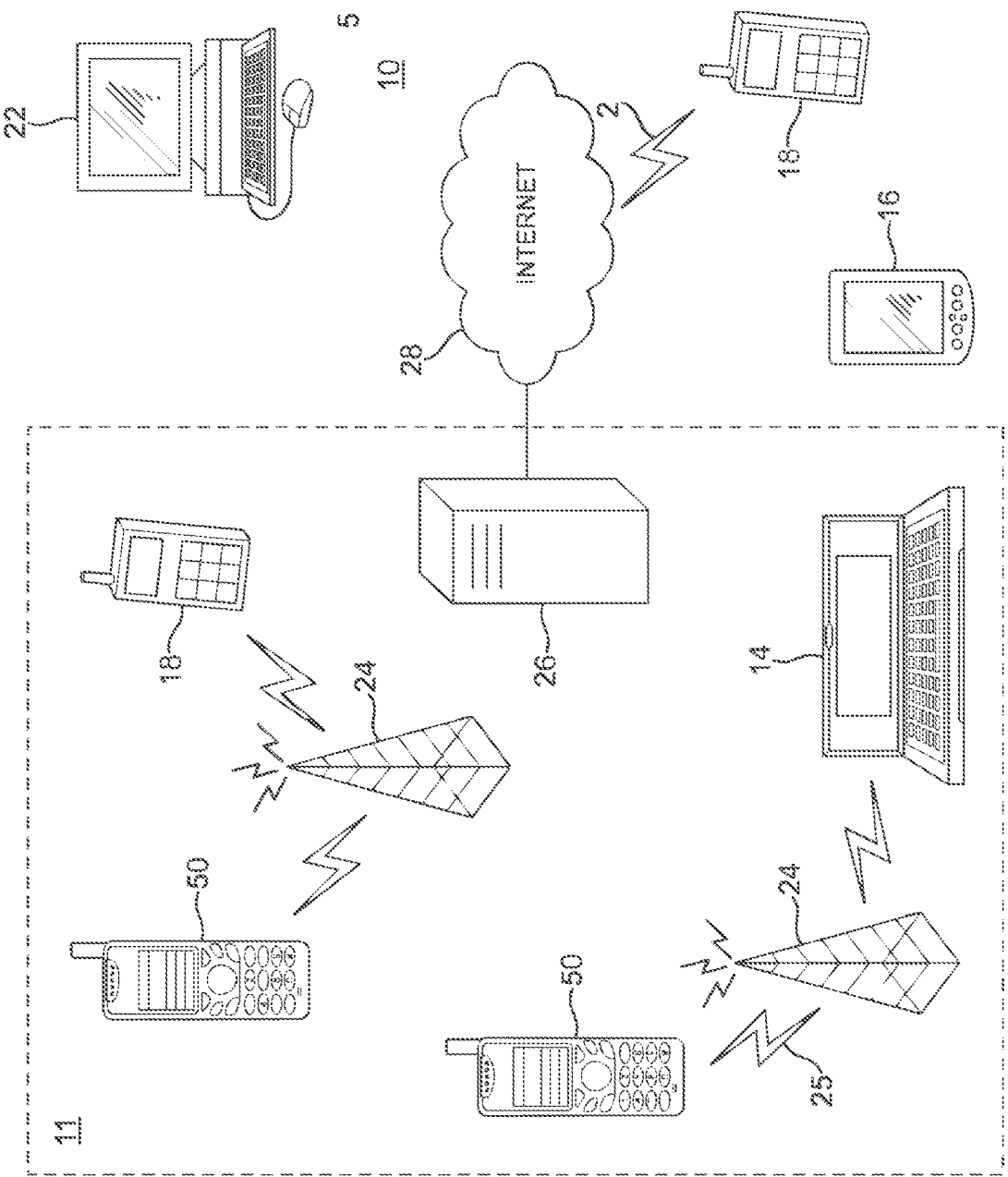

APPARATUS, A METHOD AND A COMPUTER PROGRAM FOR OMNIDIRECTIONAL VIDEO

RELATED APPLICATION

This application was originally filed as PCT Application No. PCT/FI2020/050819, filed on Dec. 7, 2020, which claims priority from FI Application No. 20205004, filed on Jan. 2, 2020, each of which is incorporated herein by reference in its entirety.

TECHNICAL FIELD

The present invention relates to an apparatus, a method and a computer program for viewport signalling of compressed point clouds.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Volumetric video data represents a three-dimensional scene or object and can be used as input for virtual reality (VR), augmented reality (AR) and mixed reality (MR) applications. Such data describes the geometry, e.g. shape, size, position in three-dimensional (3D) space, and respective attributes, e.g. colour, opacity, reflectance and any possible temporal changes of the geometry and attributes at given time instances. Volumetric video is either generated from 3D models through computer-generated imagery (CGI), or captured from real-world scenes using a variety of capture solutions, e.g. multi-camera, laser scan, combination of video and dedicated depth sensors, and more. Also, a combination of CGI and real-world data is possible.

Typical representation formats for such volumetric data are polygonal meshes, point clouds (PCs), or voxel arrays. In dense point clouds or voxel arrays, the reconstructed 3D scene may contain tens or even hundreds of millions of points. One way to compress a time-varying volumetric scene/object is to project 3D surfaces to some number of pre-defined 2D planes. Regular 2D video compression algorithms can then be used to compress various aspects of the projected surfaces. For example, MPEG Video-Based Point Cloud Coding (V-PCC) provides a procedure for compressing a time-varying volumetric scene/object by projecting 3D surfaces onto a number of pre-defined 2D planes, which may then be compressed using regular 2D video compression algorithms. The projection is presented using different patches, where each set of patches may represent a specific object or specific parts of a scene.

In 3D graphics, polygonal meshes are extensively used. Therefore, V-PCC also provides support for mesh encoding and decoding. Therein, each vertex (i.e. a point in 3D space defining the shape of an object) is mapped with corresponding color values and texture coordinates of the object. Larger number of vertices enables to encode more detailed geometry structure of the object. However, if better compression efficiency is desired by reducing the number of vertices, this would lead to loss of texture details, as well.

Point clouds are a form of volumetric content that is known for its poor compression performance. MPEG has been working on video-based point cloud compression (V-PCC), where point clouds are projected onto 2d surfaces and compressed using traditional video coding tools. With associated metadata 3d point cloud can be reconstructed from the 2d video.

A compressed point cloud includes one or more encoded video bitstream(s) corresponding to the attributes of the 3D object (like texture or normals), one or more encoded video bitstream corresponding to the geometry of the 3D object, an encoded video bitstream describing the occupancy of 2d surfaces, and an encoded metadata bitstream corresponding to all other auxiliary information which is necessary during the composition of a 3D object.

Depending on the use case, a full V-PCC "experience" as provided by the multi-track encapsulated V-PCC bit stream may not be desired or possible. Such scenarios, may include, but are not limited to:

Continuous "simulcast": The user is able to switch between a 2D "director's cut" view and an interactive 3D view at any time.

3D Highlights: At certain times, the user can switch from a pre rendered 2D view into an interactive 3D view (static or dynamic)

2D Storytelling: At certain times, the user is taken from the interactive 3D view into a prerendered 2D view, e.g. for scene transitions or "director's cut" view Device adaptation: A device receives a multi-track encapsulated V-PCC bit stream but is not able to provide 3D viewing/AR functionality (e.g. a stationary TV screen)

Bitrate adaptation: A pre-rendered 2D viewport is provided in case 3D interactivity would require too much bit rate Transitions between two or more examples of volumetric content, where user is first exploring one set of point cloud content after which pre-rendered animation is applied to migrate the user smoothly into the second point cloud domain.

None of these scenarios are currently supported in the carriage of V-PCC data. Furthermore, for above mentioned scenarios supporting a switch between prerendered 2D viewport and interactive 3D view, smooth transitions shall be possible. This functionality is missing as well.

SUMMARY

Some embodiments provide a method for encoding and decoding video information. In some embodiments of the present invention there is provided a method, apparatus and computer program product for video coding as well as decoding.

In accordance with an embodiment, in order to facilitate viewport signaling a V-PCC multi-track encapsulation is extended with one or more additional prerendered 2D viewport tracks and associated metadata to support all the use cases mentioned above. A "viewport track" is a dynamic sequence of viewports, i.e. a dynamic rendering of a 2D camera view on a 3D patch in a 3D scene.

Various aspects of examples of the invention are provided in the detailed description.

According to a first aspect, there is provided an apparatus comprising means for performing:

obtaining compressed volumetric video data representing a three-dimensional scene or object;

capsulating the compressed volumetric video data into a data structure;

obtaining data of a two-dimensional projection of at least a part of the three-dimensional scene as seen from a certain viewport;
including the data of the two-dimensional projection into the data structure.

According to a second aspect, there is provided a method for encoding comprising: obtaining compressed volumetric video data representing a three-dimensional scene or object;
capsulating the compressed volumetric video data into a data structure;
obtaining data of a two-dimensional projection of at least a part of the three-dimensional scene as seen from a certain viewport;
including the data of the two-dimensional projection into the data structure.

An apparatus according to a third aspect comprises at least one processor and at least one memory, said at least one memory stored with code thereon, which when executed by said at least one processor, causes the apparatus to perform at least:
obtain compressed volumetric video data representing a three-dimensional scene or object;
capsulate the compressed volumetric video data into a data structure;
obtain data of a two-dimensional projection of at least a part of the three-dimensional scene as seen from a certain viewport;
include the data of the two-dimensional projection into the data structure.

A computer readable storage medium according to a fourth aspect comprises code for use by an apparatus, which when executed by a processor, causes the apparatus to perform:
obtain compressed volumetric video data representing a three-dimensional scene or object;
capsulate the compressed volumetric video data into a data structure;
obtain data of a two-dimensional projection of at least a part of the three-dimensional scene as seen from a certain viewport;
include the data of the two-dimensional projection into the data structure.

An apparatus according to a fifth aspect comprises means for performing:
receiving data structure comprising compressed volumetric video data representing a three-dimensional scene or object and data of a two-dimensional projection of at least a part of the three-dimensional scene as seen from a certain viewport;
selecting either the three-dimensional scene or object or the two-dimensional projection for presentation.

A method according to a sixth aspect comprises:
receiving data structure comprising compressed volumetric video data representing a three-dimensional scene or object and data of a two-dimensional projection of at least a part of the three-dimensional scene as seen from a certain viewport;
selecting either the three-dimensional scene or object or the two-dimensional projection for presentation.

An apparatus according to a seventh aspect comprises at least one processor and at least one memory, said at least one memory stored with code thereon, which when executed by said at least one processor, causes the apparatus to perform at least:
receive data structure comprising compressed volumetric video data representing a three-dimensional scene or object and data of a two-dimensional projection of at least a part of the three-dimensional scene as seen from a certain viewport;
select either the three-dimensional scene or object or the two-dimensional projection for presentation. A computer readable storage medium according to a seventh aspect comprises code for use by an apparatus, which when executed by a processor, causes the apparatus to perform: receive data structure comprising compressed volumetric video data representing a three-dimensional scene or object and data of a two-dimensional projection of at least a part of the three-dimensional scene as seen from a certain viewport;
select either the three-dimensional scene or object or the two-dimensional projection for presentation. Further aspects include at least apparatuses and computer program products/code stored on a non-transitory memory medium arranged to carry out the above methods.

A computer readable storage medium according to an eighth aspect comprises code for use by an apparatus, which when executed by a processor, causes the apparatus to perform:
receive data structure comprising compressed volumetric video data representing a three-dimensional scene or object and data of a two-dimensional projection of at least a part of the three-dimensional scene as seen from a certain viewport;
select either the three-dimensional scene or object or the two-dimensional projection for presentation.

BRIEF DESCRIPTION OF THE DRAWINGS

For a more complete understanding of example embodiments of the present invention, reference is now made to the following descriptions taken in connection with the accompanying drawings in which:

FIG. 7b illustrates an example of sample alignment of RVP transition between two point clouds, in accordance with an embodiment;

FIG. 9a shows some elements of a video encoding section, in accordance with an embodiment;

FIG. 9b shows a video decoding section, in accordance with an embodiment;

FIG. 14 further shows schematically electronic devices employing embodiments of the invention connected using wireless and wired network connections.

DETAILED DESCRIPTION OF SOME EXAMPLE EMBODIMENTS

Figure 1A:
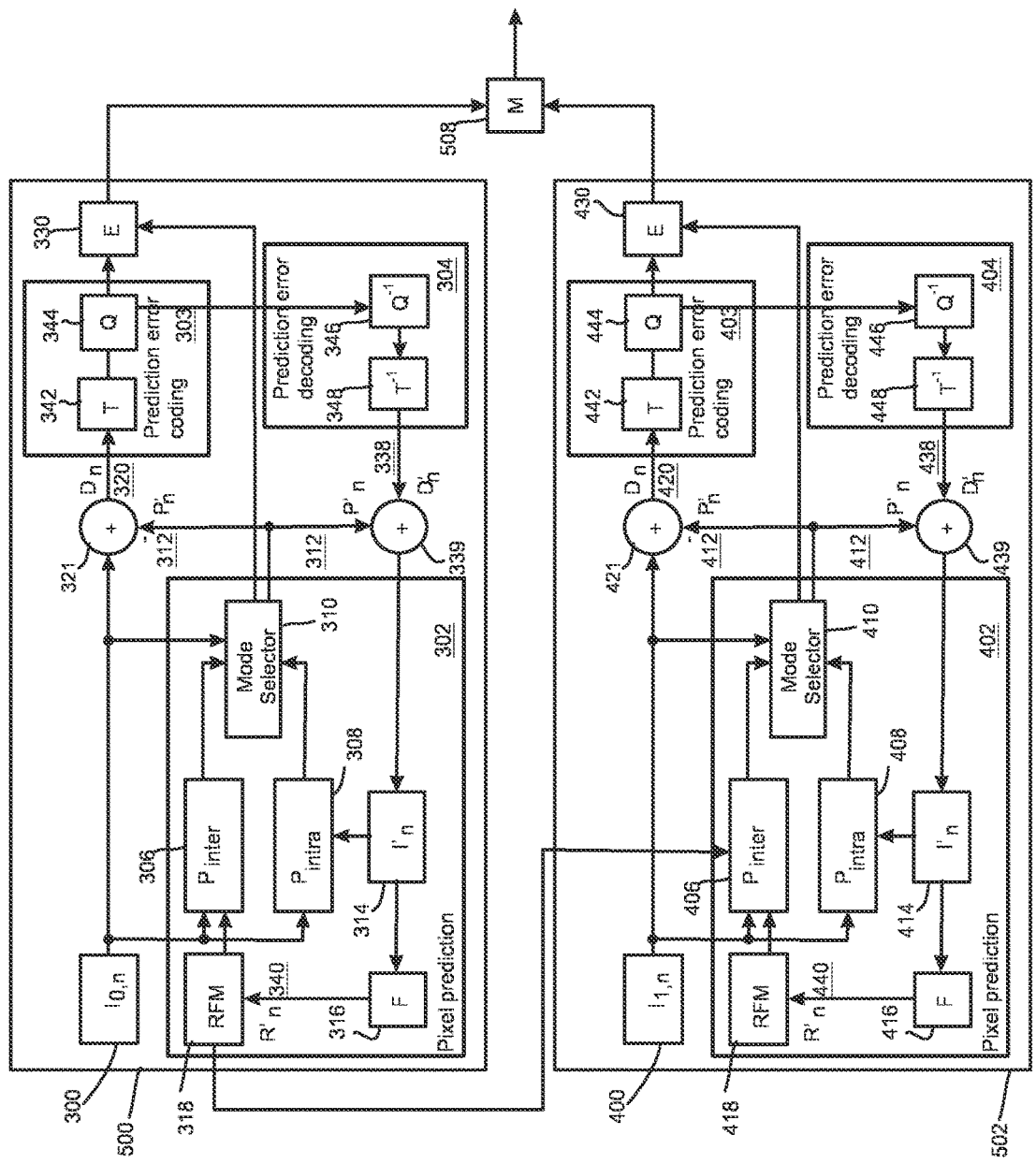
FIGS. 1a and 1b show an encoder and a decoder for encoding and decoding 2D pictures.

In the following, several embodiments are described using the convention of referring to (de)coding, which indicates that the embodiments may apply to decoding and/or encoding.

The Advanced Video Coding standard (which may be abbreviated AVC or H.264/AVC) was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC).

The High Efficiency Video Coding standard (which may be abbreviated HEVC or H.265/HEVC) was developed by the Joint Collaborative Team—Video Coding (JCT-VC) of VCEG and MPEG. The standard is published by both parent standardization organizations, and it is referred to as ITU-T Recommendation H.265 and ISO/IEC International Standard 23008-2, also known as MPEG-H Part 2 High Efficiency Video Coding (HEVC). Extensions to H.265/HEVC include scalable, multiview, three-dimensional, and fidelity range extensions, which may be referred to as SHVC, MV-HEVC, 3D-HEVC, and REXT, respectively. The references in this description to H.265/HEVC, SHVC, MV-HEVC, 3D-HEVC and REXT that have been made for the purpose of understanding definitions, structures or concepts of these standard specifications are to be understood to be references to the latest versions of these standards that were available before the date of this application, unless otherwise indicated.

Some key definitions, bitstream and coding structures, and concepts of H.264/AVC and HEVC and some of their extensions are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC standard—hence, they are described below jointly. The aspects of the invention are not limited to H.264/AVC or HEVC or their extensions, but rather the description is given for one possible basis on top of which the invention may be partly or fully realized.

In the description of existing standards as well as in the description of example embodiments, a syntax element may be defined as an element of data represented in the bitstream. A syntax structure may be defined as zero or more syntax elements present together in the bitstream in a specified order.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

The elementary unit for the input to an H.264/AVC or HEVC encoder and the output of an H.264/AVC or HEVC decoder, respectively, is a picture. A picture given as an input to an encoder may also be referred to as a source picture, and a picture decoded by a decoder may be referred to as a decoded picture.

The source and decoded pictures may each be comprised of one or more sample arrays, such as one of the following sets of sample arrays:

Luma (Y) only (monochrome).
Luma and two chroma (YCbCr or YCgCo).
Green, Blue and Red (GBR, also known as RGB).
Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use may be indicated e.g. in a coded bitstream e.g. using the Video Usability Information (VUI) syntax of H.264/AVC and/or HEVC. A component may be defined as an array or a single sample from one of the three sample arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame. Fields may be used as encoder input for example when the source signal is interlaced. Chroma sample arrays may be absent (and hence monochrome sampling may be in use) or may be subsampled when compared to luma sample arrays. Some chroma formats may be summarized as follows:

In monochrome sampling there is only one sample array, which may be nominally considered the luma array.
In 4:2:0 sampling, each of the two chroma arrays has half the height and half the width of the luma array.
In 4:2:2 sampling, each of the two chroma arrays has the same height and half the width of the luma array.
In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

When chroma subsampling is in use (e.g. 4:2:0 or 4:2:2 chroma sampling), the location of chroma samples with respect to luma samples may be determined in the encoder side (e.g. as pre-processing step or as part of encoding). The chroma sample positions with respect to luma sample positions may be pre-defined for example in a coding standard, such as H.264/AVC or HEVC, or may be indicated in the bitstream for example as part of VUI of H.264/AVC or HEVC.

Generally, the source video sequence(s) provided as input for encoding may either represent interlaced source content or progressive source content. Fields of opposite parity have been captured at different times for interlaced source content. Progressive source content contains captured frames. An encoder may encode fields of interlaced source content in two ways: a pair of interlaced fields may be coded into a coded frame or a field may be coded as a coded field. Likewise, an encoder may encode frames of progressive source content in two ways: a frame of progressive source content may be coded into a coded frame or a pair of coded fields. A field pair or a complementary field pair may be defined as two fields next to each other in decoding and/or output order, having opposite parity (i.e. one being a top field and another being a bottom field) and neither belonging to any other complementary field pair. Some video coding standards or schemes allow mixing of coded frames and coded fields in the same coded video sequence. Moreover, predicting a coded field from a field in a coded frame and/or predicting a coded frame for a complementary field pair (coded as fields) may be enabled in encoding and/or decoding.

A partitioning may be defined as a division of a set into subsets such that each element of the set is in exactly one of the subsets. A picture partitioning may be defined as a division of a picture into smaller non-overlapping units. A block partitioning may be defined as a division of a block into smaller non-overlapping units, such as sub-blocks. In some cases term block partitioning may be considered to cover multiple levels of partitioning, for example partitioning of a picture into slices, and partitioning of each slice into smaller units, such as macroblocks of H.264/AVC. It is noted that the same unit, such as a picture, may have more than one partitioning. For example, a coding unit of HEVC may be partitioned into prediction units and separately by another quadtree into transform units.

A coded picture is a coded representation of a picture.

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighbouring macroblock or CU may be regarded as unavailable for intra prediction, if the neighbouring macroblock or CU resides in a different slice.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

When describing the operation of HEVC, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples.

In some video codecs, such as High Efficiency Video Coding (HEVC) codec, video pictures are divided into coding units (CU) covering the area of the picture. A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. A CU with the maximum allowed size may be named as LCU (largest coding unit) or coding tree unit (CTU) and the video picture is divided into non-overlapping LCUs. An LCU can be further split into a combination of smaller CUs, e.g. by recursively splitting the LCU and resultant CUs. Each resulting CU typically has at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It is typically signaled at CU level whether prediction error coding is applied or not for each CU. In the case there is no prediction error residual associated with the CU, it can be considered there are no TUs for the said CU. The division of the image into CUs, and division of CUs into PUs and TUs is typically signaled in the bitstream allowing the decoder to reproduce the intended structure of these units.

In the HEVC standard, a picture can be partitioned in tiles, which are rectangular and contain an integer number of CTUs. In the HEVC standard, the partitioning to tiles forms a grid that may be characterized by a list of tile column widths (in CTUs) and a list of tile row heights (in CTUs). Tiles are ordered in the bitstream consecutively in the raster scan order of the tile grid. A tile may contain an integer number of slices.

In the HEVC, a slice consists of an integer number of CTUs. The CTUs are scanned in the raster scan order of CTUs within tiles or within a picture, if tiles are not in use. A slice may contain an integer number of tiles or a slice can be contained in a tile. Within a CTU, the CUs have a specific scan order.

In HEVC, a slice may be defined as an integer number of coding tree units contained in one independent slice segment and all subsequent dependent slice segments (if any) that precede the next independent slice segment (if any) within the same access unit. An independent slice segment may be defined as a slice segment for which the values of the syntax elements of the slice segment header are not inferred from the values for a preceding slice segment. A dependent slice segment may be defined as a slice segment for which the values of some syntax elements of the slice segment header are inferred from the values for the preceding independent slice segment in decoding order. In other words, only the independent slice segment may have a "full" slice header. An independent slice segment may be conveyed in one NAL unit (without other slice segments in the same NAL unit) and likewise a dependent slice segment may be conveyed in one NAL unit (without other slice segments in the same NAL unit).

In HEVC, a coded slice segment may be considered to comprise a slice segment header and slice segment data. A slice segment header may be defined as part of a coded slice segment containing the data elements pertaining to the first or all coding tree units represented in the slice segment. A slice header may be defined as the slice segment header of the independent slice segment that is a current slice segment or the most recent independent slice segment that precedes a current dependent slice segment in decoding order. Slice segment data may comprise an integer number of coding tree unit syntax structures.

In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring macroblock or CU may be regarded as unavailable for intra prediction, if the neighboring macroblock or CU resides in a different slice.

The elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures.

A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC, the NAL unit header indicates the type of the NAL unit and whether a coded slice contained in the NAL unit is a part of a reference picture or a non-reference picture. H.264/AVC includes a 2-bit nal_ref_idc syntax element, which when equal to 0 indicates that a coded slice contained in the NAL unit is a part of a non-reference picture and when greater than 0 indicates that a coded slice contained in the NAL unit is a part of a reference picture. The NAL unit header for SVC and MVC NAL units may additionally contain various indications related to the scalability and multiview hierarchy.

In HEVC, a two-byte NAL unit header is used for all specified NAL unit types. The NAL unit header contains one reserved bit, a six-bit NAL unit type indication (called nal_unit_type), a six-bit reserved field (called nuh_layer_id) and a three-bit temporal_id_plus1 indication for temporal level. The temporal_id_plus1 syntax element may be regarded as a temporal identifier for the NAL unit, and a zero-based TemporalId variable may be derived as follows: TemporalId=temporal_id_plus1−1. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to TID does not use any picture having a TemporalId greater than TID as inter prediction reference. A sub-layer or a temporal sub-layer may be defined to be a temporal scalable layer of a temporal scalable bitstream, consisting of VCL NAL units with a particular value of the TemporalId variable and the associated non-VCL NAL units. Without loss of generality, in some example embodiments a variable LayerId is derived from the value of nuh_layer_id for example as follows: LayerId=nuh_layer_id. In the following, layer identifier, LayerId, nuh_layer_id and layer_id are used interchangeably unless otherwise indicated.

In HEVC extensions nuh_layer_id and/or similar syntax elements in NAL unit header carries scalability layer information. For example, the LayerId value nuh_layer_id and/or similar syntax elements may be mapped to values of variables or syntax elements describing different scalability dimensions.

NAL units can be categorized into Video Coding Layer (VCL) NAL units and non-VCL NAL units. VCL NAL units are typically coded slice NAL units. In H.264/AVC, coded slice NAL units contain syntax elements representing one or more coded macroblocks, each of which corresponds to a block of samples in the uncompressed picture. In HEVC, coded slice NAL units contain syntax elements representing one or more CU.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. Examples of parameters that are required to be unchanged within a coded video sequence in many coding systems and hence included in a sequence parameter set are the width and height of the pictures included in the coded video sequence. In addition to the parameters that may be needed by the decoding process, the sequence parameter set may optionally contain video usability information (VUI), which includes parameters that may be important for buffering, picture output timing, rendering, and resource reservation. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header. A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. VPS may be considered to comprise two parts, the base VPS and a VPS extension, where the VPS extension may be optionally present.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

In HEVC, there are two types of SEI NAL units, namely the suffix SEI NAL unit and the prefix SET NAL unit, having a different nal_unit_type value from each other. The SET message(s) contained in a suffix SEI NAL unit are associated with the VCL NAL unit preceding, in decoding order, the suffix SEI NAL unit. The SEI message(s) contained in a prefix SEI NAL unit are associated with the VCL NAL unit following, in decoding order, the prefix SEI NAL unit.

In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units.

It may be required that coded pictures appear in certain order within an access unit. For example, a coded picture with nuh_layer_id equal to nuhLayerIdA may be required to precede, in decoding order, all coded pictures with nuh_layer_id greater than nuhLayerIdA in the same access unit. An AU typically contains all the coded pictures that represent the same output time and/or capturing time.

A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream.

A byte stream format has been specified in H.264/AVC and HEVC for transmission or storage environments that do not provide framing structures. The byte stream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to, for example, enable straightforward gateway operation between packet- and stream-oriented systems, start code emulation prevention may always be performed regardless of whether the byte stream format is in use or not. The bit order for the byte stream format may be specified to start with the most significant bit (MSB) of the first byte, proceed to the least significant bit (LSB) of the first byte, followed by the MSB of the second byte, etc. The byte stream format may be considered to consist of a sequence of byte stream NAL unit syntax structures. Each byte stream NAL unit syntax structure may be considered to comprise one start code prefix followed by one NAL unit syntax structure, as well as trailing and/or heading padding bits and/or bytes.

A motion-constrained tile set (MCTS) is such a set of one or more tiles that the inter prediction process is constrained in encoding such that no sample value outside the motion-constrained tile set, and no sample value at a fractional sample position that is derived using one or more sample values outside the motion-constrained tile set, is used for inter prediction of any sample within the motion-constrained tile set. An MCTS may be required to be rectangular. Additionally, the encoding of an MCTS is constrained in a manner that motion vector candidates are not derived from blocks outside the MCTS. This may be enforced by turning off temporal motion vector prediction of HEVC, or by disallowing the encoder to use the TMVP candidate or any motion vector prediction candidate following the TMVP candidate in the merge or AMVP candidate list for PUs located directly left of the right tile boundary of the MCTS except the last one at the bottom right of the MCTS.

Note that sample locations used in inter prediction may be saturated so that a location that would be outside the picture otherwise is saturated to point to the corresponding boundary sample of the picture. Hence, if a tile boundary is also a picture boundary, motion vectors may effectively cross that boundary or a motion vector may effectively cause fractional sample interpolation that would refer to a location outside that boundary, since the sample locations are saturated onto the boundary. However, if tiles may be re-located in a tile merging operation (see e.g. embodiments of the present invention), encoders generating MCTSs may apply motion constraints to all tile boundaries of the MCTS, including picture boundaries.

The temporal motion-constrained tile sets SEI message of HEVC can be used to indicate the presence of motion-constrained tile sets in the bitstream.

A motion-constrained picture is such that the inter prediction process is constrained in encoding such that no sample value outside the picture, and no sample value at a fractional sample position that is derived using one or more sample values outside the picture, would be used for inter prediction of any sample within the picture and/or sample locations used for prediction need not be saturated to be within picture boundaries.

It may be considered that in stereoscopic or two-view video, one video sequence or view is presented for the left eye while a parallel view is presented for the right eye. More than two parallel views may be needed for applications which enable viewpoint switching or for autostereoscopic displays which may present a large number of views simultaneously and let the viewers to observe the content from different viewpoints.

A view may be defined as a sequence of pictures representing one camera or viewpoint. The pictures representing a view may also be called view components. In other words, a view component may be defined as a coded representation of a view in a single access unit. In multiview video coding, more than one view are coded in a bitstream. Since views are typically intended to be displayed on stereoscopic or multiview autostereoscopic display or to be used for other 3D arrangements, they typically represent the same scene and are content-wise partly overlapping although representing different viewpoints to the content. Hence, inter-view prediction may be utilized in multiview video coding to take advantage of inter-view correlation and improve compression efficiency. One way to realize inter-view prediction is to include one or more decoded pictures of one or more other views in the reference picture list(s) of a picture being coded or decoded residing within a first view. View scalability may refer to such multiview video coding or multiview video bitstreams, which enable removal or omission of one or more coded views, while the resulting bitstream remains conforming and represents video with a smaller number of views than originally.

Frame packing may be defined to comprise arranging more than one input picture, which may be referred to as (input) constituent frames, into an output picture. In general, frame packing is not limited to any particular type of constituent frames or the constituent frames need not have a particular relation with each other. In many cases, frame packing is used for arranging constituent frames of a stereoscopic video clip into a single picture sequence, as explained in more details in the next paragraph. The arranging may include placing the input pictures in spatially non-overlapping areas within the output picture. For example, in a side-by-side arrangement, two input pictures are placed within an output picture horizontally adjacently to each other. The arranging may also include partitioning of one or more input pictures into two or more constituent frame partitions and placing the constituent frame partitions in spatially non-overlapping areas within the output picture. The output picture or a sequence of frame-packed output pictures may be encoded into a bitstream e.g. by a video encoder. The bitstream may be decoded e.g. by a video decoder. The decoder or a post-processing operation after decoding may extract the decoded constituent frames from the decoded picture(s) e.g. for displaying.

In frame-compatible stereoscopic video (a.k.a. frame packing of stereoscopic video), a spatial packing of a stereo pair into a single frame is performed at the encoder side as a pre-processing step for encoding and then the frame-packed frames are encoded with a conventional 2D video coding scheme. The output frames produced by the decoder contain constituent frames of a stereo pair.

In a typical operation mode, the spatial resolution of the original frames of each view and the packaged single frame have the same resolution. In this case the encoder down-samples the two views of the stereoscopic video before the packing operation. The spatial packing may use for example a side-by-side or top-bottom format, and the downsampling should be performed accordingly.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it. The term requesting locator may be defined to an identifier that can be used to request a resource, such as a file or a segment. A requesting locator may, for example, be a URL or specifically an HTTP URL. A client may use a requesting locator with a communication protocol, such as HTTP, to request a resource from a server or a sender.

Available media file format standards include ISO base media file format (ISO/IEC 14496-12, which may be abbreviated ISOBMFF), MPEG-4 file format (ISO/IEC 14496-14, also known as the MP4 format), file format for NAL unit structured video (ISO/IEC 14496-15) and 3GPP file format (3GPP TS 26.244, also known as the 3GP format). ISOBMFF is the base for derivation of all the above-mentioned file formats (excluding the ISOBMFF itself).

Some concepts, structures, and specifications of ISOBMFF are described below as an example of a container file format, based on which some embodiments may be implemented. The aspects of the invention are not limited to ISOBMFF, but rather the description is given for one possible basis on top of which the invention may be partly or fully realized.

A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO family of file formats, a file includes media data and metadata that are encapsulated into boxes. Each box is identified by a four character code (4CC) and starts with a header which informs about the type and size of the box.

In files conforming to the ISO base media file format, the media data may be provided in a media data 'mdat' box and the movie 'moov' box may be used to enclose the metadata. In some cases, for a file to be operable, both of the 'mdat' and 'moov' boxes may be required to be present. The movie 'moov' box may include one or more tracks, and each track may reside in one corresponding track 'trak' box. A track may be one of the many types, including a media track that refers to samples formatted according to a media compression format (and its encapsulation to the ISO base media file format). A track may be regarded as a logical channel.

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

In some examples, the media samples for the movie fragments may reside in an mdat box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which is a contiguous run of samples for that track (and hence are similar to chunks). Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISOBMFF specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

The TrackBox ('trak' box) includes in its hierarchy of boxes the SampleDescriptionBox, which gives detailed information about the coding type used, and any initialization information needed for that coding. The SampleDescriptionBox contains an entry-count and as many sample entries as the entry-count indicates. The format of sample entries is track-type specific but derived from generic classes (e.g. VisualSampleEntry, AudioSampleEntry). Which type of sample entry form is used for derivation of the track-type specific sample entry format is determined by the media handler of the track.

The track reference mechanism can be used to associate tracks with each other. The TrackReferenceBox includes box(es), each of which provides a reference from the containing track to a set of other tracks. These references are labeled through the box type (i.e. the four-character code of the box) of the contained box(es).

The ISO Base Media File Format contains three mechanisms for timed metadata that can be associated with particular samples: sample groups, timed metadata tracks, and sample auxiliary information. Derived specification may provide similar functionality with one or more of these three mechanisms.

A sample grouping in the ISO base media file format and its derivatives, such as the AVC file format and the SVC file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox (sbgp box) represents the assignment of samples to sample groups; and (2) a SampleGroupDescriptionBox (sgpd box) contains a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that can be used e.g. to indicate a sub-type of the grouping.

In ISOBMFF, a Track group enables grouping of tracks based on certain characteristics or the tracks within a group have a particular relationship. Track grouping, however, does not allow any image items in the group.

The syntax of TrackGroupBox in ISOBMFF is as follows:

```
aligned(8) class TrackGroupBox extends Box('trgr') {
}
aligned(8) class TrackGroupTypeBox(unsigned int(32) track_group_type)
extends
FullBox(track_group_type, version = 0, flags = 0)
{
    unsigned int(32) track _group_id;
    // the remaining data may be specified for a particular track group type
}
``` track_group_type indicates the grouping_type and may be set to a value, or a value registered, or a value from a derived specification or registration. Example value include 'msrc' which indicates that this track belongs to a multi-source presentation. The tracks that have the same value of track_group_id within a TrackGroupTypeBox of track_group_type 'msrc' are mapped as being originated from the same source. For example, a recording of a video telephony call may have both audio and video for both participants, and the value of track_group_id associated with the audio track and the video track of one participant differs from value of track_group_id associated with the tracks of the other participant. The pair of track_group_id and track_group_type identifies a track group within the file. The tracks that contain a particular TrackGroupTypeBox having the same value of track_group_id and track_group_type belong to the same track group.

The Entity grouping is similar to track grouping but enables grouping of both tracks and image items in the same group. The syntax of EntityToGroupBox in ISOBMFF is as follows:

```
aligned(8) class EntityToGroupBox(grouping_type, version, flags)
extends FullBox(grouping_type, version, flags) {
    unsigned int(32) group id;
    unsigned int(32) num entities in group;
    for(i=0; i<num_entities_in_group; i++)
        unsigned int(32) entity id;
}
``` group_id is a non-negative integer assigned to the particular grouping that may not be equal to any group_id value of any other EntityToGroupBox, any item_ID value of the hierarchy level (file, movie. or track) that contains the GroupsListBox, or any track_ID value (when the GroupsListBox is contained in the file level). num_entities_in_group specifies the number of entity_id values mapped to this entity group. entity_id is resolved to an item, when an item with item_ID equal to entity_id is present in the hierarchy level (file, movie or track) that contains the GroupsListBox, or to a track, when a track with track_ID equal to entity_id is present and the GroupsListBox is contained in the file level.

Files conforming to the ISOBMFF may contain any non-timed objects, referred to as items, meta items, or metadata items, in a meta box (four-character code: 'meta'). While the name of the meta box refers to metadata, items can generally contain metadata or media data. The meta box may reside at the top level of the file, within a movie box (four-character code: 'moov'), and within a track box (four-character code: 'trak'), but at most one meta box may occur at each of the file level, movie level, or track level. The meta box may be required to contain a HandlerBox ('hdlr') box indicating the structure or format of the 'meta' box contents. The meta box may list and characterize any number of items that can be referred and each one of them can be associated with a file name and are uniquely identified with the filef by item identifier (item_id) which is an integer value. The metadata items may be for example stored in the Item Data Box ('idat') box of the meta box or in an 'mdat' box or reside in a separate file. If the metadata is located external to the file then its location may be declared by the DataInformationBox (four-character code: 'dinf'). In the specific case that the metadata is formatted using eXtensible Markup Language (XML) syntax and is required to be stored directly in the MetaBox, the metadata may be encapsulated into either the XMLBox (four-character code: 'xml') or the BinaryXMLBox (four-character code: 'bxml'). An item may be stored as a contiguous byte range, or it may be stored in several extents, each being a contiguous byte range. In other words, items may be stored fragmented into extents, e.g. to enable interleaving. An extent is a contiguous subset of the bytes of the resource. The resource can be formed by concatenating the extents. The ItemPropertiesBox enables the association of any item with an ordered set of item properties. Item properties may be regarded as small data records. The ItemPropertiesBox consists of two parts: ItemPropertyContainerBox that contains an implicitly indexed list of item properties, and one or more ItemPropertyAssociationBox(es) that associate items with item properties.

The restricted video ('resv') sample entry and mechanism has been specified for the ISOBMFF in order to handle situations where the file author requires certain actions on the player or renderer after decoding of a visual track. Players not recognizing or not capable of processing the required actions are stopped from decoding or rendering the restricted video tracks. The 'resv' sample entry mechanism applies to any type of video codec. A RestrictedSchemeInfoBox is present in the sample entry of 'resv' tracks and comprises a OriginalFormatBox, SchemeTypeBox, and SchemeInformationBox. The original sample entry type that would have been unless the 'resv' sample entry type were used is contained in the OriginalFormatBox. The SchemeTypeBox provides an indication which type of processing is required in the player to process the video. The SchemeInformationBox comprises further information of the required processing. The scheme type may impose requirements on the contents of the SchemeInformationBox. For example, the stereo video scheme indicated in the SchemeTypeBox indicates that when decoded frames either contain a representation of two spatially packed constituent frames that form a stereo pair (frame packing) or only one view of a stereo pair (left and right views in different tracks). StereoVideoBox may be contained in SchemeInformationBox to provide further information e.g. on which type of frame packing arrangement has been used (e.g. side-by-side or top-bottom).

The Matroska file format is capable of (but not limited to) storing any of video, audio, picture, or subtitle tracks in one file. Matroska may be used as a basis format for derived file formats, such as WebM. Matroska uses Extensible Binary Meta Language (EBML) as basis. EBML specifies a binary and octet (byte) aligned format inspired by the principle of XML. EBML itself is a generalized description of the technique of binary markup. A Matroska file consists of Elements that make up an EBML "document." Elements incorporate an Element ID, a descriptor for the size of the element, and the binary data itself. Elements can be nested. A Segment Element of Matroska is a container for other top-level (level 1) elements. A Matroska file may comprise (but is not limited to be composed of) one Segment. Multimedia data in Matroska files is organized in Clusters (or Cluster Elements), each containing typically a few seconds of multimedia data. A Cluster comprises BlockGroup elements, which in turn comprise Block Elements. A Cues Element comprises metadata which may assist in random access or seeking and may include file pointers or respective timestamps for seek points.

Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. Adaptive HTTP streaming (AHS) was first standardized in Release 9 of 3rd Generation Partnership Project (3GPP) packet-switched streaming (PSS) service (3GPP TS 26.234 Release 9: "Transparent end-to-end packet-switched streaming service (PSS); protocols and codecs"). MPEG took 3GPP AHS Release 9 as a starting point for the MPEG DASH standard (ISO/IEC 23009-1: "Dynamic adaptive streaming over HTTP (DASH)-Part 1: Media presentation description and segment formats," International Standard, $2^{nd}$ Edition, 2014). MPEG DASH and 3GP-DASH are technically close to each other and may therefore be collectively referred to as DASH. Some concepts, formats, and operations of DASH are described below as an example of a video streaming system, wherein the embodiments may be implemented. The aspects of the invention are not limited to DASH, but rather the description is given for one possible basis on top of which the invention may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. The MDP provides the necessary information for clients to establish a dynamic adaptive streaming over HTTP. The MPD contains information describing media presentation, such as an HTTP-uniform resource locator (URL) of each Segment to make GET Segment request. To play the content, the DASH client may obtain the MPD e.g. by using HTTP, email, thumb drive, broadcast, or other transport methods. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using e.g. HTTP GET requests. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

Figure 8:
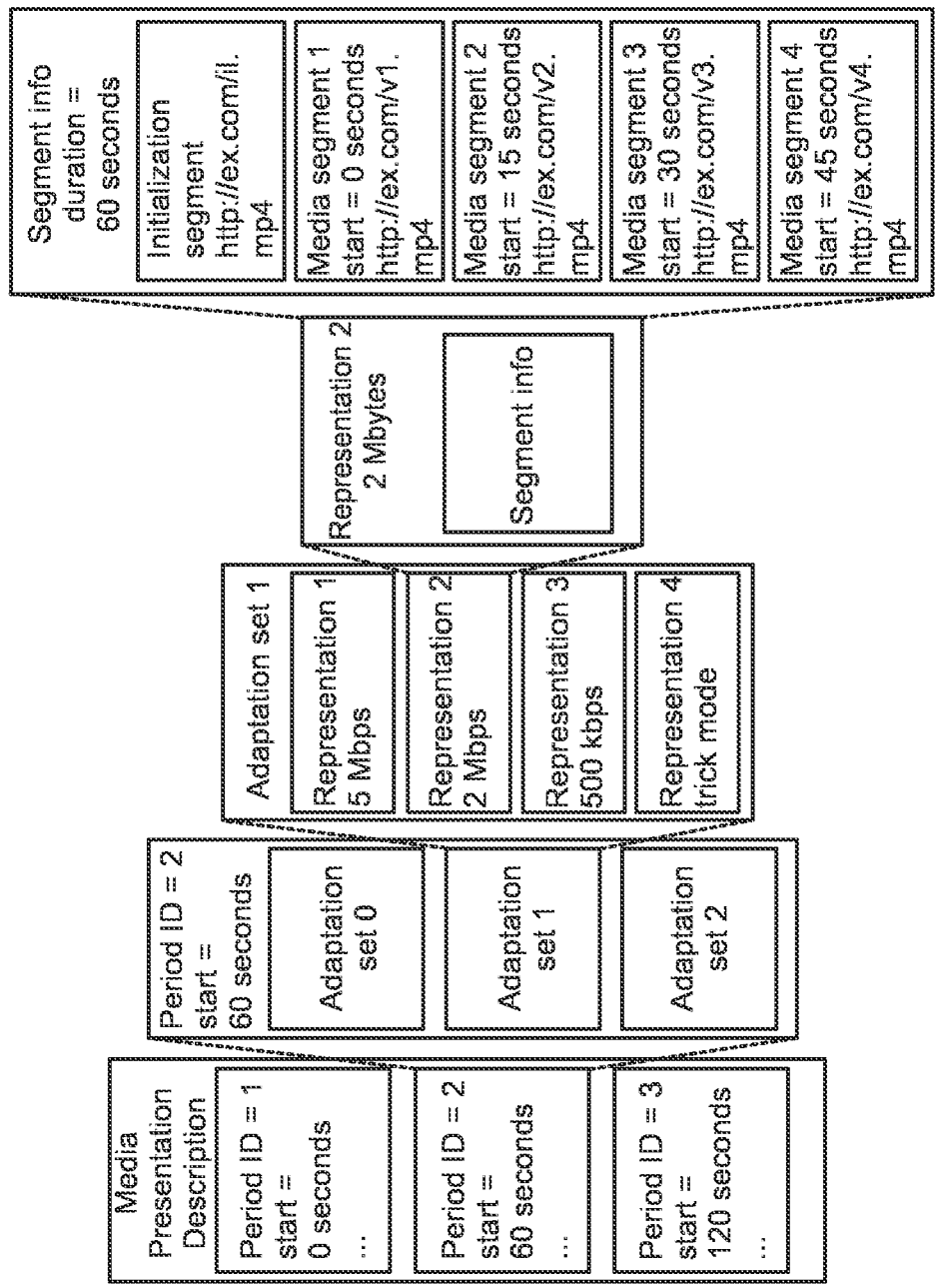
FIG. 8 shows an example of a hierarchical data model used in Dynamic adaptive streaming over HTTP (DASH)

In DASH, hierarchical data model is used to structure media presentation as shown in FIG. 8. A media presentation consists of a sequence of one or more Periods, each Period contains one or more Groups, each Group contains one or more Adaptation Sets, each Adaptation Sets contains one or more Representations, each Representation consists of one or more Segments. A Representation is one of the alternative choices of the media content or a subset thereof typically differing by the encoding choice, e.g. by bitrate, resolution, language, codec, etc. The Segment contains certain duration of media data, and metadata to decode and present the included media content. A Segment is identified by a URI and can typically be requested by a HTTP GET request. A Segment may be defined as a unit of data associated with an HTTP-URL and optionally a byte range that are specified by an MPD.

The DASH MPD complies with Extensible Markup Language (XML) and is therefore specified through elements and attributes as defined in XML. The MPD may be specified using the following conventions: Elements in an XML document may be identified by an upper-case first letter and may appear in bold face as Element. To express that an element Element1 is contained in another element Element2, one may write Element2.Element1. If an element's name consists of two or more combined words, camel-casing may be used, e.g. ImportantElement. Elements may be present either exactly once, or the minimum and maximum occurrence may be defined by <minOccurs> . . . <maxOccurs>. Attributes in an XML document may be identified by a lower-case first letter as well as they may be preceded by a '@'-sign, e.g. @attribute. To point to a specific attribute @attribute contained in an element Element, one may write Element@attribute. If an attribute's name consists of two or more combined words, camel-casing may be used after the first word, e.g. @veryImportantAttribute. Attributes may have assigned a status in the XML as mandatory (M), optional (O), optional with default value (OD) and conditionally mandatory (CM).

In DASH, an independent representation may be defined as a representation that can be processed independently of any other representations. An independent representation may be understood to comprise an independent bitstream or an independent layer of a bitstream. A dependent representation may be defined as a representation for which Segments from its complementary representations are necessary for presentation and/or decoding of the contained media content components. A dependent representation may be understood to comprise e.g. a predicted layer of a scalable bitstream. A complementary representation may be defined as a representation which complements at least one dependent representation. A complementary representation may be an independent representation or a dependent representation. Dependent Representations may be described by a Representation element that contains a @dependencyId attribute. Dependent Representations can be regarded as regular Representations except that they depend on a set of complementary Representations for decoding and/or presentation. The @dependencyId contains the values of the @id attribute of all the complementary Representations, i.e. Representations that are necessary to present and/or decode the media content components contained in this dependent Representation.

In the context of DASH, the following definitions may be used: A media content component or a media component may be defined as one continuous component of the media content with an assigned media component type that can be encoded individually into a media stream. Media content may be defined as one media content period or a contiguous sequence of media content periods. Media content component type may be defined as a single type of media content such as audio, video, or text. A media stream may be defined as an encoded version of a media content component.

An Initialization Segment may be defined as a Segment containing metadata that is necessary to present the media streams encapsulated in Media Segments. In ISOBMFF based segment formats, an Initialization Segment may comprise the Movie Box ('moov') which might not include metadata for any samples, i.e. any metadata for samples is provided in 'moof' boxes.

A Media Segment contains certain duration of media data for playback at a normal speed, such duration is referred as Media Segment duration or Segment duration. The content producer or service provider may select the Segment duration according to the desired characteristics of the service. For example, a relatively short Segment duration may be used in a live service to achieve a short end-to-end latency. The reason is that Segment duration is typically a lower bound on the end-to-end latency perceived by a DASH client since a Segment is a discrete unit of generating media data for DASH. Content generation is typically done such a manner that a whole Segment of media data is made available for a server. Furthermore, many client implementations use a Segment as the unit for GET requests. Thus, in typical arrangements for live services a Segment can be requested by a DASH client only when the whole duration of Media Segment is available as well as encoded and encapsulated into a Segment. For on-demand service, different strategies of selecting Segment duration may be used.

DASH supports rate adaptation by dynamically requesting Media Segments from different Representations within an Adaptation Set to match varying network bandwidth. When a DASH client switches up/down Representation, coding dependencies within Representation have to be taken into account. A Representation switch may only happen at a random access point (RAP), which is typically used in video coding techniques such as H.264/AVC. In DASH, a more general concept named Stream Access Point (SAP) is introduced to provide a codec-independent solution for accessing a Representation and switching between Representations. In DASH, a SAP is specified as a position in a Representation that enables playback of a media stream to be started using only the information contained in Representation data starting from that position onwards (preceded by initialising data in the Initialisation Segment, if any). Hence, Representation switching can be performed in SAP.

Several types of SAP have been specified, including the following. SAP Type 1 corresponds to what is known in some coding schemes as a "Closed GOP random access point" (in which all pictures, in decoding order, can be correctly decoded, resulting in a continuous time sequence of correctly decoded pictures with no gaps) and in addition the first picture in decoding order is also the first picture in presentation order. SAP Type 2 corresponds to what is known in some coding schemes as a "Closed GOP random access point" (in which all pictures, in decoding order, can be correctly decoded, resulting in a continuous time sequence of correctly decoded pictures with no gaps), for which the first picture in decoding order may not be the first picture in presentation order. SAP Type 3 corresponds to what is known in some coding schemes as an "Open GOP random access point", in which there may be some pictures in decoding order that cannot be correctly decoded and have presentation times earlier than intra-coded picture associated with the SAP.

A stream access point (SAP) sample group as specified in ISOBMFF identifies samples as being of the indicated SAP type. The grouping_type_parameter for the SAP sample group comprises the fields target_layers and layer_id_method_idc. target_layers specifies the target layers for the indicated SAPs. The semantics of target_layers may depend on the value of layer_id_method_idc, which specifies the semantics of target_layers. layer_id_method_idc equal to 0 specifies that the target layers consist of all the layers represented by the track. The sample group description entry for the SAP sample group comprises the fields dependent_flag and SAP_type. dependent_flag may be required to be 0 for non-layered media. dependent_flag equal to 1 specifies that the reference layers, if any, for predicting the target layers may have to be decoded for accessing a sample of this sample group. dependent_flag equal to 0 specifies that the reference layers, if any, for predicting the target layers need not be decoded for accessing any SAP of this sample group. sap_type values in the range of 1 to 6, inclusive, specify the SAP type, of the associated samples.

A sync sample may be defined as a sample in a track that is of a SAP of type 1 or 2. Sync samples may be indicated with SyncSampleBox or by sample_is_non_sync_sample equal to 0 in the signaling for track fragments.

A Segment may further be partitioned into Subsegments e.g. to enable downloading segments in multiple parts. Subsegments may be required to contain complete access units. Subsegments may be indexed by Segment Index box, which contains information to map presentation time range and byte range for each Subsegment. The Segment Index box may also describe subsegments and stream access points in the segment by signaling their durations and byte offsets. A DASH client may use the information obtained from Segment Index box(es) to make a HTTP GET request for a specific Subsegment using byte range HTTP request. If relatively long Segment duration is used, then Subsegments may be used to keep the size of HTTP responses reasonable and flexible for bitrate adaptation. The indexing information of a segment may be put in the single box at the beginning of that segment, or spread among many indexing boxes in the segment. Different methods of spreading are possible, such as hierarchical, daisy chain, and hybrid. This technique may avoid adding a large box at the beginning of the segment and therefore may prevent a possible initial download delay.

It may be required that for any dependent Representation X that depends on complementary Representation Y, the m-th Subsegment of X and the n-th Subsegment of Y shall be non-overlapping whenever m is not equal to n. It may be required that for dependent Representations the concatenation of the Initialization Segment with the sequence of Subsegments of the dependent Representations, each being preceded by the corresponding Subsegment of each of the complementary Representations in order as provided in the @dependencyId attribute shall represent a conforming Subsegment sequence conforming to the media format as specified in the @mimeType attribute for this dependent Representation.

Track references of ISOBMFF can be reflected in the list of four-character codes in the @associationType attribute of DASH MPD that is mapped to the list of Representation@id values given in the @associationId in a one to one manner. These attributes may be used for linking media Representations with metadata Representations.

MPEG-DASH defines segment-container formats for both ISOBMFF and MPEG-2 Transport Streams. Other specifications may specify segment formats based on other container formats. For example, a segment format based on Matroska container file format has been proposed and may be summarized as follows. When Matroska files are carried as DASH segments or alike, the association of DASH units and Matroska units may be specified as follows. A subsegment (of DASH) may be defined as one or more consecutive Clusters of Matroska-encapsulated content. An Initialization Segment of DASH may be required to comprise the EBML header, Segment header (of Matroska), Segment Information (of Matroska) and Tracks, and may optionally comprise other level1 elements and padding. A Segment Index of DASH may comprise a Cues Element of Matroska.

MPEG Omnidirectional Media Format (ISO/IEC 23090-2) is a virtual reality (VR) system standard. OMAF defines a media format (comprising both file format derived from ISOBMFF and streaming formats for DASH and MPEG Media Transport). OMAF version 1 supports 360° video, images, and audio, as well as the associated timed text and facilitates three degrees of freedom (3DoF) content consumption, meaning that a viewport can be selected with any azimuth and elevation range and tilt angle that are covered by the omnidirectional content but the content is not adapted to any translational changes of the viewing position. The viewport-dependent streaming scenarios described further below have also been designed for 3DoF although could potentially be adapted to a different number of degrees of freedom.

Standardization of OMAF version 2 is ongoing. OMAF v2 is planned to include features like support for multiple viewpoints, overlays, sub-picture compositions, and six degrees of freedom with a viewing space limited roughly to upper-body movements only.

OMAF is discussed with reference to FIG. 3. A real-world audio-visual scene (A) may be captured 220 by audio sensors as well as a set of cameras or a camera device with multiple lenses and sensors. The acquisition results in a set of digital image/video (Bi) and audio (Ba) signals. The cameras/lenses may cover all directions around the center point of the camera set or camera device, thus the name of 360-degree video.

Audio can be captured using many different microphone configurations and stored as several different content formats, including channel-based signals, static or dynamic (i.e. moving through the 3D scene) object signals, and scene-based signals (e.g., Higher Order Ambisonics). The channel-based signals may conform to one of the loudspeaker layouts defined in CICP (Coding-Independent Code-Points). In an omnidirectional media application, the loudspeaker layout signals of the rendered immersive audio program may be binaraulized for presentation via headphones.

The images (Bi) of the same time instance are stitched, projected, and mapped 221 onto a packed picture (D).

For monoscopic 360-degree video, the input images of one time instance may be stitched to generate a projected picture representing one view. An example of image stitching, projection, and region-wise packing process for monoscopic content is illustrated with FIG. 4a. Input images (Bi) are stitched and projected onto a three-dimensional projection structure that may for example be a unit sphere. The projection structure may be considered to comprise one or more surfaces, such as plane(s) or part(s) thereof. A projection structure may be defined as three-dimensional structure consisting of one or more surface(s) on which the captured VR image/video content is projected, and from which a respective projected picture can be formed. The image data on the projection structure is further arranged onto a two-dimensional projected picture (C). The term projection may be defined as a process by which a set of input images are projected onto a projected picture. There may be a pre-defined set of representation formats of the projected picture, including for example an equirectangular projection (ERP) format and a cube map projection (CMP) format. It may be considered that the projected picture covers the entire sphere.

Optionally, a region-wise packing is then applied to map the projected picture (C) onto a packed picture (D). If the region-wise packing is not applied, the packed picture is identical to the projected picture, and this picture is given as input to image/video encoding. Otherwise, regions of the projected picture (C) are mapped onto a packed picture (D) by indicating the location, shape, and size of each region in the packed picture, and the packed picture (D) is given as input to image/video encoding. The term region-wise packing may be defined as a process by which a projected picture is mapped to a packed picture. The term packed picture may be defined as a picture that results from region-wise packing of a projected picture.

Figure 4A:
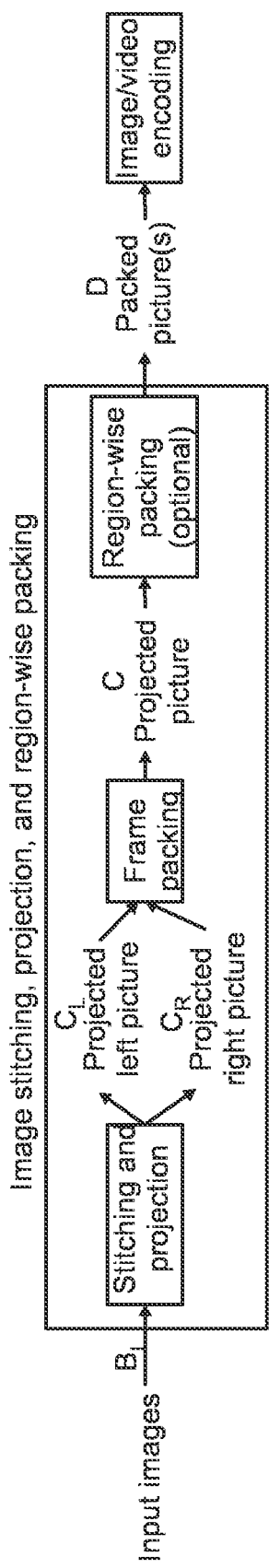
FIG. 4a shows an example of image stitching, projection and region-wise packing.

In the case of stereoscopic 360-degree video, as shown in an example of FIG. 4a, the input images of one time instance are stitched to generate a projected picture representing two views (CL, CR), one for each eye. Both views (CL, CR) can be mapped onto the same packed picture (D), and encoded by a traditional 2D video encoder. Alternatively, each view of the projected picture can be mapped to its own packed picture, in which case the image stitching, projection, and region-wise packing is performed as illustrated in FIG. 4a. A sequence of packed pictures of either the left view or the right view can be independently coded or, when using a multiview video encoder, predicted from the other view.

Figure 3:
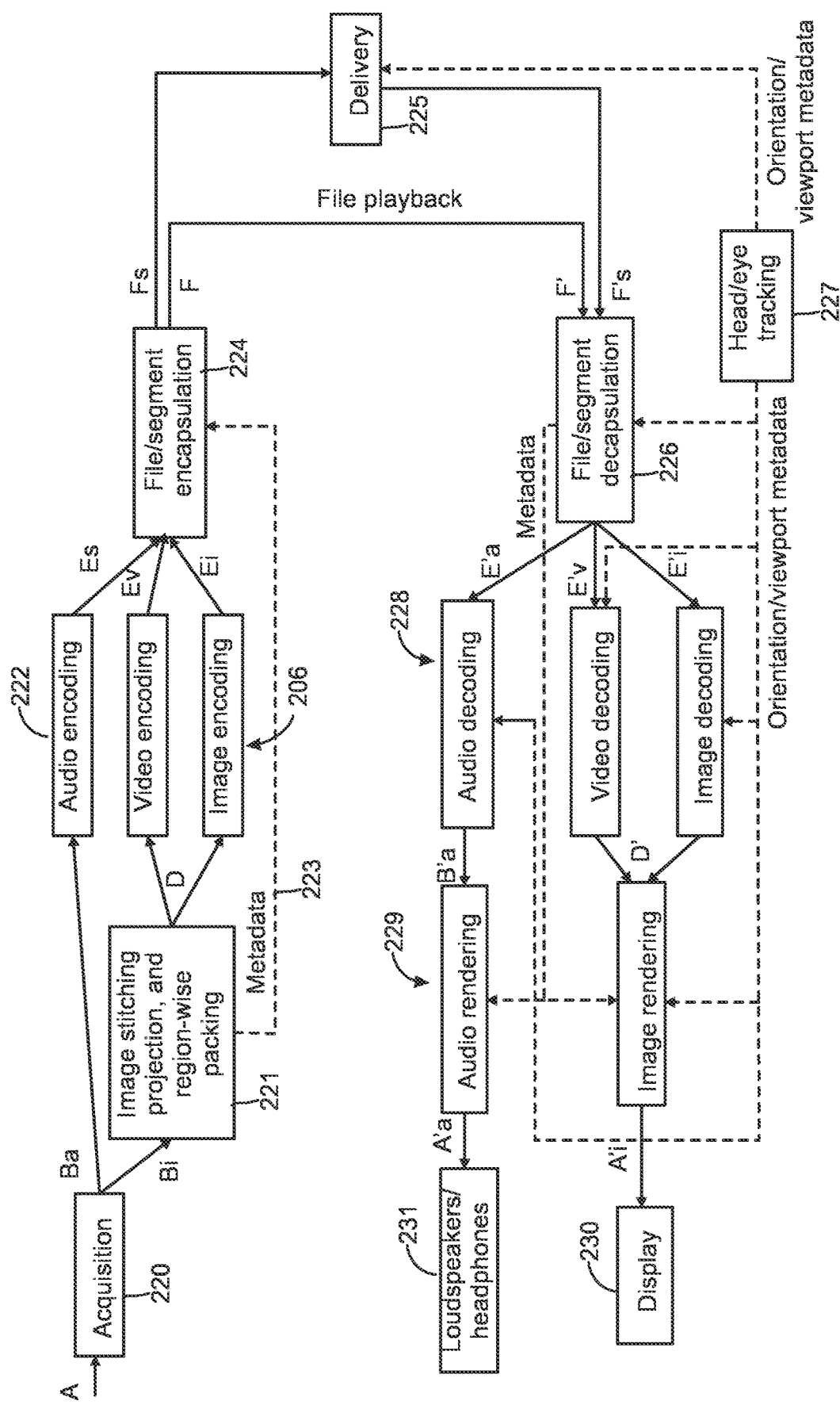
FIG. 3 illustrates image stitching, projection, and mapping processes, in accordance with an embodiment, as well as audio decoding, video decoding, image decoding, audio rendering, image rendering, and related processes, in accordance with an embodiment.

An example of image stitching, projection, and region-wise packing process for stereoscopic content where both views are mapped onto the same packed picture, as shown in FIG. 3 is described next in more detailed manner. Input images (Bi) are stitched and projected onto two three-dimensional projection structures, one for each eye. The image data on each projection structure is further arranged onto a two-dimensional projected picture (CL for left eye, CR for right eye), which covers the entire sphere. Frame packing is applied to pack the left view picture and right view picture onto the same projected picture. Optionally, region-wise packing is then applied to the pack projected picture onto a packed picture, and the packed picture (D) is given as input to image/video encoding. If the region-wise packing is not applied, the packed picture is identical to the projected picture, and this picture is given as input to image/video encoding.

The image stitching, projection, and region-wise packing process can be carried out multiple times for the same source images to create different versions of the same content, e.g. for different orientations of the projection structure. Similarly, the region-wise packing process can be performed multiple times from the same projected picture to create more than one sequence of packed pictures to be encoded.

Figure 4B:
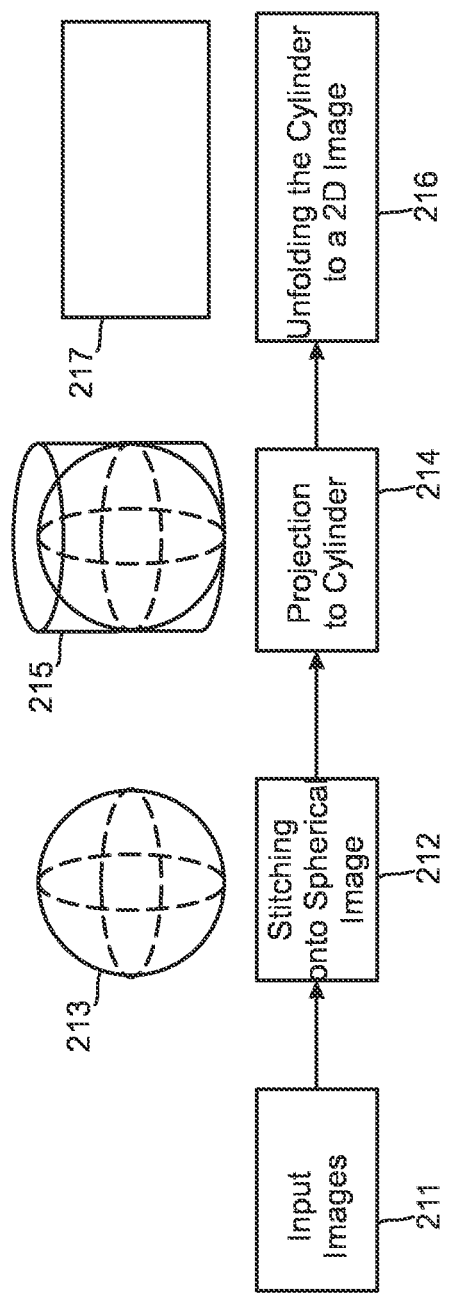
FIG. 4b shows an example of a process of forming a monoscopic equirectangular panorama picture.

360-degree panoramic content (i.e., images and video) cover horizontally the full 360-degree field-of-view around the capturing position of an imaging device. The vertical field-of-view may vary and can be e.g. 180 degrees. Panoramic image covering 360-degree field-of-view horizontally and 180-degree field-of-view vertically can be represented by a sphere that has been mapped to a two-dimensional image plane using equirectangular projection (ERP). In this case, the horizontal coordinate may be considered equivalent to a longitude, and the vertical coordinate may be considered equivalent to a latitude, with no transformation or scaling applied. The process of forming a monoscopic equirectangular panorama picture is illustrated in FIG. 4b. A set of input images, such as fisheye images of a camera array or a camera device with multiple lenses and sensors, is stitched onto a spherical image. The spherical image is further projected onto a cylinder (without the top and bottom faces). The cylinder is unfolded to form a two-dimensional projected picture. In practice one or more of the presented steps may be merged; for example, the input images may be directly projected onto a cylinder without an intermediate projection onto a sphere. The projection structure for equirectangular panorama may be considered to be a cylinder that comprises a single surface.

In general, 360-degree content can be mapped onto different types of solid geometrical structures, such as polyhedron (i.e. a three-dimensional solid object containing flat polygonal faces, straight edges and sharp corners or vertices, e.g., a cube or a pyramid), cylinder (by projecting a spherical image onto the cylinder, as described above with the equirectangular projection), cylinder (directly without projecting onto a sphere first), cone, etc. and then unwrapped to a two-dimensional image plane.

In some cases panoramic content with 360-degree horizontal field-of-view but with less than 180-degree vertical field-of-view may be considered special cases of equirectangular projection, where the polar areas of the sphere have not been mapped onto the two-dimensional image plane. In some cases a panoramic image may have less than 360-degree horizontal field-of-view and up to 180-degree vertical field-of-view, while otherwise has the characteristics of equirectangular projection format.

In 360-degree systems, a coordinate system may be defined through orthogonal coordinate axes, such as X (lateral), Y (vertical, pointing upwards), and Z (back-to-front axis, pointing outwards). Rotations around the axes may be defined and may be referred to as yaw, pitch, and roll. Yaw may be defined to rotate around the Y axis, pitch around the X axis, and roll around the Z axis. Rotations may be defined to be extrinsic, i.e., around the X, Y, and Z fixed reference axes. The angles may be defined to increase clockwise when looking from the origin towards the positive end of an axis. The coordinate system specified can be used for defining the sphere coordinates, which may be referred to as azimuth ($\phi$) and elevation ($\theta$).

Global coordinate axes may be defined as coordinate axes, e.g. according to the coordinate system as discussed above, that are associated with audio, video, and images representing the same acquisition position and intended to be rendered together. The origin of the global coordinate axes is usually the same as the center point of a device or rig used for omnidirectional audio/video acquisition as well as the position of the observer's head in the three-dimensional space in which the audio and video tracks are located. In the absence of the initial viewpoint metadata, the playback may be recommended to be started using the orientation (0, 0) in (azimuth, elevation) relative to the global coordinate axes.

As mentioned above, the projection structure may be rotated relative to the global coordinate axes. The rotation may be performed for example to achieve better compression performance based on the spatial and temporal activity of the content at certain spherical parts. Alternatively or additionally, the rotation may be performed to adjust the rendering orientation for already encoded content. For example, if the horizon of the encoded content is not horizontal, it may be adjusted afterwards by indicating that the projection structure is rotated relative to the global coordinate axes. The projection orientation may be indicated as yaw, pitch, and roll angles that define the orientation of the projection structure relative to the global coordinate axes. The projection orientation may be included e.g. in a box in a sample entry of an ISOBMFF track for omnidirectional video.

360-degree panoramic content (i.e., images and video) cover horizontally (up to) the full 360-degree field-of-view around the capturing position of an imaging device. The vertical field-of-view may vary and can be e.g. 180 degrees. Panoramic image covering 360-degree field-of-view horizontally and 180-degree field-of-view vertically can be represented by a sphere that has been mapped to a two-dimensional image plane using equirectangular projection (ERP). In this case, the horizontal coordinate may be considered equivalent to a longitude, and the vertical coordinate may be considered equivalent to a latitude, with no transformation or scaling applied. In some cases panoramic content with 360-degree horizontal field-of-view but with less than 180-degree vertical field-of-view may be considered special cases of equirectangular projection, where the polar areas of the sphere have not been mapped onto the two-dimensional image plane. In some cases panoramic content may have less than 360-degree horizontal field-of-view and up to 180-degree vertical field-of-view, while otherwise have the characteristics of equirectangular projection format.

In cube map projection format, spherical video is projected onto the six faces (a.k.a. sides) of a cube. The cube map may be generated e.g. by first rendering the spherical scene six times from a viewpoint, with the views defined by a 90 degree view frustum representing each cube face. The cube sides may be frame-packed into the same frame or each cube side may be treated individually (e.g. in encoding). There are many possible orders of locating cube sides onto a frame and/or cube sides may be rotated or mirrored. The frame width and height for frame-packing may be selected to fit the cube sides "tightly" e.g. at 3×2 cube side grid, or may include unused constituent frames e.g. at 4×3 cube side grid.

A cube map can be stereoscopic. A stereoscopic cube map can e.g. be reached by re-projecting each view of a stereoscopic panorama to the cube map format.

Region-wise packing information may be encoded as metadata in or along the bitstream. For example, the packing information may comprise a region-wise mapping from a pre-defined or indicated source format to the packed picture format, e.g. from a projected picture to a packed picture, as described earlier.

Rectangular region-wise packing metadata may be described as follows:

For each region, the metadata defines a rectangle in a projected picture, the respective rectangle in the packed picture, and an optional transformation of rotation by 90, 180, or 270 degrees and/or horizontal and/or vertical mirroring. Rectangles may, for example, be indicated by the locations of the top-left corner and the bottom-right corner. The mapping may comprise resampling. As the sizes of the respective rectangles can differ in the projected and packed pictures, the mechanism infers region-wise resampling.

Among other things, region-wise packing provides signalling for the following usage scenarios:

1) Additional compression for viewport-independent projections is achieved by densifying sampling of different regions to achieve more uniformity across the sphere. For example, the top and bottom parts of ERP are oversampled, and region-wise packing can be applied to down-sample them horizontally.
2) Arranging the faces of plane-based projection formats, such as cube map projection, in an adaptive manner.
3) Generating viewport-dependent bitstreams that use viewport-independent projection formats. For example, regions of ERP or faces of CMP can have different sampling densities and the underlying projection structure can have different orientations.

4) Indicating regions of the packed pictures represented by an extractor track. This is needed when an extractor track collects tiles from bitstreams of different resolutions.

A guard band may be defined as an area in a packed picture that is not rendered but may be used to improve the rendered part of the packed picture to avoid or mitigate visual artifacts such as seams.

Referring again to FIG. 3, the OMAF allows the omission of image stitching, projection, and region-wise packing and encode the image/video data in their captured format. In this case, images (D) are considered the same as images (Bi) and a limited number of fisheye images per time instance are encoded.

For audio, the stitching process is not needed, since the captured signals are inherently immersive and omnidirectional.

The stitched images (D) are encoded 206 as coded images (Ei) or a coded video bitstream (Ev). The captured audio (Ba) is encoded 222 as an audio bitstream (Ea). The coded images, video, and/or audio are then composed 224 into a media file for file playback (F) or a sequence of an initialization segment and media segments for streaming (Fs), according to a particular media container file format. In this specification, the media container file format is the ISO base media file format. The file encapsulator 224 also includes metadata into the file or the segments, such as projection and region-wise packing information assisting in rendering the decoded packed pictures.

The metadata in the file may include:
the projection format of the projected picture,
fisheye video parameters,
the area of the spherical surface covered by the packed picture,
the orientation of the projection structure corresponding to the projected picture relative to the global coordinate axes,
region-wise packing information, and
region-wise quality ranking (optional).

Region-wise packing information may be encoded as metadata in or along the bitstream, for example as region-wise packing SEI message(s) and/or as region-wise packing boxes in a file containing the bitstream. For example, the packing information may comprise a region-wise mapping from a pre-defined or indicated source format to the packed picture format, e.g. from a projected picture to a packed picture, as described earlier. The region-wise mapping information may for example comprise for each mapped region a source rectangle (a.k.a. projected region) in the projected picture and a destination rectangle (a.k.a. packed region) in the packed picture, where samples within the source rectangle are mapped to the destination rectangle and rectangles may for example be indicated by the locations of the top-left corner and the bottom-right corner. The mapping may comprise resampling. Additionally or alternatively, the packing information may comprise one or more of the following: the orientation of the three-dimensional projection structure relative to a coordinate system, indication which projection format is used, region-wise quality ranking indicating the picture quality ranking between regions and/or first and second spatial region sequences, one or more transformation operations, such as rotation by 90, 180, or 270 degrees, horizontal mirroring, and vertical mirroring. The semantics of packing information may be specified in a manner that they are indicative for each sample location within packed regions of a decoded picture which is the respective spherical coordinate location.

The segments (Fs) may be delivered 225 using a delivery mechanism to a player.

The file that the file encapsulator outputs (F) is identical to the file that the file decapsulator inputs (F'). A file decapsulator 226 processes the file (F') or the received segments (F's) and extracts the coded bitstreams (E'a, E'v, and/or E'i) and parses the metadata. The audio, video, and/or images are then decoded 228 into decoded signals (B'a for audio, and D' for images/video). The decoded packed pictures (D') are projected 229 onto the screen of a head-mounted display or any other display device 230 based on the current viewing orientation or viewport and the projection, spherical coverage, projection structure orientation, and region-wise packing metadata parsed from the file. Likewise, decoded audio (B'a) is rendered 229, e.g. through headphones 231, according to the current viewing orientation. The current viewing orientation is determined by the head tracking and possibly also eye tracking functionality 227. Besides being used by the renderer 229 to render the appropriate part of decoded video and audio signals, the current viewing orientation may also be used the video and audio decoders 228 for decoding optimization.

The process described above is applicable to both live and on-demand use cases.

At any point of time, a video rendered by an application on a HMD or on another display device renders a portion of the 360-degree video. This portion may be defined as a viewport. A viewport may be understood as a window on the 360-degree world represented in the omnidirectional video displayed via a rendering display. According to another definition, a viewport may be defined as a part of the spherical video that is currently displayed. A viewport may be characterized by horizontal and vertical field of views (FOV or FoV).

A viewpoint may be defined as the point or space from which the user views the scene; it usually corresponds to a camera position. Slight head motion does not imply a different viewpoint. A viewing position may be defined as the position within a viewing space from which the user views the scene. A viewing space may be defined as a 3D space of viewing positions within which rendering of image and video is enabled and VR experience is valid.

An omnidirectional image (360-degree video) may be divided into several regions called tiles. The tiles may have been encoded as motion constrained tiles with different quality/resolution. A client apparatus may request the regions/tiles corresponding to a current viewport of the user with high resolution/quality. As used herein the term omnidirectional may refer to media content that has greater spatial extent than a field-of-view of a device rendering the content. Omnidirectional content may for example cover substantially 360 degrees in horizontal dimension and substantially 180 degrees in vertical dimension, but omnidirectional may also refer to content covering less than 360 degree view in horizontal direction and/or 180 degree view in vertical direction.

The client (e.g. the player) may request the whole 360-degree video/image either with uniform quality, which means a viewport independent delivery, or such that the quality of the video/image in a viewport of the user is higher than the quality of the video/image in the non-viewport part of the scene, which means a viewport dependent delivery.

In the viewport-independent streaming the (requested) 360-degree video may be encoded at different bitrates. Each encoded bitstream may be stored with, for example, ISOBMFF and then segmented based on MPEG-DASH.

The whole 360-degree video may be delivered to the client/player uniformly at the same quality.

In the viewport-dependent streaming, the (requested) 360-degree video may be divided into several regions/tiles and encoded as, for example, motion constrained tiles. Each encoded tiled bitstream may be stored with, for example, ISOBMFF and then segmented based on MPEG-DASH. The regions/tiles corresponding to the user's viewport may be delivered at high quality/resolution, whereas other parts of 360-degree video which are not within the user's viewport may be delivered at a lower quality/resolution.

A tile track may be defined as a track that contains sequences of one or more motion-constrained tile sets of a coded bitstream. Decoding of a tile track without the other tile tracks of the bitstream may require a specialized decoder, which may be e.g. required to skip absent tiles in the decoding process. An HEVC tile track specified in ISO/IEC 14496-15 enables storage of one or more temporal motion-constrained tile sets as a track. When a tile track contains tiles of an HEVC base layer, the sample entry type 'hvt1' is used. When a tile track contains tiles of a non-base layer, the sample entry type 'lht1' is used. A sample of a tile track consists of one or more complete tiles in one or more complete slice segments. A tile track is independent from any other tile track that includes VCL NAL units of the same layer as this tile track. A tile track has a 'tbas' track reference to a tile base track. The tile base track does not include VCL NAL units. A tile base track indicates the tile ordering using a 'sabt' track reference to the tile tracks. An HEVC coded picture corresponding to a sample in the tile base track can be reconstructed by collecting the coded data from the tile-aligned samples of the tracks indicated by the 'sabt' track reference in the order of the track references.

A constructed tile set track is a tile set track, e.g. a track according to ISOBMFF, containing constructors that, when executed, result into a tile set bitstream.

A constructor is a set of instructions that, when executed, results into a valid piece of sample data according to the underlying sample format.

An extractor is a constructor that, when executed, copies the sample data of an indicated byte range of an indicated sample of an indicated track. Inclusion by reference may be defined as an extractor or alike that, when executed, copies the sample data of an indicated byte range of an indicated sample of an indicated track.

A full-picture-compliant tile set {track|bitstream} is a tile set {track|bitstream} that conforms to the full-picture {track|bitstream} format. Here, the notation {optionA|optionB} illustrates alternatives, i.e. either optionA or optionB, which is selected consistently in all selections. A full-picture-compliant tile set track can be played as with any full-picture track using the parsing and decoding process of full-picture tracks. A full-picture-compliant bitstream can be decoded as with any full-picture bitstream using the decoding process of full-picture bitstreams. A full-picture track is a track representing an original bitstream (including all its tiles). A tile set bitstream is a bitstream that contains a tile set of an original bitstream but not representing the entire original bitstream. A tile set track is a track representing a tile set of an original bitstream but not representing the entire original bitstream.

A full-picture-compliant tile set track may comprise extractors as defined for HEVC. An extractor may, for example, be an in-line constructor including a slice segment header and a sample constructor extracting coded video data for a tile set from a referenced full-picture track.

An in-line constructor is a constructor that, when executed, returns the sample data that it contains. For example, an in-line constructor may comprise a set of instructions for rewriting a new slice header. The phrase in-line may be used to indicate coded data that is included in the sample of a track.

A full-picture track is a track representing an original bitstream (including all its tiles).

A NAL-unit-like structure refers to a structure with the properties of a NAL unit except that start code emulation prevention is not performed.

A pre-constructed tile set track is a tile set track containing the sample data in-line.

A tile set bitstream is a bitstream that contains a tile set of an original bitstream but not representing the entire original bitstream.

A tile set track is a track representing a tile set of an original bitstream but not representing the entire original bitstream.

Video codec may comprise an encoder that transforms the input video into a compressed representation suited for storage/transmission and a decoder that can uncompress the compressed video representation back into a viewable form. A video encoder and/or a video decoder may also be separate from each other, i.e. need not form a codec. Typically, encoder discards some information in the original video sequence in order to represent the video in a more compact form (that is, at lower bitrate). A video encoder may be used to encode an image sequence, as defined subsequently, and a video decoder may be used to decode a coded image sequence. A video encoder or an intra coding part of a video encoder or an image encoder may be used to encode an image, and a video decoder or an inter decoding part of a video decoder or an image decoder may be used to decode a coded image.

Many hybrid video encoders encode the video information in two phases. Firstly, pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate). Video codecs may also provide a transform skip mode, which the encoders may choose to use. In the transform skip mode, the prediction error is coded in a sample domain, for example by deriving a sample-wise difference value relative to certain adjacent samples and coding the sample-wise difference value with an entropy coder.

In temporal prediction, the sources of prediction are previously decoded pictures (a.k.a. reference pictures). In intra block copy (a.k.a. intra-block-copy prediction), prediction is applied similarly to temporal prediction but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

There may be different types of intra prediction modes available in a coding scheme, out of which an encoder can select and indicate the used one, e.g. on block or coding unit basis. A decoder may decode the indicated intra prediction mode and reconstruct the prediction block accordingly. For example, several angular intra prediction modes, each for different angular directions, may be available. Angular intra prediction may be considered to extrapolate the border samples of adjacent blocks along a linear prediction direction. Additionally or alternatively, a planar prediction mode may be available. Planar prediction may be considered to essentially form a prediction block, in which each sample of a prediction block may be specified to be an average of the vertically aligned sample in the adjacent sample column on the left of the current block and the horizontally aligned sample in the adjacent sample line above the current block. Additionally or alternatively, a DC prediction mode may be available, in which the prediction block is essentially an average sample value of a neighboring block or blocks.

One outcome of the coding procedure is a set of coding parameters, such as motion vectors and quantized transform coefficients. Many parameters can be entropy-coded more efficiently if they are predicted first from spatially or temporally neighbouring parameters. For example, a motion vector may be predicted from spatially adjacent motion vectors and only the difference relative to the motion vector predictor may be coded. Prediction of coding parameters and intra prediction may be collectively referred to as in-picture prediction.

A video codec comprises an encoder that transforms an input video into a compressed representation suited for storage/transmission and a decoder that can uncompress the compressed video representation back into a viewable form. Typically, the encoder discards and/or loses some information in the original video sequence in order to represent the video in a more compact form (that is, at lower bitrate).

Figure 1B:
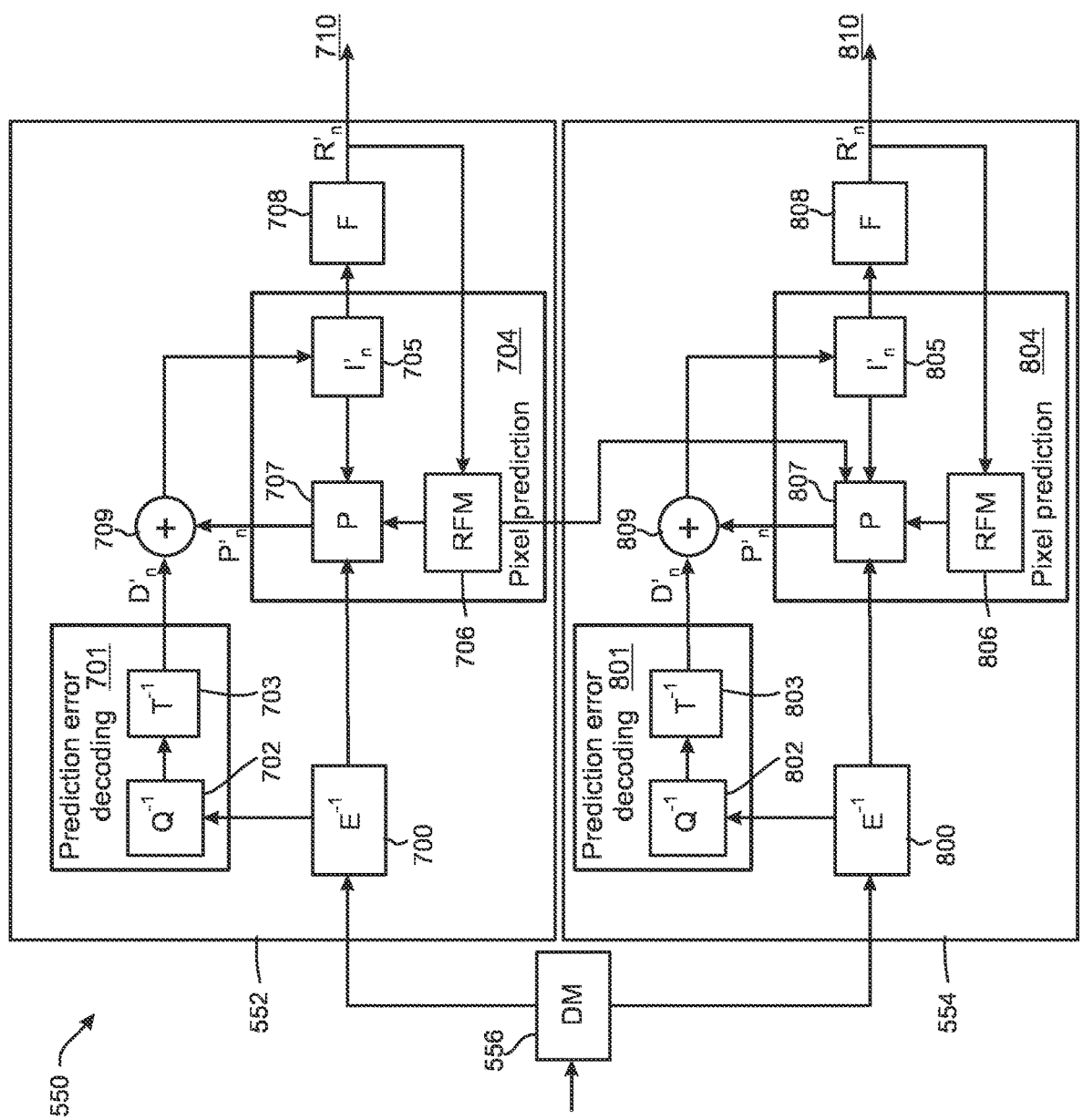

FIGS. 1a and 1b show a block diagram of an encoder and decoder for encoding and decoding the 2D texture pictures, geometry pictures and/or auxiliary pictures, respectively. FIG. 1a presents an encoder for two layers, but it would be appreciated that presented encoder could be similarly simplified to encode only one layer or extended to encode more than two layers. FIG. 1a illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 1a also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

FIG. 1b shows a block diagram of a video decoder suitable for employing embodiments of the invention. FIG. 1b depicts a structure of a two-layer decoder, but it would be appreciated that the decoding operations may similarly be employed in a single-layer decoder.

The video decoder 550 comprises a first decoder section 552 for base layer pictures and a second decoder section 554 for enhancement layer pictures. Block 556 illustrates a demultiplexer for delivering information regarding base layer pictures to the first decoder section 552 and for delivering information regarding enhancement layer pictures to the second decoder section 554. Reference P'n stands for a predicted representation of an image block. Reference D'n stands for a reconstructed prediction error signal. Blocks 704, 804 illustrate preliminary reconstructed images (I'n). Reference R'n stands for a final reconstructed image. Blocks 703, 803 illustrate inverse transform (T-1). Blocks 702, 802 illustrate inverse quantization (Q-1). Blocks 700, 800 illustrate entropy decoding (E-1). Blocks 706, 806 illustrate a reference frame memory (RFM). Blocks 707, 807 illustrate prediction (P) (either inter prediction or intra prediction). Blocks 708, 808 illustrate filtering (F). Blocks 709, 809 may be used to combine decoded prediction error information with predicted base or enhancement layer pictures to obtain the preliminary reconstructed images (I'n). Preliminary reconstructed and filtered base layer pictures may be output 710 from the first decoder section 552 and preliminary reconstructed and filtered enhancement layer pictures may be output 810 from the second decoder section 554.

Herein, the decoder could be interpreted to cover any operational unit capable to carry out the decoding operations, such as a player, a receiver, a gateway, a demultiplexer and/or a decoder.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

In typical video codecs the motion information is indicated with motion vectors associated with each motion compensated image block, such as a prediction unit. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signaling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signaled among a list of motion field candidate list filled with motion field information of available adjacent/co-located blocks.

Typical video codecs enable the use of uni-prediction, where a single prediction block is used for a block being (de)coded, and bi-prediction, where two prediction blocks are combined to form the prediction for a block being (de)coded. Some video codecs enable weighted prediction, where the sample values of the prediction blocks are weighted prior to adding residual information. For example, multiplicative weighting factor and an additive offset which can be applied. In explicit weighted prediction, enabled by some video codecs, a weighting factor and offset may be coded for example in the slice header for each allowable reference picture index. In implicit weighted prediction, enabled by some video codecs, the weighting factors and/or offsets are not coded but are derived e.g. based on the relative picture order count (POC) distances of the reference pictures.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired Macroblock mode and associated motion vectors. This kind of cost function uses a weighting factor λ to tie together the (exact or estimated) image distortion due to lossy coding methods and the (exact or estimated) amount of information that is required to represent the pixel values in an image area:

$$C=D+\lambda R \quad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

H.264/AVC and HEVC include a concept of picture order count (POC). A value of POC is derived for each picture and is non-decreasing with increasing picture position in output order. POC therefore indicates the output order of pictures. POC may be used in the decoding process, for example, for implicit scaling of motion vectors in the temporal direct mode of bi-predictive slices, for implicitly derived weights in weighted prediction, and for reference picture list initialization. Furthermore, POC may be used in the verification of output order conformance.

Video encoders and/or decoders may be able to store multiple reference pictures in a decoded picture buffer (DPB) and use them adaptively for inter prediction. The reference picture management may be defined as a process to determine which reference pictures are maintained in the DPB. Examples of reference picture management are described in the following.

In HEVC, a reference picture set (RPS) syntax structure and decoding process are used. A reference picture set valid or active for a picture includes all the reference pictures used as reference for the picture and all the reference pictures that are kept marked as "used for reference" for any subsequent pictures in decoding order. There are six subsets of the reference picture set, which are referred to as namely RefPicSetStCurr0 (a.k.a. RefPicSetStCurrBefore), RefPicSetStCurr1 (a.k.a. RefPicSetStCurrAfter), RefPicSetStFoll0, RefPicSetStFoll1, RefPicSetLtCurr, and RefPicSetLtFoll. RefPicSetStFoll0 and RefPicSetStFoll1 may also be considered to form jointly one subset RefPicSetStFoll. The notation of the six subsets is as follows. "Curr" refers to reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr0, RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set.

In HEVC, a reference picture set may be specified in a sequence parameter set and taken into use in the slice header through an index to the reference picture set. A reference picture set may also be specified in a slice header. A reference picture set may be coded independently or may be predicted from another reference picture set (known as inter-RPS prediction). In both types of reference picture set coding, a flag (used_by_curr_pic_X_flag) is additionally sent for each reference picture indicating whether the reference picture is used for reference by the current picture (included in a *Curr list) or not (included in a *Foll list). Pictures that are included in the reference picture set used by the current slice are marked as "used for reference", and pictures that are not in the reference picture set used by the current slice are marked as "unused for reference". If the current picture is an IDR picture, RefPicSetStCurr0, RefPicSetStCurr1, RefPicSetStFoll0, RefPicSetStFoll1, RefPicSetLtCurr, and RefPicSetLtFoll are all set to empty.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice.

A reference picture list, such as reference picture list 0 and reference picture list 1, is typically constructed in two steps: First, an initial reference picture list is generated. The initial reference picture list may be generated for example on the basis of POC, or information on the prediction hierarchy, or any combination thereof. Second, the initial reference picture list may be reordered by reference picture list reordering (RPLR) commands, also known as reference picture list modification syntax structure, which may be contained in slice headers. If reference picture sets are used, the reference picture list 0 may be initialized to contain RefPicSetStCurr0 first, followed by RefPicSetStCurr1, followed by RefPicSetLtCurr. Reference picture list 1 may be initialized to contain RefPicSetStCurr1 first, followed by RefPicSetStCurr0. In HEVC, the initial reference picture lists may be modified through the reference picture list modification syntax structure, where pictures in the initial reference picture lists may be identified through an entry index to the list. In other words, in HEVC, reference picture list modification is encoded into a syntax structure comprising a loop over each entry in the final reference picture list, where each loop entry is a fixed-length coded index to the initial reference picture list and indicates the picture in ascending position order in the final reference picture list.

Many coding standards, including H.264/AVC and HEVC, may have decoding process to derive a reference picture index to a reference picture list, which may be used to indicate which one of the multiple reference pictures is used for inter prediction for a particular block. A reference picture index may be coded by an encoder into the bitstream in some inter coding modes or it may be derived (by an encoder and a decoder) for example using neighboring blocks in some other inter coding modes.

In the following, the terms wide view image and wide view video mean an image and a video, respectively, which comprise visual information having a relatively large viewing angle, larger than 100 degrees. Hence, a so called 360 panorama image/video as well as images/videos captured by using a fish eye lens may also be called as a wide view image/video in this specification. More generally, the wide view image/video may mean an image/video in which some kind of projection distortion may occur when a direction of view changes between successive images or frames of the video so that a transform may be needed to find out co-located pixels from a reference image or a reference frame. This will be described in more detail later in this specification.

Terms 360-degree video, omnidirectional video, immersive video or virtual reality (VR) video may be used interchangeably. They may generally refer to video content that provides such a large field of view that only a part of the video is displayed at a single point of time in typical displaying arrangements. For example, a virtual reality video may be viewed on a head-mounted display (HMD) that may be capable of displaying e.g. about 100-degree field of view (FOV). The spatial subset of the virtual reality video content to be displayed may be selected based on the orientation of the head-mounted display. In another example, a flat-panel viewing environment is assumed, wherein e.g. up to 40-degree field-of-view may be displayed. When displaying wide field of view content (e.g. fisheye) on such a display, it may be preferred to display a spatial subset rather than the entire picture.

Human eyes are not capable of viewing the whole 360 degrees space, but are limited to a maximum horizontal and vertical field-of-views (HHFoV, HVFoV). Also, a HMD device has technical limitations that allow only viewing a subset of the whole 360 degrees space in horizontal and vertical directions (DHFoV, DVFoV)).

In many displaying situations only a partial picture is needed to be displayed while the remaining picture is required to be decoded but is not displayed. These displaying situations include:
  Typical head-mounted displays (HMDs) display ~100 degrees field of view, while often the input video for HMD consumption covers entire 360 degrees.
  Typical flat-panel viewing environments display up to 40-degree field-of-view. When displaying wide-FOV content (e.g. fisheye) on such a display, it may be preferred to display a spatial subset rather than the entire picture.

A viewport may be defined as a region of omnidirectional image or video suitable for display and viewing by the user. A current viewport (which may be sometimes referred simply as a viewport) may be defined as the part of the spherical video that is currently displayed and hence is viewable by the user(s). In many viewing modes, the user consuming the video/image may choose the current viewport freely. For example, when viewing happens with a head-mounted display, the orientation of the head determines the viewing orientation and hence the viewport. At any point of time, a video rendered by an application on a HMD renders a portion of the 360-degrees video, which is referred to as a viewport. Likewise, when viewing a spatial part of the 360-degree content on a conventional display, the spatial part that is currently displayed is a viewport. A viewport is a window on the 360-degrees world represented in the omnidirectional video displayed via a rendering display. A viewport may be characterized by a horizontal field-of-view (VHFoV) and a vertical field-of-view (VVFoV). In the following, the horizontal field-of-view of the viewport will be abbreviated with HFoV and, respectively, the vertical field-of-view of the viewport will be abbreviated with VFoV. As used herein the term omnidirectional video or image content may refer to content that has greater spatial extent than the field-of-view of the device rendering the content. Omnidirectional content may cover substantially 360 degrees in horizontal dimension and substantially 180 degrees in vertical dimension, but "omnidirectional" may also refer to content covering less than the entire 360 degree view in horizontal direction and/or the 180 degree view in vertical direction. A sphere region may be defined as a region on a sphere that may be specified by four great circles or by two azimuth circles and two elevation circles and additionally by a tile angle indicating rotation along the axis originating from the sphere origin passing through the centre point of the sphere region. A great circle may be defined as an intersection of the sphere and a plane that passes through the centre point of the sphere. A great circle is also known as an orthodrome or Riemannian circle. An azimuth circle may be defined as a circle on the sphere connecting all points with the same azimuth value. An elevation circle may be defined as a circle on the sphere connecting all points with the same elevation value.

OMAF specifies a generic timed metadata syntax for sphere regions. A purpose for the timed metadata track is indicated by the track sample entry type. The sample format of all metadata tracks for sphere regions specified starts with a common part and may be followed by an extension part that is specific to the sample entry of the metadata track. Each sample specifies a sphere region.

One of the specific sphere region timed metadata tracks specified in OMAF is known as recommended viewport (RVP) timed metadata track, which indicates the viewport that should be displayed when the user does not have control of the viewing orientation or has released control of the viewing orientation. The recommended viewport is a predefined 2D projection of a 3D scene, i.e. as seen from a certain position, angle and camera parameters. This feature is mainly known from 360-degree video applications, where viewports provide story-telling (e.g. "Director's cut") functionality. This provides a method for users to consume omnidirectional content without head rotation while wearing a head mounted display (HMD). The recommended viewport timed metadata track may be used for indicating a recommended viewport based on a director's cut or based on measurements of viewing statistics. The recommended viewport timed metadata track may also facilitate omnidirectional content consumption over limited field of view (FOV) displays or conventional 2D displays without the need for proactive viewport changes with gestures or interactions. A textual description of the recommended viewport may be provided in the sample entry. The type of the recommended viewport may be indicated in the sample entry and may be among the following:
  A recommended viewport per the director's cut, i.e., a viewport suggested according to the creative intent of the content author or content provider.
  A recommended viewport selected based on measurements of viewing statistics.
  Unspecified (for use by applications or specifications other than OMAF).
  The track sample entry type 'rcvp' shall be used.

The sample entry of this sample entry type is specified as follows:

```
class RcvpSampleEntry( ) extends SphereRegionSampleEntry('rcvp')
{
  RcvpInfoBox( ); // mandatory
}
class RcvpInfoBox extends FullBox('rvif', 0, 0) {
  unsigned int(8) viewport type;
  string viewport_description;
}
``` viewport_type specifies the type of the recommended viewport as listed in the table below:

| Value | Description |
| --- | --- |
| 0 | A recommended viewport per the director's cut, i.e., a viewport suggested according to the creative intent of the content author or content provider |
| 1 | A recommended viewport selected based on measurements of viewing statistics |
| 2 . . . 239 | Reserved (for use by future extensions of ISO/IEC 23090-2) |
| 240 . . . 255 | Unspecified (for use by applications or external specifications) |

The current OMAF v2 specification specifies a recommended viewport but does not take into account the need for consistent quality. Furthermore, there is no signalling in MPEG DASH to enable selection of media representations which have recommended viewport regions in high quality. The currently defined MPEG DASH signalling for recommended viewport is agnostic to quality of the media representations. This can lead to suboptimal experience if the player depends on the currently provided signaling.

Current specification in OMAF v2 does not support selection of the representation which covers the recommended viewports in a timed metadata track with best quality amongst the multiple associated media tracks. The problem arises by the fact that QR (Quality Ranking) information is static for a given representation but the recommended viewport timed metadata track may comprise of viewports anywhere in the omnidirectional content and the location of the viewport may be time-varying in a recommended viewport timed metadata track. There is no signaling in ISOBMFF or MPEG DASH to indicate which representations in the MPD cover the recommended viewport content with high (or low) quality. The objective is to maintain best viewing experience for HMDs as well as conventional displays. For large conventional displays the quality variations can adversely impact the user experience.

A content author may want to encode and/or make available one or more specific versions of the content that are tailor-made for covering a recommended viewport at a high quality while the remaining areas may have a lower quality. Such specific versions of the content are suitable for viewing the content on a 2D display when the user is expected to control the viewport manually only occasionally (i.e., when the player typically displays the recommended viewport, but lets the user to have manual control of the viewport too). Embodiments enable content authors indicating such specific versions of the content and players concluding which tracks or representations are such specific versions of the content.

In the following, several embodiments will be described in the context of polygon meshes in volumetric video coding. It is to be noted, however, that the embodiments are not limited to specific scene models or specific coding technologies.

Volumetric video may be captured using one or more three-dimensional (3D) cameras. When multiple cameras are in use, the captured footage is synchronized so that the cameras provide different viewpoints to the same world. In contrast to traditional 2D/3D video, volumetric video describes a 3D model of the world where the viewer is free to move and observe different parts of the world.

Volumetric video enables the viewer to move in six degrees of freedom (6DOF): in contrast to common 360° video, where the user has from 2 to 3 degrees of freedom (yaw, pitch, and possibly roll), a volumetric video represents a 3D volume of space rather than a flat image plane. Volumetric video frames contain a large amount of data because they model the contents of a 3D volume instead of just a two-dimensional (2D) plane. However, only a relatively small part of the volume changes over time. Therefore, it may be possible to reduce the total amount of data by only coding information about an initial state and changes which may occur between frames. Volumetric video can be rendered from synthetic 3D animations, reconstructed from multi-view video using 3D reconstruction techniques such as structure from motion, or captured with a combination of cameras and depth sensors such as LiDAR (Light Detection and Ranging), for example.

Volumetric video data represents a three-dimensional scene or object, and thus such data can be viewed from any viewpoint. Volumetric video data can be used as an input for augmented reality (AR), virtual reality (VR) and mixed reality (MR) applications. Such data describes geometry (shape, size, position in 3D-space) and respective attributes (e.g. color, opacity, reflectance, . . . ), together with any possible temporal changes of the geometry and attributes at given time instances (e.g. frames in 2D video). Volumetric video is either generated from 3D models, i.e. computer-generated imagery (CGI), or captured from real-world scenes using a variety of capture solutions, e.g. a multi-camera, a laser scan, a combination of video and dedicated depth sensors, etc. Also, a combination of CGI and real-world data is possible. Examples of representation formats for such volumetric data are triangle meshes, point clouds, or voxel. Temporal information about the scene can be included in the form of individual capture instances, i.e. "frames" in 2D video, or other means, e.g. position of an object as a function of time.

Increasing computational resources and advances in 3D data acquisition devices has enabled reconstruction of highly detailed volumetric video representations of natural scenes. Infrared, lasers, time-of-flight and structured light are all examples of devices that can be used to construct 3D video data. Representation of the 3D data depends on how the 3D data is used. Dense voxel arrays have been used to represent volumetric medical data. In 3D graphics, polygonal meshes are extensively used. Point clouds on the other hand are well suited for applications, such as capturing real world 3D scenes where the topology is not necessarily a 2D manifold. Another way to represent 3D data is coding this 3D data as a set of texture and depth map as is the case in the multi-view plus depth. Closely related to the techniques used in multi-view plus depth is the use of elevation maps, and multi-level surface maps.

In 3D point clouds, each point of each 3D surface is described as a 3D point with color and/or other attribute information such as surface normal or material reflectance. Point cloud is a set of data points in a coordinate system, for example in a three-dimensional coordinate system being defined by X, Y, and Z coordinates. The points may represent an external surface of an object in the screen space, e.g. in a three-dimensional space.

In dense point clouds or voxel arrays, the reconstructed 3D scene may contain tens or even hundreds of millions of points. If such representations are to be stored or interchanged between entities, then efficient compression of the presentations becomes fundamental. Standard volumetric video representation formats, such as point clouds, meshes, voxel, suffer from poor temporal compression performance. Identifying correspondences for motion-compensation in 3D-space is an ill-defined problem, as both geometry and respective attributes may change. For example, temporal successive "frames" do not necessarily have the same number of meshes, points or voxel. Therefore, compression of dynamic 3D scenes is inefficient. 2D-video based approaches for compressing volumetric data, i.e. multiview with depth, have much better compression efficiency, but rarely cover the full scene. Therefore, they provide only limited 6DOF capabilities.

Instead of the above-mentioned approach, a 3D scene, represented as meshes, points, and/or voxel, can be projected onto one, or more, geometries. These geometries may be "unfolded" or packed onto 2D planes (two planes per geometry: one for texture, one for depth), which are then encoded using standard 2D video compression technologies. Relevant projection geometry information may be transmitted alongside the encoded video files to the decoder. The decoder decodes the video and performs the inverse projection to regenerate the 3D scene in any desired representation format (not necessarily the starting format).

Projecting volumetric models onto 2D planes allows for using standard 2D video coding tools with highly efficient temporal compression. Thus, coding efficiency can be increased greatly. Using geometry-projections instead of 2D-video based approaches based on multiview and depth, provides a better coverage of the scene (or object). Thus, 6DOF capabilities are improved. Using several geometries for individual objects improves the coverage of the scene further. Furthermore, standard video encoding hardware can be utilized for real-time compression/decompression of the projected planes. The projection and the reverse projection steps are of low complexity.

The phrase along the bitstream (e.g. indicating along the bitstream) may be defined to refer to out-of-band transmission, signalling, or storage in a manner that the out-of-band data is associated with the bitstream. The phrase decoding along the bitstream or alike may refer to decoding the referred out-of-band data (which may be obtained from out-of-band transmission, signalling, or storage) that is associated with the bitstream. For example, an indication along the bitstream may refer to metadata in a container file that encapsulates the bitstream.

A first texture picture may be encoded into a bitstream, and the first texture picture may comprise a first projection of texture data of a first source volume of a scene model onto a first projection surface. The scene model may comprise a number of further source volumes.

In the projection, data on the position of the originating geometry primitive may also be determined, and based on this determination, a geometry picture may be formed. This may happen for example so that depth data is determined for each or some of the texture pixels of the texture picture. Depth data is formed such that the distance from the originating geometry primitive such as a point to the projection surface is determined for the pixels. Such depth data may be represented as a depth picture, and similarly to the texture picture, such geometry picture (such as a depth picture) may be encoded and decoded with a video codec. This first geometry picture may be seen to represent a mapping of the first projection surface to the first source volume, and the decoder may use this information to determine the location of geometry primitives in the model to be reconstructed. In order to determine the position of the first source volume and/or the first projection surface and/or the first projection in the scene model, there may be first geometry information encoded into or along the bitstream.

An attribute picture may be defined as a picture that comprises additional information related to an associated texture picture. An attribute picture may, for example, comprise surface normal, opacity, or reflectance information for a texture picture. A geometry picture may be regarded as one type of an attribute picture, although a geometry picture may be treated as its own picture type, separate from an attribute picture.

Texture picture(s) and the respective geometry picture(s), if any, and the respective attribute picture(s) may have the same or different chroma format.

Terms texture image and texture picture may be used interchangeably. Terms geometry image and geometry picture may be used interchangeably. A specific type of a geometry image is a depth image. Embodiments described in relation to a geometry image equally apply to a depth image, and embodiments described in relation to a depth image equally apply to a geometry image. Terms attribute image and attribute picture may be used interchangeably. A geometry picture and/or an attribute picture may be treated as an auxiliary picture in video/image encoding and/or decoding.

Figure 2A:
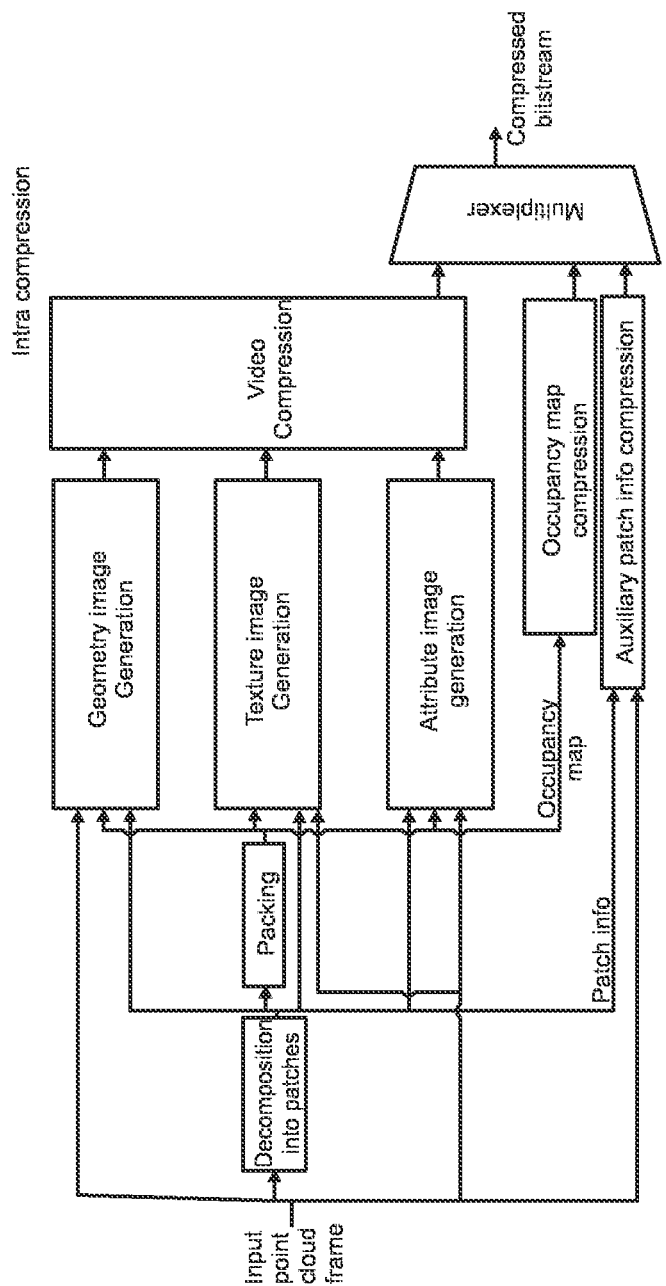
FIGS. 2a and 2b show a compression and a decompression process for 3D volumetric video.
Figure 2B:
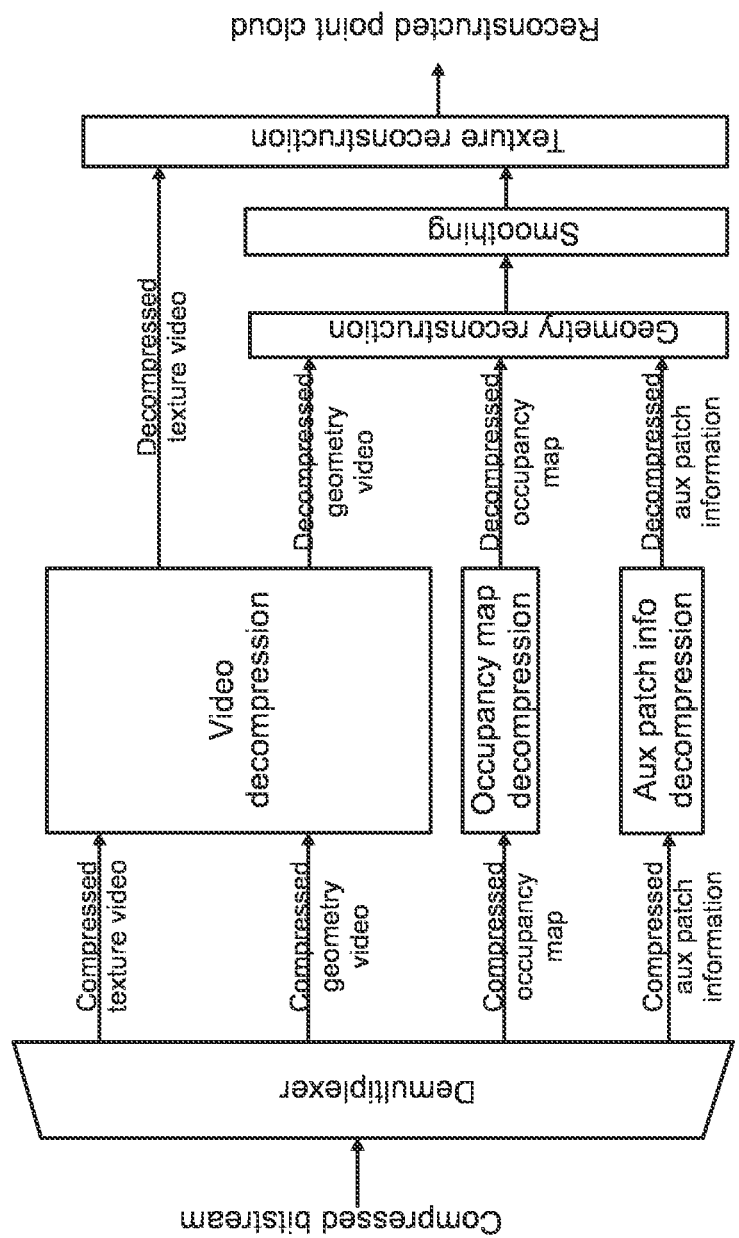

FIGS. 2a and 2b illustrate an overview of exemplified compression/decompression processes. The processes may be applied, for example, in Point Cloud Coding (PCC) according to MPEG standard. MPEG Video-Based Point Cloud Coding (V-PCC), Test Model a.k.a. TMC2v0 (MPEG N18017) discloses a projection-based approach for dynamic point cloud compression. For the sake of illustration, some of the processes related to video-based point cloud compression (V-PCC) compression/decompression are described briefly herein. For a comprehensive description of the model, a reference is made to MPEG N18017.

Each point cloud frame represents a dataset of points within a 3D volumetric space that has unique coordinates and attributes. An example of a point cloud frame is shown on FIG. 5a.

The patch generation process decomposes the point cloud frame by converting 3D samples to 2D samples on a given projection plane using a strategy that provides the best compression. The patch generation process aims at decomposing the point cloud into a minimum number of patches with smooth boundaries, while also minimizing the reconstruction error. In the V-PCC test model TMC2v0, the following approach is implemented.

First, the normal per each point is estimated and the tangent plane and its corresponding normal are defined per each point, based on the point's nearest neighbours m within a predefined search distance. A K-D tree is used to separate the data and find neighbours in a vicinity of a point $p_i$ and a barycenter $c=\bar{p}$ of that set of points is used to define the normal. The barycenter c is computed as follows:

$$c = \bar{p} = \frac{1}{m}\sum_{i=1}^{m} p_i$$

The normal is estimated from eigen decomposition for the defined point cloud as:

$$\sum_{i=1}^{m}(p_i - \overline{p})(p_i - \overline{p})^T$$

Based on this information each point is associated with a corresponding plane of a point cloud bounding box. Each plane is defined by a corresponding normal $\vec{n}_{p_{idx}}$ with values:
(1.0, 0.0, 0.0),
(0.0, 1.0, 0.0),
(0.0, 0.0, 1.0),
(−1.0, 0.0, 0.0),
(0.0, −1.0, 0.0),
(0.0, 0.0, −1.0).

More precisely, each point is associated with the plane that has the closest normal (i.e., maximizes the dot product of the point normal $\vec{n}_{p_i}$ and the plane normal $\vec{n}_{p_{idx}}$.

$$\max_{p_{idx}}\{\vec{n}_{p_i} \cdot \vec{n}_{p_{idx}}\}$$

Figure 5B:
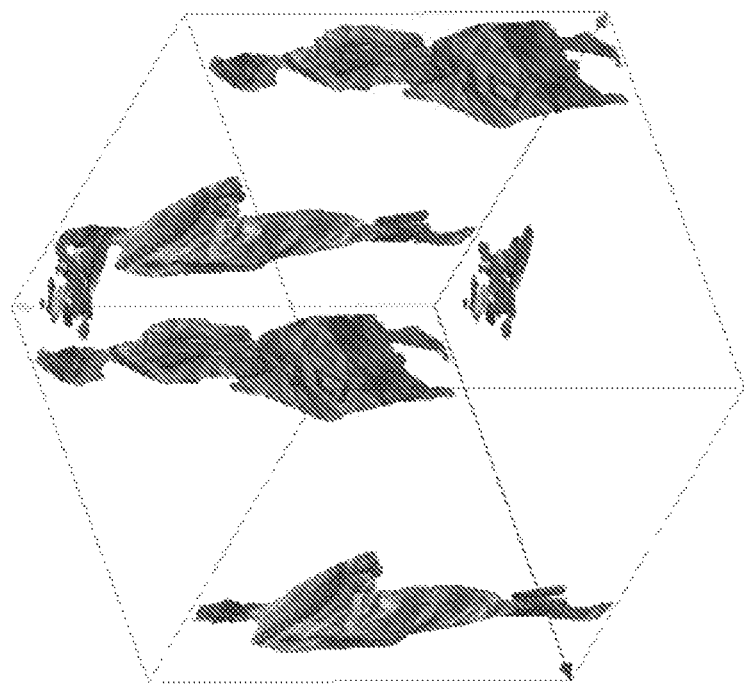
FIG. 5 shows an example how extractor tracks can be used for tile-based omnidirectional video streaming, in accordance with an embodiment.
Figure 5A:
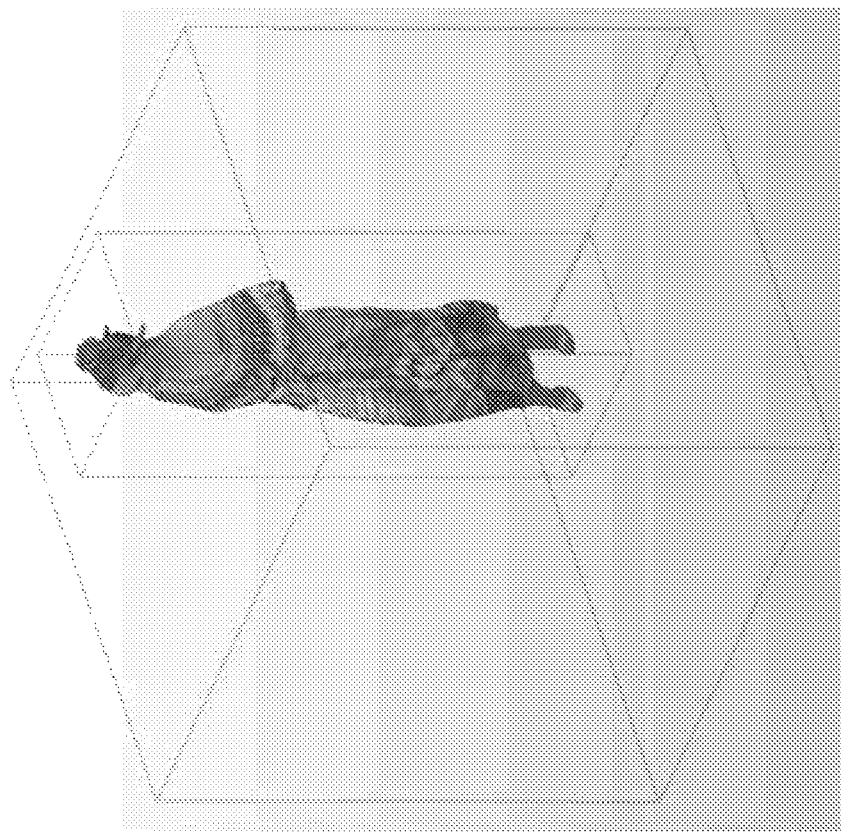

The sign of the normal is defined depending on the point's position in relationship to the "center". The projection estimation description is shown in FIG. 5b.

The initial clustering is then refined by iteratively updating the cluster index associated with each point based on its normal and the cluster indices of its nearest neighbors. The next step consists of extracting patches by applying a connected component extraction procedure.

The packing process aims at mapping the extracted patches onto a 2D grid while trying to minimize the unused space, and guaranteeing that every T×T (e.g., 16×16) block of the grid is associated with a unique patch. Herein, T is a user-defined parameter that is encoded in the bitstream and sent to the decoder.

TMC2v0 uses a simple packing strategy that iteratively tries to insert patches into a W×H grid. W (width) and H (height) are user defined parameters, which correspond to the resolution of the geometry/texture images that will be encoded. The patch location is determined through an exhaustive search that is performed in raster scan order. The first location that can guarantee an overlapping-free insertion of the patch is selected and the grid cells covered by the patch are marked as used. If no empty space in the current resolution image can fit a patch, then the height H of the grid is temporarily doubled, and search is applied again. At the end of the process, H is clipped so as to fit the used grid cells.

The image generation process exploits the 3D to 2D mapping computed during the packing process to store the geometry and texture of the point cloud as images. In order to better handle the case of multiple points being projected to the same pixel, each patch is projected onto two images, referred to as layers. More precisely, let H(u,v) be the set of points of the current patch that get projected to the same pixel (u, v). The first layer, also called the near layer, stores the point of H(u,v) with the lowest depth D0. The second layer, referred to as the far layer, captures the point of H(u,v) with the highest depth within the interval [D0, D0+Δ], where Δ is a user-defined parameter that describes the surface thickness.

The generated videos have the following characteristics: geometry: W×H YUV420-8 bit, where the geometry video is monochromatic, and texture: W×H YUV420-8 bit, where the texture generation procedure exploits the reconstructed/smoothed geometry in order to compute the colors to be associated with the re-sampled points.

The padding process aims at filling the empty space between patches in order to generate a piecewise smooth image suited for video compression. TMC2v0 uses a simple padding strategy, which proceeds as follows:

Each block of T×T (e.g., 16×16) pixels is processed independently.

If the block is empty (i.e., all its pixels belong to empty space), then the pixels of the block are filled by copying either the last row or column of the previous T×T block in raster order.

If the block is full (i.e., no empty pixels), nothing is done.

If the block has both empty and filled pixels (i.e. a so-called edge block), then the empty pixels are iteratively filled with the average value of their non-empty neighbors.

The padded geometry images and padded texture images may be provided for video compression. The generated images/layers may be stored as video frames and compressed using for example High Efficiency Video Coding (HEVC) Test Model 16 (HM) video codec according to the HM configurations provided as parameters. The video compression also generates reconstructed geometry images to be provided for smoothing, wherein a smoothed geometry is determined based on the reconstructed geometry images and patch info from the patch generation. The smoothed geometry may be provided to texture image generation to adapt the texture images.

The patch may be associated with auxiliary information being encoded/decoded for each patch as metadata. The auxiliary information may comprise index of the projection plane, 2D bounding box, 3D location of the patch represented in terms of depth δ0, tangential shift s0 and bitangential shift r0.

In the auxiliary patch information compression, the following meta data is encoded/decoded for every patch:

Index of the projection plane
  Index 0 for the normal planes (1.0, 0.0, 0.0) and (−1.0, 0.0, 0.0)
  Index 1 for the normal planes (0.0, 1.0, 0.0) and (0.0, −1.0, 0.0)
  Index 2 for the normal planes (0.0, 0.0, 1.0) and (0.0, 0.0, −1.0).

2D bounding box (u0, v0, u1, v1)

3D location (x0, y0, z0) of the patch represented in terms of depth δ0, tangential shift s0 and bi-tangential shift r0. According to the chosen projection planes, (δ0, s0, r0) are computed as follows:
  Index 0, δ0=x0, s0=z0 and r0=y0
  Index 1, δ0=y0, s0=z0 and r0=x0
  Index 2, δ0=z0, s0=x0 and r0=y0

Also, mapping information providing for each T×T block its associated patch index is encoded as follows:

For each T×T block, let L be the ordered list of the indexes of the patches such that their 2D bounding box contains that block. The order in the list is the same as the order used to encode the 2D bounding boxes. L is called the list of candidate patches.

The empty space between patches is considered as a patch and is assigned the special index 0, which is added to the candidate patches list of all the blocks.

Let I be index of the patch to which belongs the current T×T block and let J be the position of I in L. Instead of explicitly encoding the index I, its position J is arithmetically encoded instead, which leads to better compression efficiency.

The occupancy map consists of a binary map that indicates for each cell of the grid whether it belongs to the empty space or to the point cloud. Herein, one cell of the 2D grid produces a pixel during the image generation process. When considering an occupancy map as an image, it may be considered to comprise occupancy patches. Occupancy patches may be considered to have block-aligned edges according to the auxiliary information described in the previous section. An occupancy patch hence comprises occupancy information for a corresponding texture and geometry patches.

The occupancy map compression leverages the auxiliary information described in previous section, in order to detect the empty T×T blocks (i.e., blocks with patch index 0). The remaining blocks are encoded as follows.

The occupancy map could be encoded with a precision of a B0×B0 blocks. B0 is a user-defined parameter. In order to achieve lossless encoding, B0 should be set to 1. In practice B0=2 or B0=4 result in visually acceptable results, while significantly reducing the number of bits required to encode the occupancy map. The generated binary image covers only a single colour plane. However, given the prevalence of 4:2:0 codecs, it may be desirable to extend the image with "neutral" or fixed value chroma planes (e.g. adding chroma planes with all sample values equal to 0 or 128, assuming the use of an 8-bit codec).

The obtained video frame is compressed by using a video codec with lossless coding tool support (e.g., AVC, HEVC RExt, HEVC-SCC).

Occupancy map is simplified by detecting empty and non-empty blocks of resolution T×T in the occupancy map and only for the non-empty blocks we encode their patch index as follows:

A list of candidate patches is created for each T×T block by considering all the patches that contain that block.
The list of candidates is sorted in the reverse order of the patches.

For each block,
If the list of candidates has one index, then nothing is encoded.
Otherwise, the index of the patch in this list is arithmetically encoded.

The point cloud geometry reconstruction process exploits the occupancy map information in order to detect the non-empty pixels in the geometry/texture images/layers. The 3D positions of the points associated with those pixels are computed by levering the auxiliary patch information and the geometry images. More precisely, let P be the point associated with the pixel (u, v) and let ($\delta 0$, s0, r0) be the 3D location of the patch to which it belongs and (u0, v0, u1, v1) its 2D bounding box. P could be expressed in terms of depth $\delta$ (u, v), tangential shift s(u, v) and bi-tangential shift r(u, v) as follows:

$\delta(u,v) = \delta 0 + g(u,v)$ $s(u,v) = s0 - u0 + u$ $r(u,v) = r0 - v0 + v$ where g(u, v) is the luma component of the geometry image.

The smoothing procedure aims at alleviating potential discontinuities that may arise at the patch boundaries due to compression artifacts. The implemented approach moves boundary points to the centroid of their nearest neighbors.

In the texture reconstruction process, the texture values are directly read from the texture images.

Consequently, V-PCC provides a procedure for compressing a time-varying volumetric scene/object by projecting 3D surfaces onto a number of pre-defined 2D planes, which may then be compressed using regular 2D video compression algorithms. The projection is presented using different patches, where each set of patches may represent a specific object or specific parts of a scene.

Figure 6:
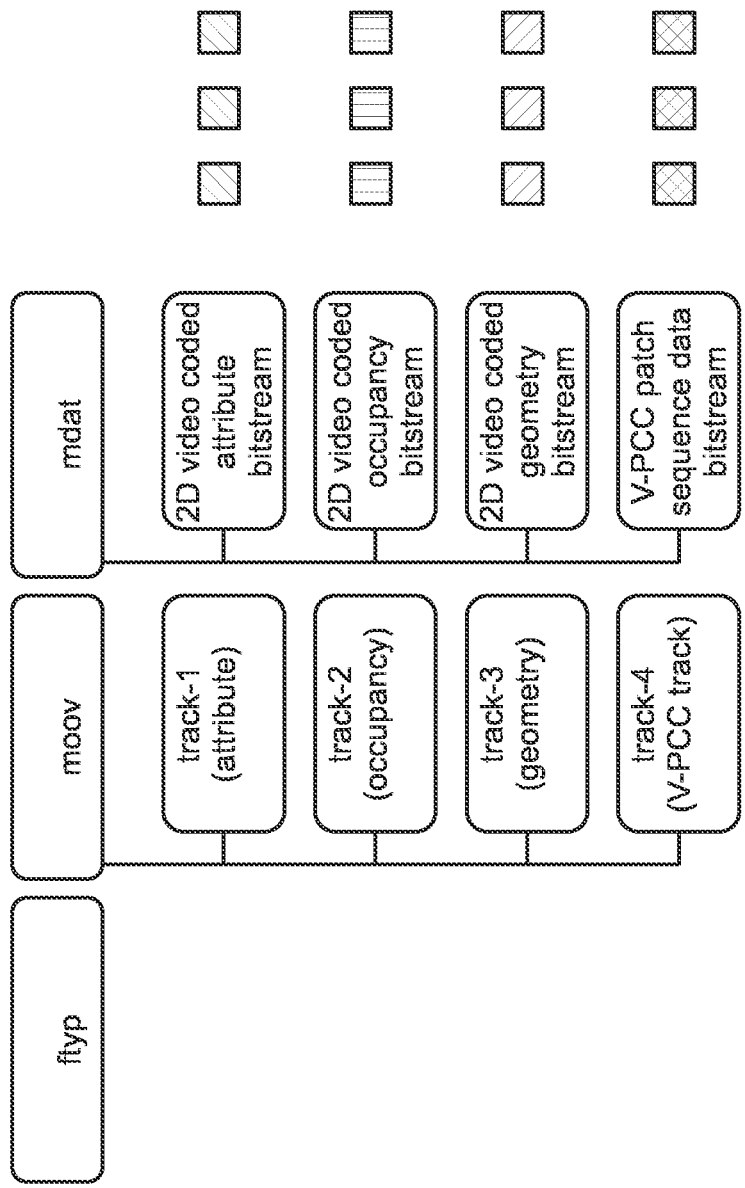
FIG. 6 illustrates an example of a multi-track ISOBMFF V-PCC container.

V-PCC encoded data may be carried in several different ways. As an example, V-PCC encoded data may be encapsulated in an ISOBMFF using a single-track or a multi-track container. In some embodiments, a multi-track ISOBMFF V-PCC container as shown in FIG. 6 is envisioned, where V-PCC units in a V-PCC elementary stream are mapped to individual tracks within the container file based on their types. There are two types of tracks in a multi-track ISOBMFF V-PCC container: V-PCC track and V-PCC component track.

The V-PCC track is a track carrying the volumetric visual information in the V-PCC bistream, which includes the path information sub-bitstream and the sequence parameter sets.

V-PCC component tracks are restricted video scheme tracks which carry 2D video encoded data for the occupancy map, geometry, and attribute sub-bitstreams of the V-PCC bitstream.

Tracks belonging to the same V-PCC sequence are time-aligned. Samples that contribute to the same point cloud frame across the different video-encoded V-PCC component tracks and the V-PCC track shall have the same presentation time. The V-PCC patch parameter sets used for such samples shall have a decoding time equal or prior to the composition time of the point cloud frame. In addition, all tracks belonging to the same V-PCC sequence shall have the same implied or explicit edit lists.

Figure 7A:
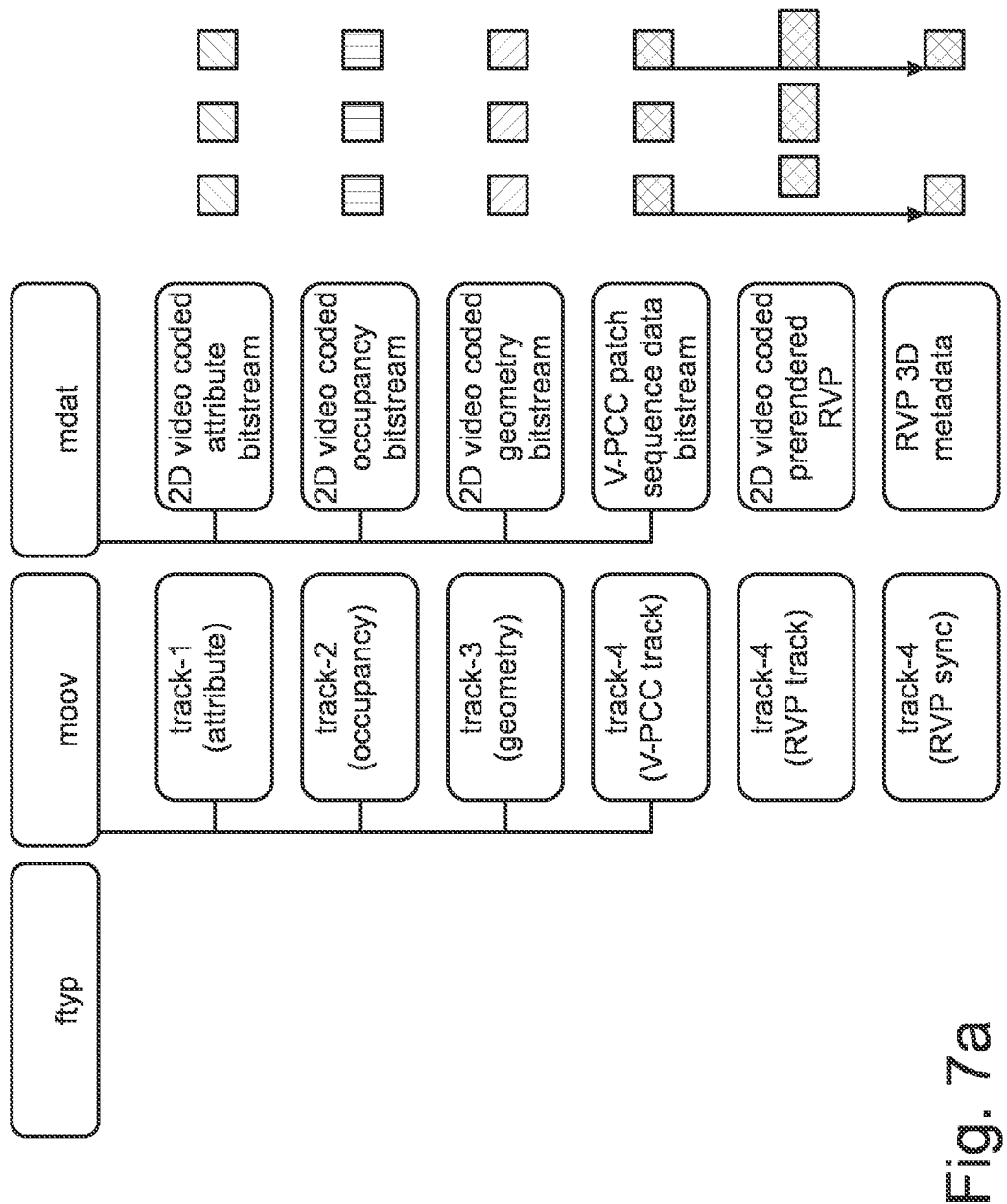
FIG. 7a illustrates an example of a modified version of the multi-track ISOBMFF V-PCC container of FIG. 6, in accordance with an embodiment.

In accordance with an embodiment, the above referred V-PCC multi-track encapsulation is extended with one or more additional prerendered 2D viewport tracks and associated metadata to support the use cases mentioned in the background section. A "viewport track" is a dynamic sequence of viewports, i.e. a dynamic rendering of a 2D camera view on a 3D patch in a 3D scene. The modified version of FIG. 6 would look as is depicted in FIG. 7a, in accordance with an embodiment.

The "RVP track" is a dynamic sequence of viewports, i.e. a dynamic rendering of a 2D camera view on a 3D patch in a 3D scene. The "RVP sync" track carries all relevant 3D metadata to switch between 2D RVP and interactive 3D viewing.

In a first embodiment, one or more pre-rendered 2D videos of a 3D scene are added to PCC multi-track encapsulation as separate tracks. Such tracks do not necessarily have to run over the complete V-PCC sequence. On their own, such RVP tracks may provide device adaptation and bit rate adaptation capabilities. However, switching between 2D RVP viewing and interactive 3D viewing may have a restricted user experience, as the transition between 2D view and 3D view relies on knowledge of the current RVP virtual camera position.

Thus, in a second embodiment, metadata tracks are introduced for each RVP track, providing the relevant virtual camera information, such as camera location and orientation in 3D space, field of view (FoV), etc. These additional tracks, which may be called as "RVP sync" tracks, may have a lower sample resolution than the V-PCC tracks, but samples should be aligned, as is shown in FIG. 7a.

In another embodiment, RVP tracks may be used to define scripted animations between point cloud representations, in which case the sample alignment can be as is illustrated in FIG. 7b.

In the following, some details of RVP track will be described, in accordance with an embodiment.

In one embodiment, an RVP tracks should be playable by any video player, thus they should not be represented by restricted video like vpcc-encoded video component tracks. In the presence of multiple RVP tracks, alternatives may be indicated by an alternate_group field of a TrackHeaderBox of the RVP tracks. A preferred selection of the RVP track may be indicated by referencing the preferred RVP-track from the RVP sync track. Alternatives may be evaluated by searching the file for tracks in the same alternate_group.

RVP tracks may not run over the entire V-PCC sequence, in which case special signaling may be required. In one embodiment EditList atoms may be utilized to signal playback offsets. 'Blank' time can be inserted in a track using an empty edit in an EditListBox of the track. Another way to shift the start time of the track include the use of the CompositionOffsetBox, which specifies the difference between the decoding and composition times of samples. In another embodiment, empty samples may be utilized to maintain track sample alignment with the rest of the vpcc-content.

In order to provide useful functionality, RVP tracks need to be associated with the related RVP sync track and the point cloud data to which they relate. In one embodiment RVP-tracks may signal their related RVP-sync track using TrackReferenceTypeBox with a new type e.g. 'prvs'. The RVP track shall refer to the track id of the sync track. In another embodiment RVP sync track may contain a list of track references to RVP tracks which they relate to. In this case a new track reference type may be defined, e.g. 'prvv'. In yet another embodiment, an entity group collecting the RVP tracks and the related RVP sync track is defined. The RVP sync track may either be differentiated from the RVP track based on the order of listing the tracks in the entity group (e.g. the RVP sync track may be required to be the first track listed in the entity group), or may be explicitly indicated in the entity group with syntax element(s).

In the following, an example of metadata carried in the RVP sync track will be described.

The RVP sync track should refer to the relevant point cloud vpcc-track. In one embodiment this could be achieved by indicating the relevant vpcc-track id in TrackReferenceTypeBox of the RVP sync track. The track reference type may be 'cdsc' or a new more vpcc-specific track reference type may be defined.

In another embodiment, the RVP sync track may refer to several vpcc-tracks at different times. In such case track reference may be achieved by adding a SampleGroupDescriptionBox in the RVP sync track. Defining a new SampleGroupDescriptionEntry, which lists the id of the relevant vpcc-track would then enable timely linking of RVP sync track and preferred vpcc-tracks.

The RVP sync track sample should contain data which describes the viewport of the recommended viewport at a given time. As an example, a set of static RVP parameters may be defined to avoid replicating these values for each sample. Such parameters may include, but are not limited to, aspect ratio (which provides the ratio between width and height of the viewport), field of view (fov) for vertical and horizontal axes, and distance of near and far planes.

```
aligned(8) struct static_rvp {
    float aspect_ratio;
    float fov[2];
    float near;
    float far;
}
```

To avoid replication of said static values, they may be stored either in the sample entry of the RVP sync track or inside the SampleGroupDescriptionEntry as described below.

```
aligned (8) class RVPSampleGroupDescriptionEntry( ) extends
SampleGroupDescriptionEntry('rvsg') {
    unsigned int vpcc_track_id;
    static_rvp( );
}
```

In one embodiment the sample data of RVP sync track contains absolute or delta coded values for frequently changing viewport parameters. To enable update in the static viewport parameters a flag may be introduced.

```
aligned(8) struct rvp_payload_struct {
    float position[3];
    float orientation[4];
    bool static_rvp_updated;
    if (static_rvp_updated)
        static_rvp( );
    reserved_bits( );
}
aligned(8) class RVPSample {
    rvp_payload_struct( );
}
```

In another embodiment the viewport movement and/or the viewing position movement may be defined by assigning an animation path between samples. Animation path may comprise position and orientation values and interpolation methods per each property of animation, which describes how viewport parameters between samples should be derived. Viewport animation may be defined for arbitrary sample timings or sync samples. Interpolation methods for each animated property as well as cubic spline weights may be provided as higher-level structures, e.g. SampleGroupDescriptionEntry to avoid providing duplicated data for every sample.

In the following, examples to enable smooth transitions between 2D viewing and 3D interactive viewing will be described.

In one embodiment the metadata described above enables smooth animation between pre-rendered recommended viewport video and real-time rendered point cloud data. The process for creating a smooth animation from video to point cloud rendering is described by following steps.

A viewer reaches a point in video playback, where point cloud rendering becomes available. An application initializes real-time point cloud renderer with recommended viewport data (position, rotation, fov, aspect ratio, etc.). The application renders from point cloud data the same frame and composites blended differences on top of the pre-rendered video frame. An animation is applied to the initialized camera parameters of the point cloud renderer targeting current real-time position, orientation and camera parameters of the viewing device as provided by device capabilities. While rendering the animation the drift is calculated between initial animation position and real-time tracked position, which is updated to the animation target. At the end of the animation the viewer may be able to freely view the point cloud as rendered by the point cloud renderer.

The same operation may be replicated in reverse to render smooth animation from point cloud to pre-rendered recommended viewport video.

In one embodiment DASH Preselections may be utilized for content adaptation. Adaptation request may be initiated by device capabilities (lack of tracking, rendering, etc.), by network conditions (e.g. not enough bandwidth to stream vpcc-data) or by user preference (e.g. the user prefers to view pre-rendered viewport instead of freely exploring the point cloud scene).

Under DASH Periods, Preselections are used to group content that should be played together. V-PCC tracks (metadata and video encoded components) that can be played together may be listed as different adaptation sets for each preselection. RVP sync tracks may be listed in the same preselection so that the renderer can prepare animations and offer recommended viewport related information to client devices.

In one embodiment each RVP sync track may refer to Adaptation Set id(s) or Representation id(s) of the related RVP track(s). This may be achieved by, for example, adding rvp-id list property to RVP sync track Representation. In this case interchangeable RVP track(s) may be listed under Adaptation Sets, so that client device is able to stream best suited adaptation.

In another embodiment each RVP Adaptation Set or Representation may signal representation id of related RVP sync track. This may be achieved by adding rvp-id property to Adaptation Set.

In another embodiment RVP Adaptation Sets or Representations may be referred from a Preselection which defines media components that should be played together with the RVP track. Such media may include pre-rendered audio which matches the viewport position and orientation. Preselection may also refer to the RVP sync track Representation id. In this design only one Preselection should be played at a time.

In yet another embodiment, a Representation carrying an RVP sync track can include, for example in the Media Presentation Description (MPD), @associationId attribute indicating the IDs of the Representations carrying the associated RVP tracks. Alternatively, a Representation carrying an RVP track can include, for example in the Media Presentation Description, @associationId attribute indicating the IDs of the Representations carrying the associated RVP syntax track. @associationType may be used to carry the four-character code of the related track reference.

The above described procedures may provide support for:
Bitrate adaptation, wherein a pre-rendered 2D viewport is provided in case 3D interactivity would require too much bit rate;
device adaptation, wherein a device may receive a multi-track encapsulated V-PCC bit stream but may not able to provide 3D viewing/AR functionality (e.g. a stationary TV screen);
3D Highlights: At certain times, the user can switch from a pre rendered 2D view into an interactive 3D view (static or dynamic);
2D Storytelling: At certain times, the user is taken from the interactive 3D view into a prerendered 2D view, e.g. for scene transitions or "director's cut" view;
Continuous "simulcast": The user is able to switch between a 2D "director's cut" view and an interactive 3D view at any time.

Figures 10A, 10B:
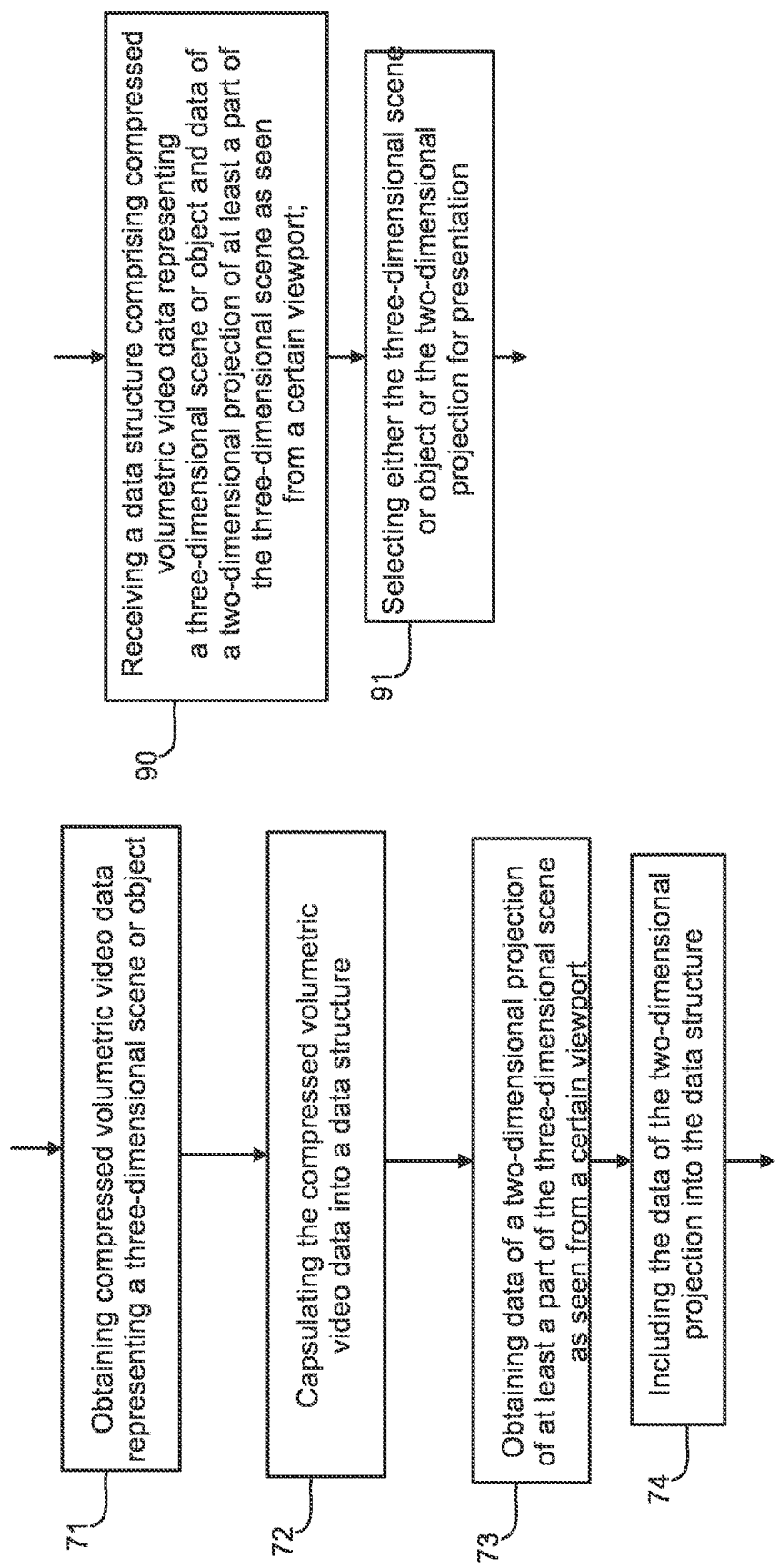
FIG. 10a shows a flow chart of an encoding method, in accordance with an embodiment.
FIG. 10b shows a flow chart of a decoding method, in accordance with an embodiment.

According to an embodiment, a method comprises, with reference to the flow diagram of FIG. 10a:
obtaining 71 compressed volumetric video data representing a three-dimensional scene or objecta;
capsulating 72 the compressed volumetric video data into a data structure;
obtaining 73 data of a two-dimensional projection of at least a part of the three-dimensional scene as seen from a certain viewport;
including 74 the data of the two-dimensional projection into the data structure.

According to an embodiment, a method comprises, with reference to the flow diagram of FIG. 10b:
receiving 90 data structure comprising compressed volumetric video data representing a three-dimensional scene or object and data of a two-dimensional projection of at least a part of the three-dimensional scene as seen from a certain viewport;
selecting 91 either the three-dimensional scene or object or the two-dimensional projection for presentation.

FIG. 9a shows some elements of a video encoding section 510, in accordance with an embodiment. The video encoding section 510 may be a part of the omnidirectional streaming system 600 or separate from it. A signaling constructor 512 may comprise an input to obtain omnidirectional video/image 511, and a second input to obtain quality rank definitions 513. The signaling constructor 512 forms different kinds of signals and provides them to an encoding element 513. The encoding element 513 may encode the signals as well as the omnidirectional video/image and the signaling information for storing and/or transmission. However, there may be separate encoding elements for signal encoding and visual information encoding. Encoding may refer to compression of video or image data, but it may also comprise generating, encapsulating, or packetizing signalling information associated with the compressed video or image data, for example in a manifest and/or a container file.

FIG. 9b shows a video decoding section 520, in accordance with an embodiment. Also the video encoding section 510 may be a part of the omnidirectional streaming system 600 or separate from it. The video decoding section 520 may obtain signaling data via a first input 521 and encoded visual information (omnidirectional video/image) via a second input 522. The signaling data and the encoded visual information may be decoded by a decoding element 523. Decoded signaling data may be used by a rendering element 524 to control in image reconstruction from decoded visual information. The rendering element 524 may also receive viewport data 525 to determine the location of a current viewport within the image area of the omnidirectional video/image).

Several embodiments relate to indicating in a bitstream, a container file, and/or a manifest or parsing information from a bitstream, a container file, and/or a manifest. The bitstream may, for example, be a video or image bitstream (such as an HEVC bitstream), wherein the indicating may utilize, for example, supplemental enhancement information (SEI) messages. The container file may, for example, comply with the ISO base media file format, the Matroska file format, or the Material eXchange Format (MXF). The manifest may, for example, conform to the Media Presentation Description (MPD) of MPEG-DASH (ISO/IEC 23009-1), the M3U format, or the Composition Playlist (CPL) of the Interoperable Master Format (IMF). It needs to be understood that these formats are provided as examples and that embodiments are not limited to them. Embodiments may be similarly realized with any other similar container or media description formats, such as the Session Description Protocol (SDP). Embodiments may be realized with a suite of bitstream format(s), container file format(s) and manifest format(s), in which the indications may be. MPEG OMAF is an example of such a suite of formats.

It needs to be understood that instead of or in addition to a manifest, embodiments similarly apply to a container file format and/or a media bitstream.

When the metadata is stored in or along a track in a file, the metadata may reside e.g. in one or more of the following container structures or mechanisms:
Track header, such as a box contained directly or indirectly within TrackHeaderBox
Sample entry, such as a particular box within the sample entry
Sample group description entry, from which it is mapped to sample(s) of the track through the SampleToGroupBox(es)
Sample auxiliary information
Track reference(s)
When the metadata is associated with a group of tracks, the TrackGroupBox may be extended to carry the metadata
When the metadata is associated with a group of tracks, the EntityToGroupBox may be extended to carry the metadata It needs to be understood that while many embodiments are described using singular forms of nouns, e.g. an encoded bitstream, a viewport, a spatial region, and so on, the embodiments generally apply to plural forms of nouns.

The above described embodiments may help in enhancing the viewing experience of the user. Furthermore, they may help the content author in guiding the viewer to his (authors) intended viewing conditions in the omnidirectional video/image.

In general, indications, conditions, and/or parameters described in different embodiments may be represented with syntax elements in syntax structure(s), such as SEI messages, in a video bitstream, and/or in static or dynamic syntax structures in a container file, and/or in a manifest. An example of a static syntax structure in ISOBMFF is a box in a sample entry of a track. Another example of a static syntax structure in ISOBMFF is an item property for an image item. Examples of dynamic syntax structures in ISOBMFF were described earlier with reference to timed metadata.

In the above, some embodiments have been described by referring to the term streaming. It needs to be understood that embodiments similarly apply to other forms of video transmission, such as progressive downloading, file delivery, broadcasting, and conversational video communications, such as video telephone.

The various embodiments can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

A recent trend in streaming in order to reduce the streaming bitrate of virtual reality video may be known as a viewport dependent delivery and can be explained as follows: a subset of 360-degree video content covering a primary viewport (i.e., the current view orientation) is transmitted at the best quality/resolution, while the remaining of 360-degree video is transmitted at a lower quality/resolution. There are generally two approaches for viewport-adaptive streaming:

The first approach is viewport-specific encoding and streaming, a.k.a. viewport-dependent encoding and streaming, a.k.a. asymmetric projection. In this approach, 360-degree image content is packed into the same frame with an emphasis (e.g. greater spatial area) on the primary viewport. The packed VR frames are encoded into a single bitstream. For example, the front face of a cube map may be sampled with a higher resolution compared to other cube faces and the cube faces may be mapped to the same packed VR frame, where the front cube face is sampled with twice the resolution compared to the other cube faces.

The second approach is tile-based encoding and streaming. In this approach, 360-degree content is encoded and made available in a manner that enables selective streaming of viewports from different encodings.

An approach of tile-based encoding and streaming, which may be referred to as tile rectangle-based encoding and streaming or sub-picture based encoding and streaming, may be used with any video codec, even if tiles similar to HEVC were not available in the codec or even if motion-constrained tile sets or alike were not implemented in an encoder. In tile rectangle-based encoding, the source content may be split into tile rectangle sequences (a.k.a. sub-picture sequences) before encoding. Each tile rectangle sequence covers a subset of the spatial area of the source content, such as full panorama content, which may e.g. be of equirectangular projection format. Each tile rectangle sequence may then be encoded independently from each other as a single-layer bitstream, such as HEVC Main profile bitstream. Several bitstreams may be encoded from the same tile rectangle sequence, e.g. for different bitrates. Each tile rectangle bitstream may be encapsulated in a file as its own track (or alike) and made available for streaming. At the receiver side the tracks to be streamed may be selected based on the viewing orientation. The client may receive tracks covering the entire omnidirectional content. Better quality or higher resolution tracks may be received for the current viewport compared to the quality or resolution covering the remaining, currently non-visible viewports. In an example, each track may be decoded with a separate decoder instance.

In an example of tile rectangle-based encoding and streaming, each cube face may be separately encoded and encapsulated in its own track (and Representation). More than one encoded bitstream for each cube face may be provided, e.g. each with different spatial resolution. Players can choose tracks (or Representations) to be decoded and played based on the current viewing orientation. High-resolution tracks (or Representations) may be selected for the cube faces used for rendering for the present viewing orientation, while the remaining cube faces may be obtained from their low-resolution tracks (or Representations).

In an approach of tile-based encoding and streaming, encoding is performed in a manner that the resulting bitstream comprises motion-constrained tile sets. Several bitstreams of the same source content are encoded using motion-constrained tile sets.

In an approach, one or more motion-constrained tile set sequences are extracted from a bitstream, and each extracted motion-constrained tile set sequence is stored as a tile set track (e.g. an HEVC tile track or a full-picture-compliant tile set track) or a sub-picture track in a file. A tile base track (e.g. an HEVC tile base track or a full picture track comprising extractors to extract data from the tile set tracks) may be generated and stored in a file. The tile base track represents the bitstream by implicitly collecting motion-constrained tile sets from the tile set tracks or by explicitly extracting (e.g. by HEVC extractors) motion-constrained tile sets from the tile set tracks. Tile set tracks and the tile base track of each bitstream may be encapsulated in an own file, and the same track identifiers may be used in all files. At the receiver side the tile set tracks to be streamed may be selected based on the viewing orientation. The client may receive tile set tracks covering the entire omnidirectional content. Better quality or higher resolution tile set tracks may be received for the current viewport compared to the quality or resolution covering the remaining, currently non-visible viewports.

In an example, equirectangular panorama content is encoded using motion-constrained tile sets. More than one encoded bitstream may be provided, e.g. with different spatial resolution and/or picture quality. Each motion-constrained tile set is made available in its own track (and Representation). Players can choose tracks (or Representations) to be decoded and played based on the current viewing orientation. High-resolution or high-quality tracks (or Representations) may be selected for tile sets covering the present primary viewport, while the remaining area of the 360-degree content may be obtained from low-resolution or low-quality tracks (or Representations).

In an approach, each received tile set track is decoded with a separate decoder or decoder instance.

In another approach, a tile base track is utilized in decoding as follows. If all the received tile tracks originate from bitstreams of the same resolution (or more generally if the tile base tracks of the bitstreams are identical or equivalent, or if the initialization segments or other initialization data, such as parameter sets, of all the bitstreams is the same), a tile base track may be received and used to construct a bitstream. The constructed bitstream may be decoded with a single decoder.

In yet another approach, a first set of tile rectangle tracks and/or tile set tracks may be merged into a first full-picture-compliant bitstream, and a second set of tile rectangle tracks and/or tile set tracks may be merged into a second full-picture-compliant bitstream. The first full-picture-compliant bitstream may be decoded with a first decoder or decoder instance, and the second full-picture-compliant bitstream may be decoded with a second decoder or decoder instance. In general, this approach is not limited to two sets of tile rectangle tracks and/or tile set tracks, two full-picture-compliant bitstreams, or two decoders or decoder instances, but applies to any number of them. With this approach, the client can control the number of parallel decoders or decoder instances. Moreover, clients that are not capable of decoding tile tracks (e.g. HEVC tile tracks) but only full-picture-compliant bitstreams can perform the merging in a manner that full-picture-compliant bitstreams are obtained. The merging may be solely performed in the client or full-picture-compliant tile set tracks may be generated to assist in the merging performed by the client.

A motion-constrained coded sub-picture sequence may be defined as a collective term of such a coded sub-picture sequence in which the coded pictures are motion-constrained pictures, as defined earlier, and an MCTS sequence. Depending on the context of using the term motion-constrained coded sub-picture sequence, it may be interpreted to mean either one or both of a coded sub-picture sequence in which the coded pictures are motion-constrained pictures, as defined earlier, and/or an MCTS sequence.

A collector track may be defined as a track that extracts implicitly or explicitly MCTSs or sub-pictures from other tracks. A collector track may be a full-picture-compliant track. A collector track may for example extract MCTSs or sub-pictures to form a coded picture sequence where MCTSs or sub-pictures are arranged to a grid. For example, when a collector track extracts two MCTSs or sub-pictures, they may be arranged into a 2×1 grid of MCTSs or sub-pictures. A tile base track may be regarded as a collector track, and an extractor track that extracts MCTSs or sub-pictures from other tracks may be regarded as a collector track. A collector track may also be referred to as a collection track. A track that is a source for extracting to a collector track may be referred to as a collection item track.

The term tile merging (in coded domain) may be defined as a process to merge coded sub-picture sequences and/or coded MCTS sequences, which may have been encapsulated as sub-picture tracks and tile tracks, respectively, into a full-picture-compliant bitstream. A creation of a collector track may be regarded as tile merging that is performed by the file creator. Resolving a collector track into a full-picture-compliant bitstream may be regarded as tile merging, which is assisted by the collector track.

It is also possible to combine the first approach (viewport-specific encoding and streaming) and the second approach (tile-based encoding and streaming) above.

It needs to be understood that tile-based encoding and streaming may be realized by splitting a source picture in sub-picture sequences that are partly overlapping. Alternatively or additionally, bitstreams with motion-constrained tile sets may be generated from the same source content with different tile grids or tile set grids. We could then imagine the 360 degrees space divided into a discrete set of viewports, each separate by a given distance (e.g., expressed in degrees), so that the omnidirectional space can be imagined as a map of overlapping viewports, and the primary viewport is switched discretely as the user changes his/her orientation while watching content with a head-mounted display. When the overlapping between viewports is reduced to zero, the viewports could be imagined as adjacent non-overlapping tiles within the 360 degrees space.

As explained above, in viewport-adaptive streaming the primary viewport (i.e., the current viewing orientation) is transmitted at the best quality/resolution, while the remaining of 360-degree video is transmitted at a lower quality/resolution. When the viewing orientation changes, e.g. when the user turns his/her head when viewing the content with a head-mounted display, another version of the content needs to be streamed, matching the new viewing orientation. In general, the new version can be requested starting from a stream access point (SAP), which are typically aligned with (sub)segments. In single-layer video bitstreams, SAPs are intra-coded and hence costly in terms of rate-distortion performance. Conventionally, relatively long SAP intervals and consequently relatively long (sub)segment durations in the order of seconds are hence used. Thus, the delay (here referred to as the viewport quality update delay) in upgrading the quality after a viewing orientation change (e.g. a head turn) is conventionally in the order of seconds and is therefore clearly noticeable and may be annoying.

Extractors specified in ISO/IEC 14496-15 for H.264/AVC and HEVC enable compact formation of tracks that extract NAL unit data by reference. An extractor is a NAL-unit-like structure. A NAL-unit-like structure may be specified to comprise a NAL unit header and NAL unit payload like any NAL units, but start code emulation prevention (that is required for a NAL unit) might not be followed in a NAL-unit-like structure. For HEVC, an extractor contains one or more constructors. A sample constructor extracts, by reference, NAL unit data from a sample of another track. An in-line constructor includes NAL unit data. When an extractor is processed by a file reader that requires it, the extractor is logically replaced by the bytes resulting when resolving the contained constructors in their appearance order. Nested extraction may be disallowed, e.g. the bytes referred to by a sample constructor shall not contain extractors; an extractor shall not reference, directly or indirectly, another extractor. An extractor may contain one or more constructors for extracting data from the current track or from another track that is linked to the track in which the extractor resides by means of a track reference of type 'scal'. The bytes of a resolved extractor may represent one or more entire NAL units. A resolved extractor starts with a valid length field and a NAL unit header. The bytes of a sample constructor are copied only from the single identified sample in the track referenced through the indicated 'scal' track reference. The alignment is on decoding time, i.e. using the time-to-sample table only, followed by a counted offset in sample number. Extractors are a media-level concept and hence apply to the destination track before any edit list is considered. (However, one would normally expect that the edit lists in the two tracks would be identical).

In viewport-dependent streaming, which may be also referred to as viewport-adaptive streaming (VAS) or viewport-specific streaming, a subset of 360-degree video content covering the viewport (i.e., the current view orientation) is transmitted at a better quality and/or higher resolution than the quality and/or resolution for the remaining of 360-degree video. There are several alternatives to achieve viewport-dependent omnidirectional video streaming. In tile-based viewport-dependent streaming, projected pictures are partitioned into tiles that are coded as motion-constrained tile sets (MCTSs) or alike. Several versions of the content are encoded at different bitrates or qualities using the same MCTS partitioning. Each MCTS sequence is made available for streaming as a DASH Representation or alike. The player selects on MCTS basis which bitrate or quality is received.

H.264/AVC does not include the concept of tiles, but the operation like MCTSs can be achieved by arranging regions vertically as slices and restricting the encoding similarly to encoding of MCTSs. For simplicity, the terms tile and MCTS are used in this document but should be understood to apply to H.264/AVC too in a limited manner. In general, the terms tile and MCTS should be understood to apply to similar concepts in any coding format or specification.

One possible subdivision of the tile-based viewport-dependent streaming schemes is the following:

Region-wise mixed quality (RWMQ) 360° video: Several versions of the content are coded with the same resolution, the same tile grid, and different bitrate/picture quality. Players choose high-quality MCTSs for the viewport.

Viewport+360° video: One or more bitrate and/or resolution versions of a complete low-resolution/low-quality omnidirectional video are encoded and made available for streaming. In addition, MCTS-based encoding is performed and MCTS sequences are made available for streaming. Players receive a complete low-resolution/low-quality omnidirectional video and select and receive the high-resolution MCTSs covering the viewport.

Region-wise mixed resolution (RWMR) 360° video: MCTSs are encoded at multiple resolutions. Players select a combination of high resolution MCTSs covering the viewport and low-resolution MCTSs for the remaining areas.

It needs to be understood that there may be other ways to subdivide tile-based viewport-dependent streaming methods to categories than the one described above. Moreover, the above-described subdivision may not be exhaustive, i.e. they may be tile-based viewport-dependent streaming methods that do not belong to any of the described categories.

All above-described viewport-dependent streaming approaches, tiles or MCTSs (or guard bands of tiles or MCTSs) may overlap in sphere coverage by an amount selected in the pre-processing or encoding.

All above-described viewport-dependent streaming approaches may be realized with client-driven bitstream rewriting (a.k.a. late binding) or with author-driven MCTS merging (a.k.a. early binding). In late binding, a player selects MCTS sequences to be received, selectively rewrites portions of the received video data as necessary (e.g. parameter sets and slice segment headers may need to be rewritten) for combining the received MCTSs into a single bitstream, and decodes the single bitstream. Early binding refers to the use of author-driven information for rewriting portions of the received video data as necessary, for merging of MCTSs into a single bitstream to be decoded, and in some cases for selection of MCTS sequences to be received. There may be approaches in between early and late binding: for example, it may be possible to let players select MCTS sequences to be received without author guidance, while an author-driven approach is used for MCTS merging and header rewriting. Early binding approaches include an extractor-driven approach and tile track approach, which are described subsequently.

In the tile track approach, one or more motion-constrained tile set sequences are extracted from a bitstream, and each extracted motion-constrained tile set sequence is stored as a tile track (e.g. an HEVC tile track) in a file. A tile base track (e.g. an HEVC tile base track) may be generated and stored in a file. The tile base track represents the bitstream by implicitly collecting motion-constrained tile sets from the tile tracks. At the receiver side the tile tracks to be streamed may be selected based on the viewing orientation. The client may receive tile tracks covering the entire omnidirectional content. Better quality or higher resolution tile tracks may be received for the current viewport compared to the quality or resolution covering the remaining 360-degree video. A tile base track may include track references to the tile tracks, and/or tile tracks may include track references to the tile base track. For example, in HEVC, the 'sabt' track reference is used used to refer to tile tracks from a tile base track, and the tile ordering is indicated by the order of the tile tracks contained by a 'sabt' track reference. Furthermore, in HEVC, a tile track has is a 'tbas' track reference to the tile base track.

In the extractor-driven approach, one or more motion-constrained tile set sequences are extracted from a bitstream, and each extracted motion-constrained tile set sequence is modified to become a compliant bitstream of its own (e.g. HEVC bitstream) and stored as a sub-picture track (e.g. with untransformed sample entry type 'hvc1' for HEVC) in a file. One or more extractor tracks (e.g. an HEVC extractor tracks) may be generated and stored in a file. The extractor track represents the bitstream by explicitly extracting (e.g. by HEVC extractors) motion-constrained tile sets from the sub-picture tracks. At the receiver side the sub-picture tracks to be streamed may be selected based on the viewing orientation. The client may receive sub-picture tracks covering the entire omnidirectional content. Better quality or higher resolution sub-picture tracks may be received for the current viewport compared to the quality or resolution covering the remaining 360-degree video.

It needs to be understood that even though the tile track approach and extractor-driven approach are described in details, specifically in the context of HEVC, they apply to other codecs and similar concepts as tile tracks or extractors. Moreover, a combination or a mixture of tile track and extractor-driven approach is possible. For example, such a mixture could be based on the tile track approach, but where a tile base track could contain guidance for rewriting operations for the client, e.g. the tile base track could include rewritten slice or tile group headers.

As an alternative to MCTS-based content encoding, content authoring for tile-based viewport-dependent streaming may be realized with sub-picture-based content authoring, described as follows. The pre-processing (prior to encoding) comprises partitioning uncompressed pictures to sub-pictures. Several sub-picture bitstreams of the same uncompressed sub-picture sequence are encoded, e.g. at the same resolution but different qualities and bitrates. The encoding may be constrained in a manner that merging of coded sub-picture bitstream to a compliant bitstream representing omnidirectional video is enabled. For example, dependencies on samples outside the decoded picture boundaries may be avoided in the encoding by selecting motion vectors in a manner that sample locations outside the picture would not be referred in the inter prediction process. Each sub-picture bitstream may be encapsulated as a sub-picture track, and one or more extractor tracks merging the sub-picture tracks of different sub-picture locations may be additionally formed. If a tile track based approach is targeted, each sub-picture bitstream is modified to become an MCTS sequence and stored as a tile track in a file, and one or more tile base tracks are created for the tile tracks.

Tile-based viewport-dependent streaming approaches may be realized by executing a single decoder instance or one decoder instance per MCTS sequence (or in some cases, something in between, e.g. one decoder instance per MCTSs of the same resolution), e.g. depending on the capability of the device and operating system where the player runs. The use of single decoder instance may be enabled by late binding or early binding. To facilitate multiple decoder instances, the extractor-driven approach may use sub-picture tracks that are compliant with the coding format or standard without modifications. Other approaches may need either to rewrite image segment headers, parameter sets, and/or alike information in the client side to construct a conforming bitstream or to have a decoder implementation capable of decoding an MCTS sequence without the presence of other coded video data.

There may be at least two approaches for encapsulating and referencing tile tracks or sub-picture tracks in the tile track approach and the extractor-driven approach, respectively:
Referencing track identifiers from a tile base track or an extractor track.
Referencing tile group identifiers from a tile base track or an extractor track, wherein the tile group identified by a tile group identifier contains the collocated tile tracks or the sub-picture tracks that are alternatives for extraction.

In the RWMQ method, one extractor track per each picture size and each tile grid is sufficient. In 360°+ viewport video and RWMR video, one extractor track may be needed for each distinct viewing orientation.

An approach similar to above-described tile-based viewport-dependent streaming approaches, which may be referred to as tile rectangle based encoding and streaming, is described next. This approach may be used with any video codec, even if tiles similar to HEVC were not available in the codec or even if motion-constrained tile sets or alike were not implemented in an encoder. In tile rectangle based encoding, the source content is split into tile rectangle sequences before encoding. Each tile rectangle sequence covers a subset of the spatial area of the source content, such as full panorama content, which may e.g. be of equirectangular projection format. Each tile rectangle sequence is then encoded independently from each other as a single-layer bitstream. Several bitstreams may be encoded from the same tile rectangle sequence, e.g. for different bitrates. Each tile rectangle bitstream may be encapsulated in a file as its own track (or alike) and made available for streaming. At the receiver side the tracks to be streamed may be selected based on the viewing orientation. The client may receive tracks covering the entire omnidirectional content. Better quality or higher resolution tracks may be received for the current viewport compared to the quality or resolution covering the remaining, currently non-visible viewports. In an example, each track may be decoded with a separate decoder instance.

In viewport-adaptive streaming, the primary viewport (i.e., the current viewing orientation) is transmitted at a good quality/resolution, while the remaining of 360-degree video is transmitted at a lower quality/resolution. When the viewing orientation changes, e.g. when the user turns his/her head when viewing the content with a head-mounted display, another version of the content needs to be streamed, matching the new viewing orientation. In general, the new version can be requested starting from a stream access point (SAP), which are typically aligned with (Sub)segments. In single-layer video bitstreams, SAPs correspond to random-access pictures, are intra-coded, and are hence costly in terms of rate-distortion performance. Conventionally, relatively long SAP intervals and consequently relatively long (Sub)segment durations in the order of seconds are hence typically used. Thus, the delay (here referred to as the viewport quality update delay) in upgrading the quality after a viewing orientation change (e.g. a head turn) is conventionally in the order of seconds and is therefore clearly noticeable and annoying.

As explained above, viewport switching in viewport-dependent streaming, which may be compliant with MPEG OMAF, is enabled at stream access points, which involve intra coding and hence a greater bitrate compared to respective inter coded pictures at the same quality. A compromise between the stream access point interval and the rate-distortion performance is hence chosen in an encoding configuration.

Viewport-adaptive streaming of equal-resolution HEVC bitstreams with MCTSs is described in the following as an example. Several HEVC bitstreams of the same omnidirectional source content may be encoded at the same resolution but different qualities and bitrates using motion-constrained tile sets. The MCTS grid in all bitstreams is identical. In order to enable the client to use the same tile base track for reconstructing a bitstream from MCTSs received from different original bitstreams, each bitstream is encapsulated in its own file, and the same track identifier is used for each tile track of the same tile grid position in all these files. HEVC tile tracks are formed from each motion-constrained tile set sequence, and a tile base track is additionally formed. The client may parse tile base track to implicitly reconstruct a bitstream from the tile tracks. The reconstructed bitstream can be decoded with a conforming HEVC decoder.

Clients can choose which version of each MCTS is received. The same tile base track suffices for combining MCTSs from different bitstreams, since the same track identifiers are used in the respective tile tracks.

While the description above referred to tile tracks, it should be understood that sub-picture tracks can be similarly formed.

Figure 11:
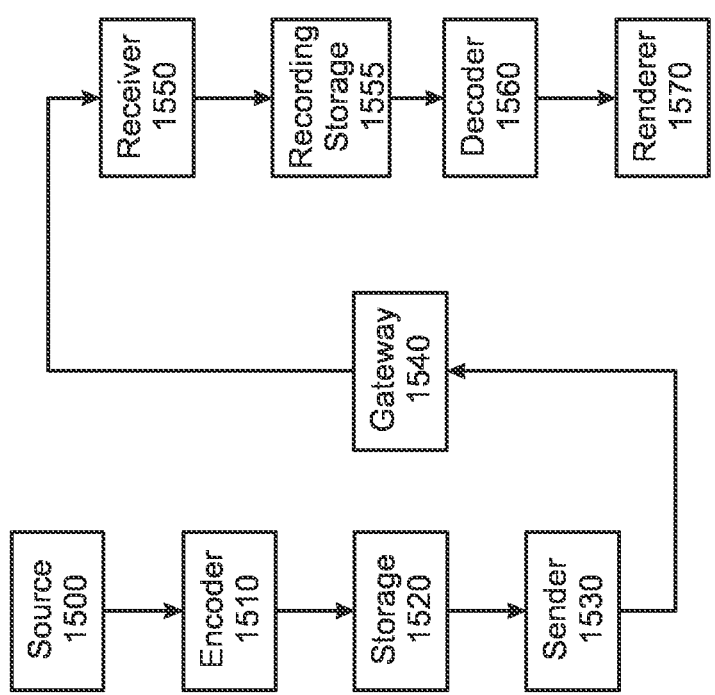
FIG. 11 shows a schematic diagram of an example multimedia communication system within which various embodiments may be implemented.

Tile merging in coded domain is needed or beneficial for the following purposes:
  Enable a number of tiles that is greater than the number of decoder instances, down to one decoder only
  Avoid synchronization challenges of multiple decoder instances
  Reach higher effective spatial and temporal resolutions, e.g. 6 k@60 fps with 4 k@60 fps decoding capacity
  Enable specifying interoperability points for standards as well as client APIs that require one decoder only FIG. 11 is a graphical representation of an example multimedia communication system within which various embodiments may be implemented. A data source 1510 provides a source signal in an analog, uncompressed digital, or compressed digital format, or any combination of these formats. An encoder 1520 may include or be connected with a pre-processing, such as data format conversion and/or filtering of the source signal. The encoder 1520 encodes the source signal into a coded media bitstream. It should be noted that a bitstream to be decoded may be received directly or indirectly from a remote device located within virtually any type of network. Additionally, the bitstream may be received from local hardware or software. The encoder 1520 may be capable of encoding more than one media type, such as audio and video, or more than one encoder 1520 may be required to code different media types of the source signal. The encoder 1520 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the figure only one encoder 1520 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 1530. The storage 1530 may comprise any type of mass memory to store the coded media bitstream. The format of the coded media bitstream in the storage 1530 may be an elementary self-contained bitstream format, or one or more coded media bitstreams may be encapsulated into a container file, or the coded media bitstream may be encapsulated into a Segment format suitable for DASH (or a similar streaming system) and stored as a sequence of Segments. If one or more media bitstreams are encapsulated in a container file, a file generator (not shown in the figure) may be used to store the one more media bitstreams in the file and create file format metadata, which may also be stored in the file. The encoder 1520 or the storage 1530 may comprise the file generator, or the file generator is operationally attached to either the encoder 1520 or the storage 1530. Some systems operate "live", i.e. omit storage and transfer coded media bitstream from the encoder 1520 directly to the sender 1540. The coded media bitstream may then be transferred to the sender 1540, also referred to as the server, on a need basis. The format used in the transmission may be an elementary self-contained bitstream format, a packet stream format, a Segment format suitable for DASH (or a similar streaming system), or one or more coded media bitstreams may be encapsulated into a container file. The encoder 1520, the storage 1530, and the server 1540 may reside in the same physical device or they may be included in separate devices. The encoder 1520 and server 1540 may operate with live real-time content, in which case the coded media bitstream is typically not stored permanently, but rather buffered for small periods of time in the content encoder 1520 and/or in the server 1540 to smooth out variations in processing delay, transfer delay, and coded media bitrate.

The server 1540 sends the coded media bitstream using a communication protocol stack. The stack may include but is not limited to one or more of Hypertext Transfer Protocol (HTTP), Transmission Control Protocol (TCP), and Internet Protocol (IP). When the communication protocol stack is packet-oriented, the server 1540 encapsulates the coded media bitstream into packets. It should be again noted that a system may contain more than one server 1540, but for the sake of simplicity, the following description only considers one server 1540.

If the media content is encapsulated in a container file for the storage 1530 or for inputting the data to the sender 1540, the sender 1540 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISOBMFF, for encapsulation of the at least one of the contained media bitstream on the communication protocol.

The server 1540 may or may not be connected to a gateway 1550 through a communication network, which may e.g. be a combination of a CDN, the Internet and/or one or more access networks. The gateway may also or alternatively be referred to as a middle-box. For DASH, the gateway may be an edge server (of a CDN) or a web proxy.

It is noted that the system may generally comprise any number gateways or alike, but for the sake of simplicity, the following description only considers one gateway 1550. The gateway 1550 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions.

The system includes one or more receivers 1560, typically capable of receiving, de-modulating, and de-capsulating the transmitted signal into a coded media bitstream. The coded media bitstream may be transferred to a recording storage 1570. The recording storage 1570 may comprise any type of mass memory to store the coded media bitstream. The recording storage 1570 may alternatively or additively comprise computation memory, such as random access memory. The format of the coded media bitstream in the recording storage 1570 may be an elementary self-contained bitstream format, or one or more coded media bitstreams may be encapsulated into a container file. If there are multiple coded media bitstreams, such as an audio stream and a video stream, associated with each other, a container file is typically used and the receiver 1560 comprises or is attached to a container file generator producing a container file from input streams. Some systems operate "live," i.e. omit the recording storage 1570 and transfer coded media bitstream from the receiver 1560 directly to the decoder 1580. In some systems, only the most recent part of the recorded stream, e.g., the most recent 10-minute excerption of the recorded stream, is maintained in the recording storage 1570, while any earlier recorded data is discarded from the recording storage 1570.

The coded media bitstream may be transferred from the recording storage 1570 to the decoder 1580. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 1570 or a decoder 1580 may comprise the file parser, or the file parser is attached to either recording storage 1570 or the decoder 1580. It should also be noted that the system may include many decoders, but here only one decoder 1570 is discussed to simplify the description without a lack of generality The coded media bitstream may be processed further by a decoder 1570, whose output is one or more uncompressed media streams. Finally, a renderer 1590 may reproduce the uncompressed media streams with a loudspeaker or a display, for example. The receiver 1560, recording storage 1570, decoder 1570, and renderer 1590 may reside in the same physical device or they may be included in separate devices.

A sender 1540 and/or a gateway 1550 may be configured to perform switching between different representations e.g. for view switching, bitrate adaptation and/or fast start-up, and/or a sender 1540 and/or a gateway 1550 may be configured to select the transmitted representation(s). Switching between different representations may take place for multiple reasons, such as to respond to requests of the receiver 1560 or prevailing conditions, such as throughput, of the network over which the bitstream is conveyed. A request from the receiver can be, e.g., a request for a Segment or a Subsegment from a different representation than earlier, a request for a change of transmitted scalability layers and/or sub-layers, or a change of a rendering device having different capabilities compared to the previous one. A request for a Segment may be an HTTP GET request. A request for a Subsegment may be an HTTP GET request with a byte range. Additionally or alternatively, bitrate adjustment or bitrate adaptation may be used for example for providing so-called fast start-up in streaming services, where the bitrate of the transmitted stream is lower than the channel bitrate after starting or random-accessing the streaming in order to start playback immediately and to achieve a buffer occupancy level that tolerates occasional packet delays and/or retransmissions. Bitrate adaptation may include multiple representation or layer up-switching and representation or layer down-switching operations taking place in various orders.

A decoder 1580 may be configured to perform switching between different representations e.g. for view switching, bitrate adaptation and/or fast start-up, and/or a decoder 1580 may be configured to select the transmitted representation(s). Switching between different representations may take place for multiple reasons, such as to achieve faster decoding operation or to adapt the transmitted bitstream, e.g. in terms of bitrate, to prevailing conditions, such as throughput, of the network over which the bitstream is conveyed. Faster decoding operation might be needed for example if the device including the decoder 580 is multi-tasking and uses computing resources for other purposes than decoding the scalable video bitstream. In another example, faster decoding operation might be needed when content is played back at a faster pace than the normal playback speed, e.g. twice or three times faster than conventional real-time playback rate. The speed of decoder operation may be changed during the decoding or playback for example as response to changing from a fast-forward play from normal playback rate or vice versa, and consequently multiple layer up-switching and layer down-switching operations may take place in various orders.

In the above, many embodiments have been described with reference to the equirectangular projection format. It needs to be understood that embodiments similarly apply to equirectangular pictures where the vertical coverage is less than 180 degrees. For example, the covered elevation range may be from −75° to 75°, or from −60° to 90° (i.e., covering one both not both poles). It also needs to be understood that embodiments similarly cover horizontally segmented equirectangular projection format, where a horizontal segment covers an azimuth range of 360 degrees and may have a resolution potentially differing from the resolution of other horizontal segments. Furthermore, it needs to be understood that embodiments similarly apply to omnidirectional picture formats, where a first sphere region of the content is represented by the equirectangular projection of limited elevation range and a second sphere region of the content is represented by another projection, such as cube map projection. For example, the elevation range −45° to 45° may be represented by a "middle" region of equirectangular projection, and the other sphere regions may be represented by a rectilinear projection, similar to cube faces of a cube map but where the corners overlapping with the middle region on the spherical domain are cut out. In such cases, embodiments can be applied to the middle region represented by the equirectangular projection.

In the above, some embodiments have been described with reference to terminology of particular codecs, most notably HEVC. It needs to be understood that embodiments can be similarly realized with respective terms of other codecs. For example, rather than tiles or tile sets, embodiments could be realized with rectangular slice groups of H.264/AVC.

The phrase along the track (e.g. including, along a track, a description of a motion-constrained coded sub-picture sequence) may be used in claims and described embodiments to refer to out-of-band transmission, signaling, or storage in a manner that the out-of-band data is associated with the track. In other words, the phrase "a description along the track" may be understood to mean that the description is not stored in the file or segments that carry the track, but within another resource, such as a media presentation description. For example, the description of the motion-constrained coded sub-picture sequence may be included in a media presentation description that includes information of a Representation conveying the track. The phrase decoding along the track or alike may refer to decoding the referred out-of-band data (which may be obtained from out-of-band transmission, signaling, or storage) that is associated with the track.

In the above, some embodiments have been described with reference to segments, e.g. as defined in MPEG-DASH. It needs to be understood that embodiments may be similarly realized with subsegments, e.g. as defined in MPEG-DASH.

In the above, some embodiments have been described in relation to DASH or MPEG-DASH. It needs to be understood that embodiments could be similarly realized with any other similar streaming system, and/or any similar protocols as those used in DASH, and/or any similar segment and/or manifest formats as those used in DASH, and/or any similar client operation as that of a DASH client. For example, some embodiments could be realized with the M3U manifest format.

In the above, some embodiments have been described in relation to ISOBMFF, e.g. when it comes to segment format. It needs to be understood that embodiments could be similarly realized with any other file format, such as Matroska, with similar capability and/or structures as those in ISOBMFF.

In the above, some embodiments have been described with reference to encoding or including indications or metadata in the bitstream and/or decoding indications or metadata from the bitstream. It needs to be understood that indications or metadata may additionally or alternatively be encoded or included along the bitstream and/or decoded along the bitstream. For example, indications or metadata may be included in or decoded from a container file that encapsulates the bitstream.

In the above, some embodiments have been described with reference to including metadata or indications in or along a container file and/or parsing or decoding metadata and/or indications from or along a container file. It needs to be understood that indications or metadata may additionally or alternatively be encoded or included in the video bitstream, for example as SEI message(s) or VUI, and/or decoded in the video bitstream, for example from SEI message(s) or VUI.

Figure 13:
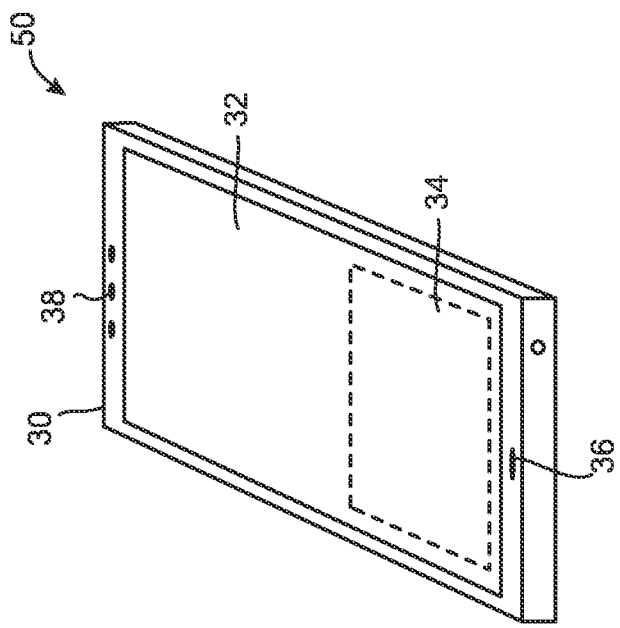
FIG. 13 shows schematically a user equipment suitable for employing embodiments of the invention.
Figure 12:
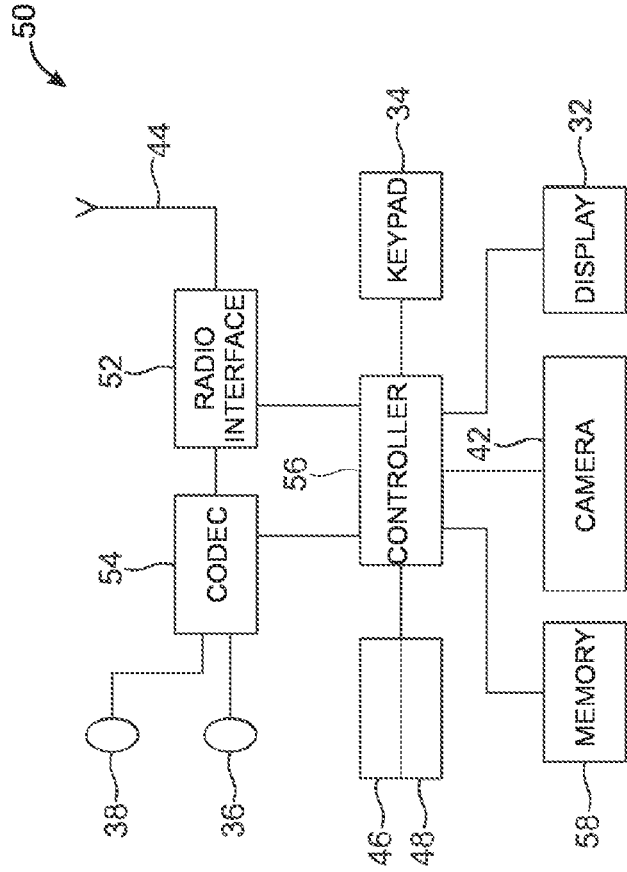
FIG. 12 shows schematically an electronic device employing embodiments of the invention.

The following describes in further detail suitable apparatus and possible mechanisms for implementing the embodiments of the invention. In this regard reference is first made to FIG. 12 which shows a schematic block diagram of an exemplary apparatus or electronic device 50 depicted in FIG. 13, which may incorporate a transmitter according to an embodiment of the invention.

The electronic device 50 may for example be a mobile terminal or user equipment of a wireless communication system. However, it would be appreciated that embodiments of the invention may be implemented within any electronic device or apparatus which may require transmission of radio frequency signals.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example, the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The term battery discussed in connection with the embodiments may also be one of these mobile energy devices. Further, the apparatus 50 may comprise a combination of different kinds of energy devices, for example a rechargeable battery and a solar cell. The apparatus may further comprise an infrared port 41 for short range line of sight communication to other devices. In other embodiments the apparatus 50 may further comprise any suitable short range communication solution such as for example a Bluetooth wireless connection or a USB/FireWire wired connection.

The apparatus 50 may comprise a controller 56 or processor for controlling the apparatus 50. The controller 56 may be connected to memory 58 which in embodiments of the invention may store both data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a universal integrated circuit card (UICC) reader and a universal integrated circuit card for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 60 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera 42 capable of recording or detecting imaging.

With respect to FIG. 14, an example of a system within which embodiments of the present invention can be utilized is shown. The system 10 comprises multiple communication devices which can communicate through one or more networks. The system 10 may comprise any combination of wired and/or wireless networks including, but not limited to a wireless cellular telephone network (such as a global systems for mobile communications (GSM), universal mobile telecommunications system (UMTS), long term evolution (LTE) based network, code division multiple access (CDMA) network etc.), a wireless local area network (WLAN) such as defined by any of the IEEE 802.x standards, a Bluetooth personal area network, an Ethernet local area network, a token ring local area network, a wide area network, and the Internet.

For example, the system shown in FIG. 14 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22, a tablet computer. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, Long Term Evolution wireless communication technique (LTE) and any similar wireless communication technology. A communications device involved in implementing various embodiments of the present invention may communicate using various media including, but not limited to, radio, infrared, laser, cable connections, and any suitable connection.

Although the above examples describe embodiments of the invention operating within a wireless communication device, it would be appreciated that the invention as described above may be implemented as a part of any apparatus comprising a circuitry in which radio frequency signals are transmitted and received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. An apparatus comprising:
   at least one processor; and
   at least one memory storing instructions that, when executed by the at least one processor, cause the apparatus at least to:
   obtain compressed volumetric video data representing a three-dimensional scene or object;
   capsulate the compressed volumetric video data into a data structure as a track or a multi-track;
   project at least a part of the three-dimensional scene as seen from a certain viewport to one or more two-dimensional projections;
   obtain data of the one or more two-dimensional projections;
   include the data of the one or more two-dimensional projections into the data structure,
   characterized in that the apparatus is further caused to:
   include information of the viewport into a timed metadata track to signal viewport information including viewport position, angle and camera parameters.

2. The apparatus according to claim 1, wherein the apparatus is further caused to:
   include the data of the one or more two-dimensional projections with higher quality or resolution than other capsulated volumetric video data.

3. The apparatus according to claim 1 wherein the apparatus is further caused to:
   form point cloud encoded data units representing a dataset of points within the three-dimensional scene or object;
   map the point cloud encoded data units to individual tracks within the data structure based on their types;
   construct a viewport track based on the data of the one or more two-dimensional projections; and construct a viewport synchronization track comprising projection data linking a two-dimensional viewport track and one or more three-dimensional viewing tracks.

4. The apparatus according to claim 3 wherein the apparatus is further caused to:
include virtual camera information related to the viewport for the viewport synchronization track.

5. The apparatus according to claim 3 wherein the apparatus is further caused to:
include viewport tracks with data of a viewport synchronization track associated with the viewport track.

6. The apparatus according to claim 1 wherein the apparatus is further caused to:
include the data of the one or more two-dimensional projections into the data structure as one or more previously-rendered two-dimensional videos of one or more three-dimensional scenes or objects including the three-dimensional scene or object.

7. The apparatus according to claim 1 wherein the apparatus is further caused to:
include data of two or more alternatives for the one or more two-dimensional projections into the data structure.

8. A method comprising:
obtaining compressed volumetric video data representing a three-dimensional scene or object;
capsulating the compressed volumetric video data into a data structure as a track or a multi-track;
projecting at least a part of the three-dimensional scene as seen from a certain viewport to one or more two-dimensional projections;
obtaining data of the one or more two-dimensional projections;
including the data of the one or more two-dimensional projections into the data structure,
characterized in that the method further comprises:
including information of the viewport into a timed metadata track to signal viewport information including viewport position, angle and camera parameters.

9. The method according to claim 8 further comprising:
including the data of the one or more two-dimensional projections with higher quality or resolution than other capsulated volumetric video data.

10. The method according to claim 8 further comprising:
forming point cloud encoded data units representing a dataset of points within the three-dimensional scene or object;
mapping the point cloud encoded data units to individual tracks within the data structure based on their types;
constructing a viewport track based on the data of the one or more two-dimensional projections; and
constructing a viewport synchronization track comprising projection data linking a two-dimensional viewport track and one or more three-dimensional viewing tracks.

11. The method according to claim 10 further comprising:
including virtual camera information related to the viewport for the viewport synchronization track.

12. The method according to claim 10 further comprising:
including viewport tracks with data of a viewport synchronization track associated with the viewport track.

13. The method according to claim 8 further comprising:
including the data of the one or more two-dimensional projections into the data structure as one or previously-rendered two-dimensional videos of one or more three-dimensional scenes or objects including that three-dimensional scene or object.

14. The method according to claim 8 further comprising:
including data of two or more alternatives for the one or more two-dimensional projections into the data structure.

15. An apparatus comprising:
at least one processor; and
at least one memory storing instructions that, when executed by the at least one processor, cause the apparatus at least to:
receive a data structure as a track or multi-track comprising compressed volumetric video data representing a three-dimensional scene or object and data of a two-dimensional projection of at least a part of the three-dimensional scene as seen from a certain viewport; and
select one of: the three-dimensional scene or object, or the two-dimensional projection for presentation,
characterized in that the apparatus is further caused to:
receive information of the viewport from a timed metadata track to obtain viewport information including viewport position, angle and camera parameters.

16. The apparatus according to claim 15 wherein the apparatus is further caused to:
render the data of the two-dimensional projection with higher quality or resolution than other capsulated volumetric video data.

17. The apparatus according to claim 15 wherein the apparatus is further caused to:
reconstruct from a viewport synchronization track projection data linking two-dimensional viewport track and one or more three-dimensional viewing tracks;
reconstruct data of the two-dimensional projection from a viewport track;
map point cloud decoded data units from individual tracks within the data structure based on their types; and
reconstruct the three-dimensional scene or object based on the point cloud decoded data units.

18. The apparatus according to claim 15 wherein the apparatus is further caused to:
receive virtual camera information related to the viewport from the viewport synchronization track.

19. The apparatus according claim 15 wherein the apparatus is further caused to:
receive data of the two-dimensional projection from the data structure as one or more pre-rendered two-dimensional videos of one or more three-dimensional scenes or objects including the three-dimensional scene or object.

20. A method for decoding comprising:
receiving a data structure as a track or a multi-track comprising compressed volumetric video data representing a three-dimensional scene or object and data of a two-dimensional projection of at least a part of the three-dimensional scene as seen from a certain viewport; and
selecting one of: the three-dimensional scene or object, or the two-dimensional projection for presentation,
characterized in that the method further comprises:
receiving information of the viewport from a timed metadata track to obtain viewport information including viewport position, angle and camera parameters.

* * * * *